US010867209B2

(12) United States Patent
Coven et al.

(10) Patent No.: US 10,867,209 B2
(45) Date of Patent: Dec. 15, 2020

(54) COMBINING OUTPUTS OF DATA PROCESSING SERVICES IN A CLOUD-BASED COLLABORATION PLATFORM

(71) Applicant: Box, Inc., Redwood City, CA (US)

(72) Inventors: Andrew Coven, Los Gatos, CA (US); Benjamin John Kus, Alameda, CA (US); Faizan Nabi Buzdar, Redwood City, CA (US); Matthew Self, Emerald Hills, CA (US)

(73) Assignee: Box, Inc., Redwood City, CA (US)

( * ) Notice: Subject to any disclaimer, the term of this patent is extended or adjusted under 35 U.S.C. 154(b) by 116 days.

(21) Appl. No.: 16/154,668

(22) Filed: Oct. 8, 2018

(65) Prior Publication Data

US 2019/0108419 A1 Apr. 11, 2019

Related U.S. Application Data

(60) Provisional application No. 62/570,075, filed on Oct. 9, 2017, provisional application No. 62/569,859, filed (Continued)

(51) Int. Cl.
*H04L 12/18* (2006.01)
*G06K 9/62* (2006.01)
(Continued)

(52) U.S. Cl.
CPC ............ *G06K 9/6227* (2013.01); *G06F 8/60* (2013.01); *G06F 9/4411* (2013.01);
(Continued)

(58) Field of Classification Search
CPC ... H04L 41/22; H04L 65/403; H04L 65/4084; H04L 67/10; H04L 67/1014;
(Continued)

(56) References Cited

U.S. PATENT DOCUMENTS 6,510,468 B1 1/2003 Hayne
9,081,798 B1 * 7/2015 Wong ................. G06F 16/5838
(Continued)

OTHER PUBLICATIONS

Non-Final Office Action dated Feb. 27, 2020 for U.S. Appl. No. 16/154,661.

(Continued)

*Primary Examiner* — Jungwon Chang
(74) *Attorney, Agent, or Firm* — Vista IP Law Group, LLP

(57) ABSTRACT

Systems and methods for combining two or more outputs of two or more data processing services. A method embodiment commences upon receiving an event indication and a content item from a cloud-based collaboration platform. The method analyzes the event and the content item to determine two or more data processing services to apply to the content item. The method further determines a common metric to use to correlate two or more different outputs from the two or more data processing services. The method invokes both of the two or more data processing services, which in turn each generate respective outputs. Metadata that relates the respective outputs based on the common metric as well as the outputs themselves are stored for retrieval by the cloud-based collaboration platform. A query is executed to retrieve at least portions of the respective outputs and corresponding metadata. The retrieved data is correlated in a display.

20 Claims, 36 Drawing Sheets

Related U.S. Application Data on Oct. 9, 2017, provisional application No. 62/691,549, filed on Jun. 28, 2018.

(51) Int. Cl.

| | |
|---|---|
| ***G06F 9/54*** | (2006.01) |
| ***G06N 20/00*** | (2019.01) |
| ***H04N 21/84*** | (2011.01) |
| ***H04N 21/234*** | (2011.01) |
| ***H04N 21/4788*** | (2011.01) |
| ***H04L 29/08*** | (2006.01) |
| ***G06F 16/17*** | (2019.01) |
| ***G06F 8/60*** | (2018.01) |
| ***G06F 9/4401*** | (2018.01) |
| ***G06F 9/445*** | (2018.01) |
| ***G06F 9/50*** | (2006.01) |

(52) U.S. Cl.

CPC ...... *G06F 9/44505* (2013.01); *G06F 9/44526* (2013.01); *G06F 9/5027* (2013.01); *G06F 9/542* (2013.01); *G06F 16/1734* (2019.01); *G06K 9/6289* (2013.01); *G06N 20/00* (2019.01); *H04L 12/1831* (2013.01); *H04L 67/10* (2013.01); *H04L 67/34* (2013.01); *H04N 21/23418* (2013.01); *H04N 21/4788* (2013.01); *H04N 21/84* (2013.01); *H04L 67/1014* (2013.01)

(58) Field of Classification Search

CPC . H04L 12/1831; H04L 67/34; G06F 16/5838; G06F 16/1734; G06F 9/542; G06F 9/4411; G06F 9/44505; G06F 9/44526; G06F 9/5027; G06F 8/60; G06K 9/6227; G06K 9/6289; G06K 9/542; G06N 20/00; H04N 21/84; H04N 21/23418; H04N 21/4788

See application file for complete search history.

(56) References Cited

U.S. PATENT DOCUMENTS

| | | | | |
|---|---|---|---|---|
| 9,361,263 | B1 | 6/2016 | Florissi et al. | |
| 10,382,266 | B1 | 8/2019 | Balakrishnan et al. | |
| 2003/0103250 | A1 | 6/2003 | Kidokoro | |
| 2014/0328570 | A1* | 11/2014 | Cheng | H04N 21/8549 386/241 |
| 2015/0082197 | A1 | 3/2015 | Pearl | |
| 2015/0229719 | A1 | 8/2015 | Sella | |
| 2016/0034253 | A1* | 2/2016 | Bang | G06F 9/451 715/728 |
| 2017/0026528 | A1* | 1/2017 | Kim | H04N 1/00453 |
| 2017/0085854 | A1* | 3/2017 | Furesjo | G06F 3/0485 |

OTHER PUBLICATIONS

International Search Report and Written Opinion dated Jan. 29, 2019 for PCT Appln. No. PCT/US2018/055096.

"What is Video Indexer?" Microsoft Azure, URL:https://docs.microsoft.com/en-us/azure/media-services/video-indexer/video-indexer-overview, Sep. 14, 2018.

"IBM Watson Video Enrichment allows content owners and distributors to improve content discovery and recommendations and can help increase operational efficiency", ibm.com, URL:"https://www-01.ibm.com/common/ssi/ShowDoc.wss?docURL=/common", Sep. 19, 2017.

Non-Final Office Action dated Apr. 14, 2020 for U.S. Appl. No. 16/154,655.

Final Office Action dated Sep. 16, 2020 for U.S. Appl. No. 16/154,661.

* cited by examiner

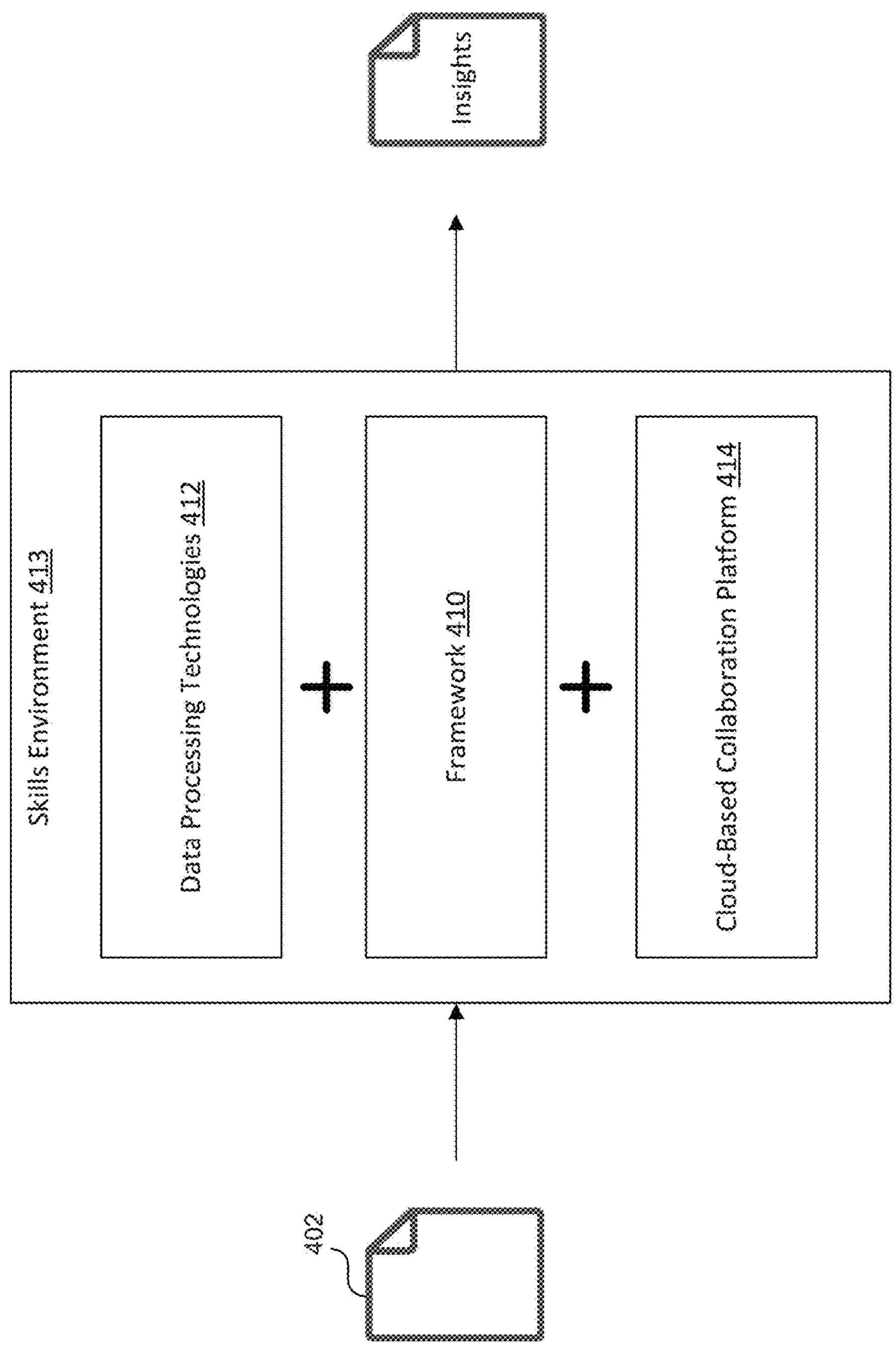
FIG. 4A1

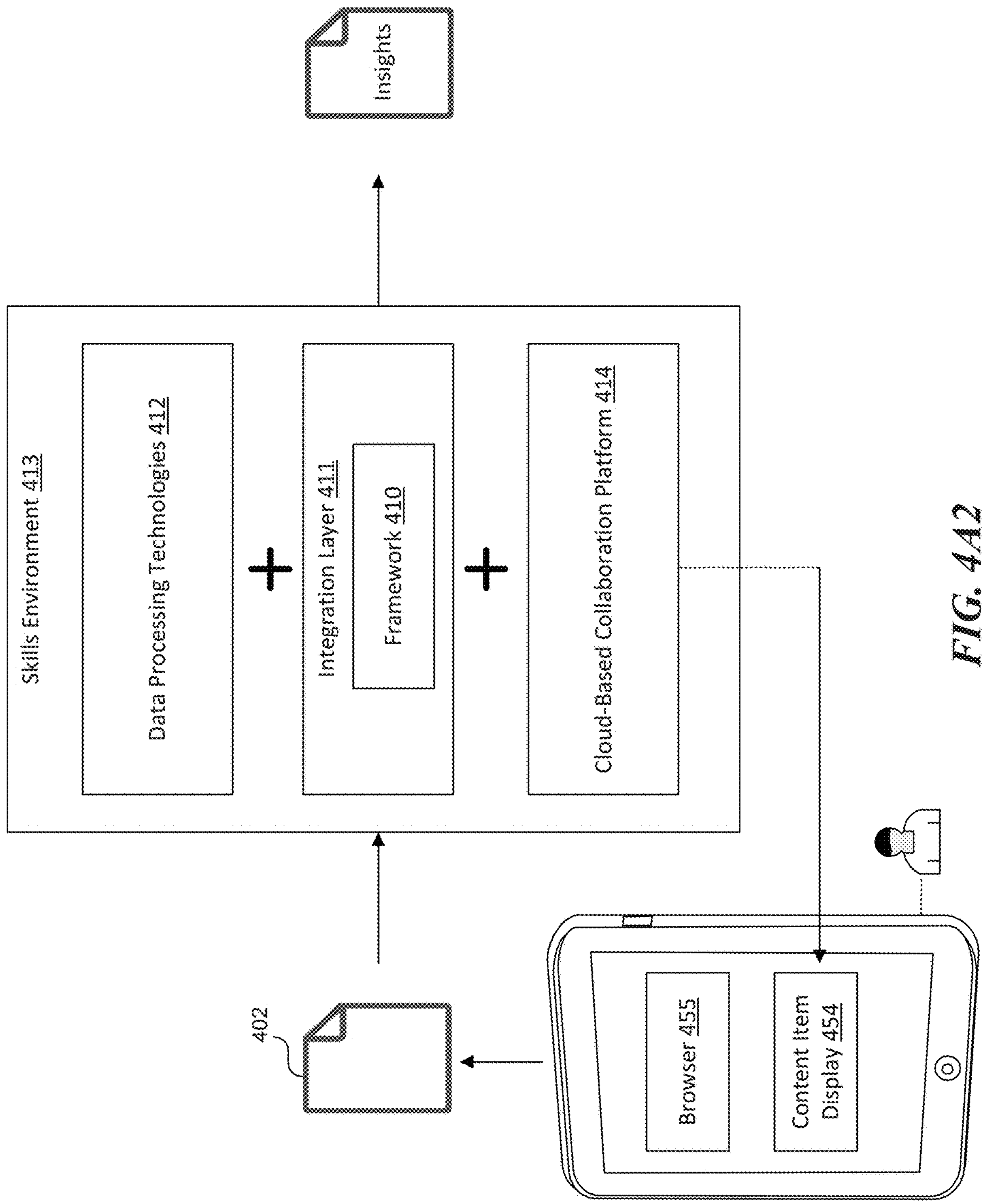
FIG. 4A2

Figure 13A:
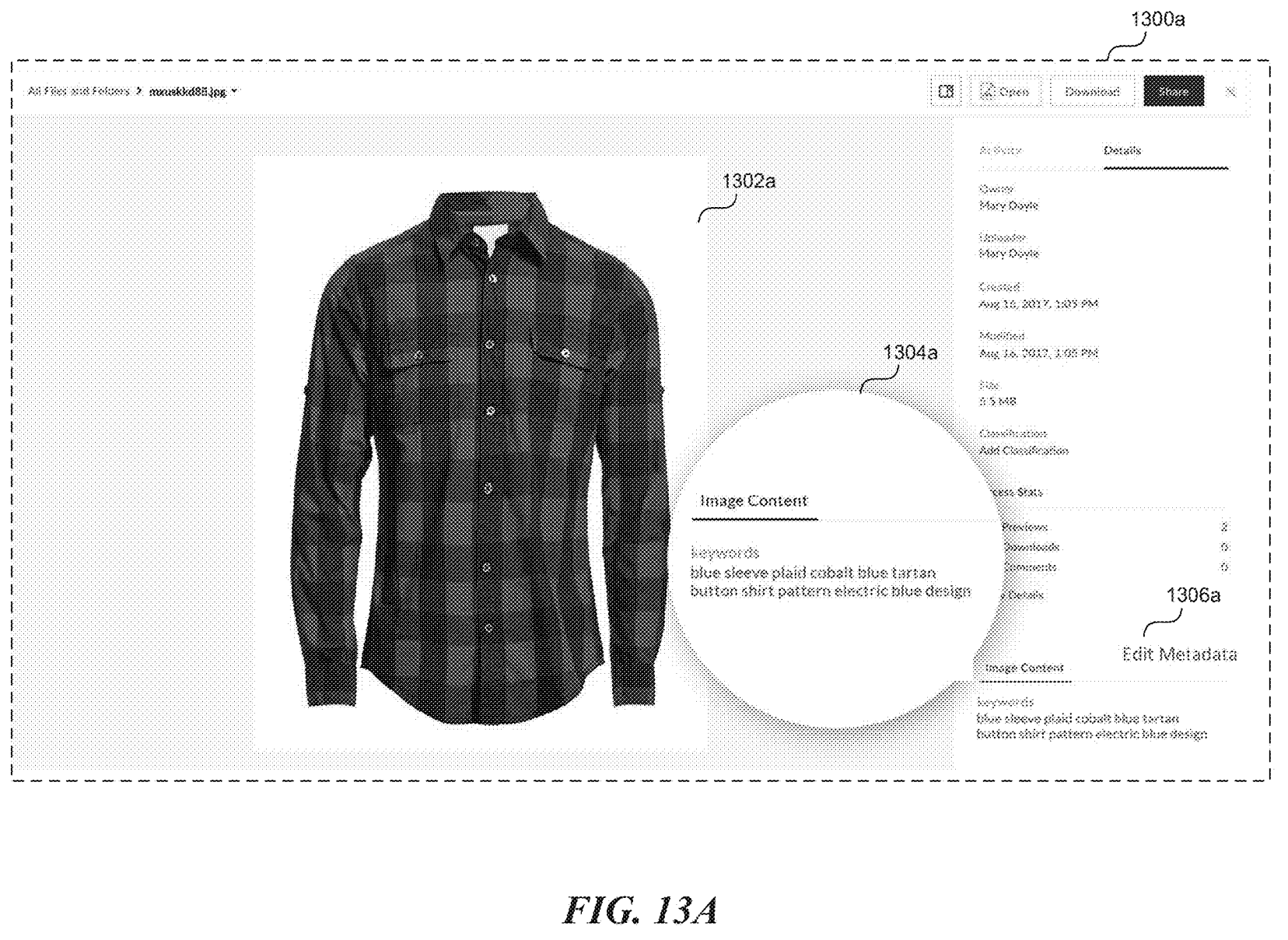

1300a

1302a

1304a

Image Content keywords blue sleeve plaid cobalt blue tartan button shirt pattern electric blue design 1306a Edit Metadata

COMBINING OUTPUTS OF DATA PROCESSING SERVICES IN A CLOUD-BASED COLLABORATION PLATFORM

CROSS-REFERENCE TO RELATED APPLICATIONS

The present application claims the benefit of priority to U.S. Provisional Patent Application Ser. No. 62/569,859 titled "FRAMEWORK ARCHITECTURE FOR INTEGRATING DATA PROCESSING TECHNOLOGIES WITH A CLOUD-BASED COLLABORATION PLATFORM", filed Oct. 9, 2017, U.S. Provisional Patent Application Ser. No. 62/691,549 titled "FRAMEWORK ARCHITECTURE FOR INTEGRATING DATA PROCESSING TECHNOLOGIES WITH A CLOUD-BASED COLLABORATION PLATFORM", filed Jun. 28, 2018, and U.S. Provisional Patent Application Ser. No. 62/570,075 titled "SYSTEMS AND METHODS FOR COLLABORATION INSIGHT AND COMMUNICATION", filed Oct. 9, 2017, which are hereby incorporated by reference in their entirety.

This application is related to U.S. patent application Ser. No. 16/154,655 titled "INTEGRATING EXTERNAL DATA PROCESSING TECHNOLOGIES WITH A CLOUD-BASED COLLABORATION PLATFORM", filed on Oct. 8, 2018, and U.S. patent application Ser. No. 16/154,661 titled "DEPLOYING DATA PROCESSING SERVICE PLUG-INS INTO A CLOUD-BASED COLLABORATION PLATFORM", filed on Oct. 8, 2018, which are hereby incorporated by reference in their entirety.

FIELD

This disclosure relates to shared content management, and more particularly to techniques for integrating data processing technologies with a cloud-based collaboration platform.

BACKGROUND

Extracting intelligent insights from stored digital content can provide significant value to users and managers of the digital content. These insights can take the form of helping security teams identify and protect the most sensitive files, helping power internal business processes, and/or by making it easier for users to find and understand their content. Many technologies based on advanced machine learning are being developed to extract meaning from specific file types (e.g., image recognition, OCR, understanding video composition, recognizing audio, text analytics, etc.). Increasingly, these intelligent processing techniques are being made available cheaply and easily from multiple major vendors via Application Programming Interfaces (APIs).

BRIEF DESCRIPTION OF THE DRAWINGS

FIG. 4A1, FIG. 4A2, and FIG. 4B show diagrams that illustrate general concepts and example scenarios for integrating Skills that use data processing technologies with a cloud-based collaboration platform using a general framework;

FIG. 13A, FIG. 13B, FIG. 13C, FIG. 13D, FIG. 13E, and FIG. 13F show screenshots of example custom user interfaces that incorporate enhanced content features;

DETAILED DESCRIPTION

Cloud-Based Collaboration Platform

Figure 1:
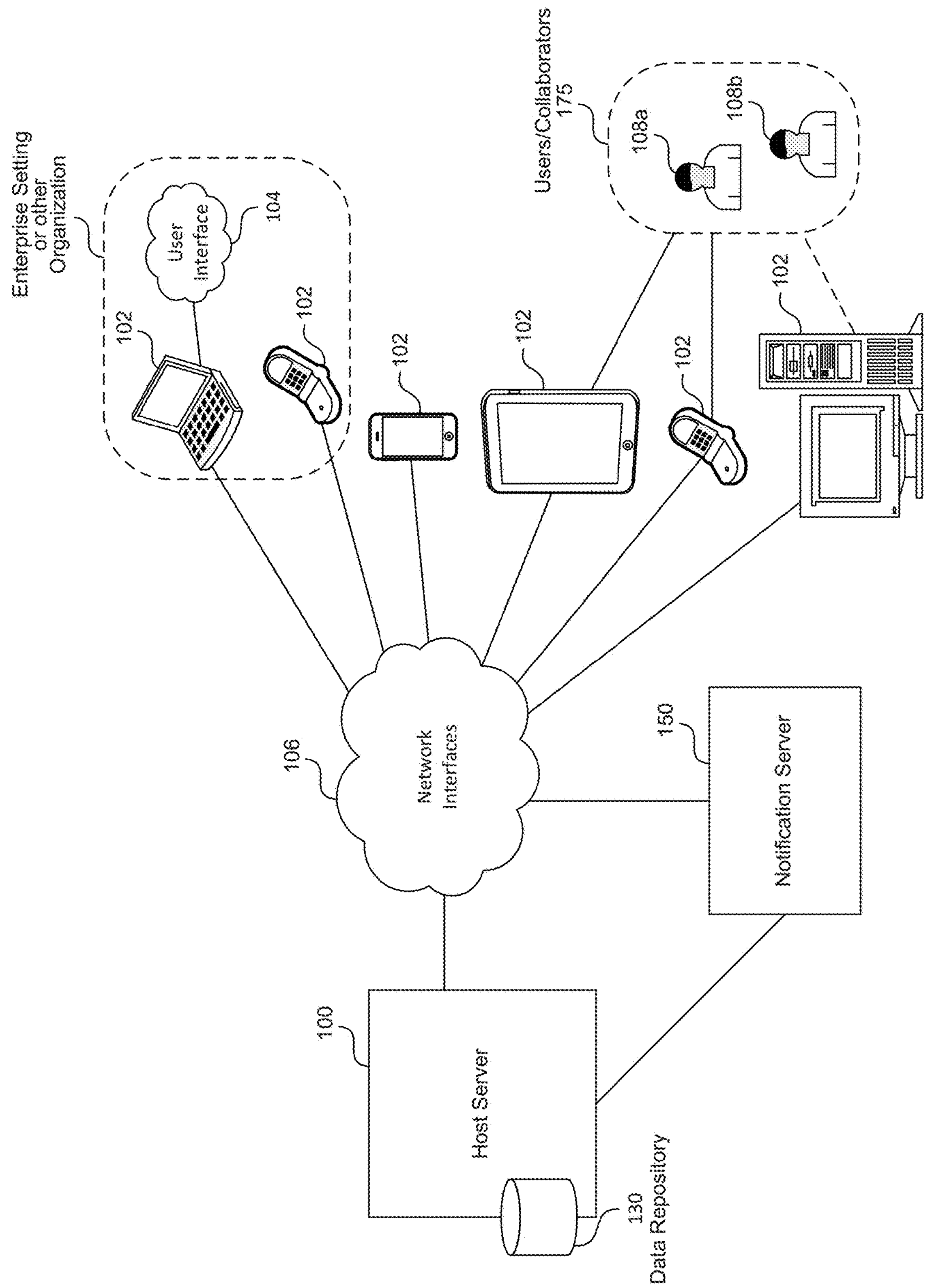
FIG. 1 illustrates an example diagram of a system having a host server of a cloud service (e.g., collaboration or file sharing platform) and/or cloud storage accounts with capabilities for enabling a desktop application such as described herein for accessing a cloud-based collaboration platform.

FIG. 1 illustrates an example diagram of a system having a host server 100 of a cloud service (e.g., collaboration or file sharing platform) and/or cloud storage accounts with capabilities for enabling a desktop application such as described herein for accessing a cloud-based collaboration platform. The system depicted in FIG. 1 may be broadly referred to as a cloud-based collaboration platform.

The client devices 102 can be any system and/or device, and/or any combination of devices/systems that are able to establish a connection, including wired, wireless, cellular connections with another device, a server and/or other systems such as host server 100 and/or notification server 150. Client devices 102 will typically include a display and/or other user interface 104 functionalities to present information and data exchanged by, between, or among the devices 102 and/or host server 100 and/or notification server 150.

For example, the client devices 102 can include mobile, hand held or portable devices or non-portable devices and can be any of a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g., an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, as well as a notification server 150 are coupled via a network interfaces 106. In some embodiments, the devices 102 and host server 100 may be directly connected to one another.

The input mechanism on client devices 102 can include a touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination of the above.

Signals received or detected indicating user activity at client devices 102 through one or more of the above input mechanism, or others, can be used in the disclosed technology by any user 108*a* or collaborator 108*b* for accessing, through any one or more of the network interfaces 106, a cloud-based collaboration platform (or cloud-based collaboration system, or online collaboration platform, which terms are used interchangeably herein) that is hosted by the host server 100).

The collaboration platform or environment hosts workspaces with content items that one or more users can access (e.g., view, edit, update, revise, comment, download, preview, tag, or otherwise manipulate, etc.). To host the content items, the collaboration platform may store the uploaded content items in a data repository 130. The data repository 130 may represent the collective data storage facilities of the cloud-based collaboration platform and may include any one data storage components operating at any one or more physical devices. For example, data repository 130 may be distributed across multiple network-connected machines. As mentioned, the data repository 130 may store digital content that is hosted in the cloud-based collaboration platform (i.e., content uploaded by users/collaborators 175). The data repository 130 may also store code including the instructions, rules, models, etc. for performing one or more processes of the cloud-based collaboration platform. For example, the cloud-based collaboration platform may host various user-facing applications (e.g., Microsoft® Word) that can be used by users/collaborators 175 for interacting with stored digital content. Similarly, the cloud-based collaboration platform may host various processing applications that operate in the background, for example, to perform various automated tasks. As will be described in more detail later in this disclosure, the cloud-based collaboration platform may implement processing applications referred to as “Skills” that leverage various data processing technologies to derive or extract insights or other information from content stored in a cloud-based collaboration platform.

A content item can generally include any type of digital or electronic content that can be viewed or accessed via an electronic device (e.g., device 102). The digital content can include .pdf files, .doc files, .pptx slides (e.g., PowerPoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators that have access to the content included therein. The levels of access (e.g., based on permissions or rules) of each user or collaborator to access the content in a given workspace may be the same or may vary among the users. Each user may have their own set of access rights to every piece of content in the workspace, or each user may have different access rights to different pieces of content. Access rights may be specified by a user associated with a workspace and/or a user who created/uploaded a particular piece of content to the workspace, or any other designated user or collaborator.

In general, the collaboration platform allows multiple users or collaborators to access or collaborate their efforts on content items such that each user can see, remotely, the edits, revisions, comments, or annotations being made to specific content items by another user through their own user devices. For example, a user can upload a document to a workspace for other users to access (e.g., for viewing, editing, commenting, signing-off, or otherwise manipulating). The user can login to the online platform and upload the document (or any other type of content item) to an existing workspace or to a new workspace. The document can be shared with existing users or collaborators in a workspace.

Figure 2:
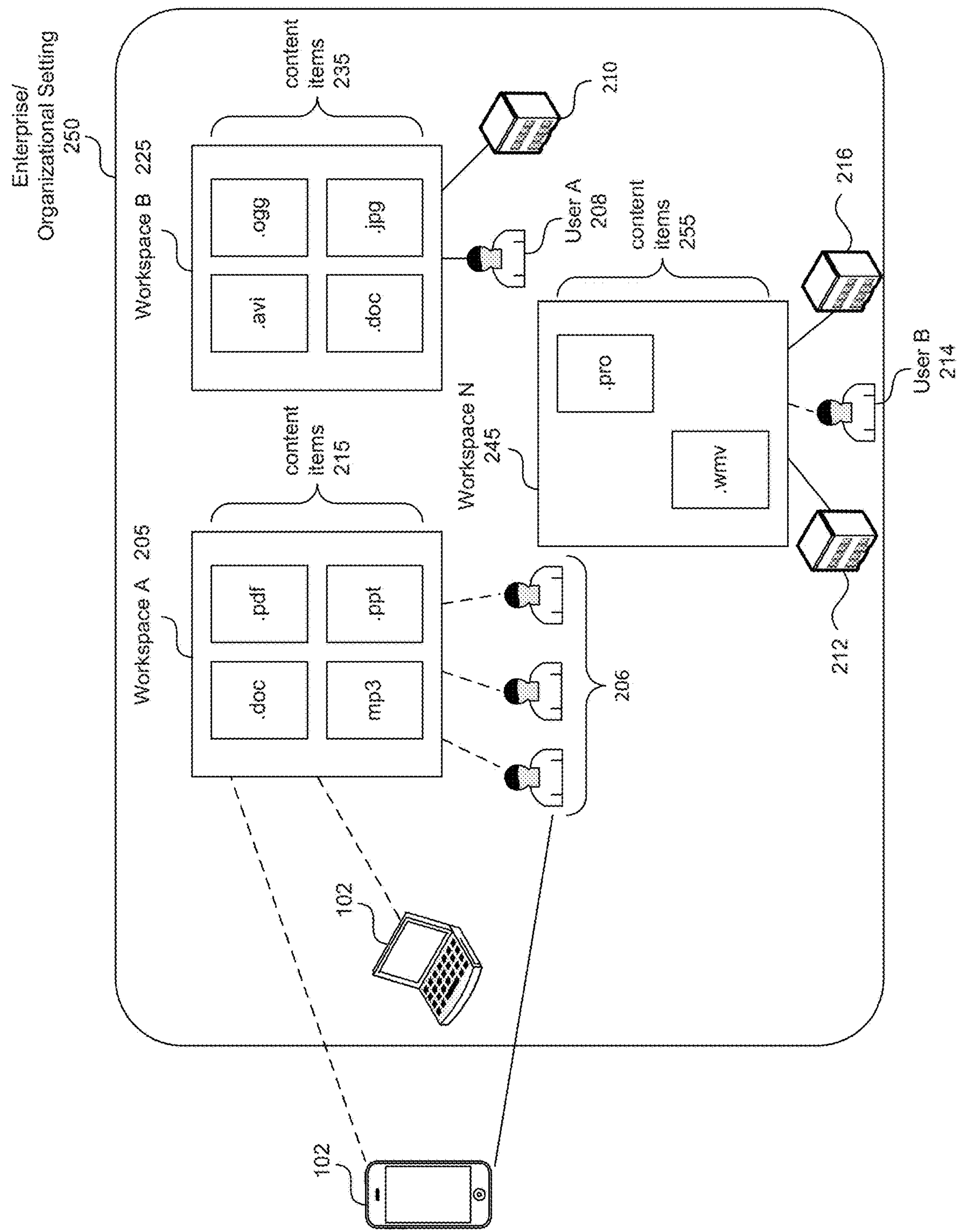
FIG. 2 depicts a diagram of a cloud-based or online collaboration platform deployed in an enterprise or other organizational setting for organizing content items and workspaces, as one example of a collaboration service that is hosted as a cloud service with capabilities for enabling a desktop application such as described herein.

A diagrammatic illustration of the online collaboration platform and the relationships between workspaces and users/collaborators are illustrated with further reference to the example of FIG. 2. A diagrammatic illustration of a workspace having multiple content items that collaborators can access through multiple devices is illustrated with further reference to the example of FIG. 3.

In one embodiment, the host server 100 of cloud-based services and/or cloud storage such as an online or cloud-based collaboration platform is able to track or monitor the devices used by users to access content or activities.

In one embodiment, client devices 102 communicate with the host server 100 and/or notification server 150 over the network interfaces 106. In general, the network over which the client devices 102, the host server 100, and/or notification server 150 can communicate, may be a cellular network, a telephonic network, an open network, such as the Internet, or a private network, such as an intranet and/or extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to, the TCP/IP protocol, Open System Interconnections (OSI), FTP, UPnP, iSCSI, NSF, ISDN, PDH, RS-232, SDH, SONET, etc.

The network can be any collection of distinct networks operating wholly or partially in conjunction to provide connectivity to the client devices 102 and the host server 100, and may appear as one or more networks to the serviced systems and devices. In one embodiment, communications to and from the client devices 102 can be achieved by an open network, such as the Internet, or a private network, such as an intranet and/or the extranet. In one embodiment, communications can be achieved by a secure communications protocol, such as secure sockets layer (SSL) or transport layer security (TLS).

In addition, communications can be achieved via one or more networks, such as, but not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN) enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1×RTT, EV-DO; and messaging protocols such as, TCP/IP, SMS, MMS, extensible messaging and presence protocol (XMPP), real-time messaging protocol (RTMP), instant messaging and presence protocol (IMPP), instant messaging, USSD, IRC, or any other wireless data networks or messaging protocols.

FIG. 2 depicts a diagram of a cloud-based online collaboration platform deployed in an enterprise or other organizational setting 250 for organizing any forms or formats of content items 215, content items 235, content items 255, workspace 205, workspace 225, and workspace 245. The depicted cloud-based online collaboration platform is merely one example of a collaboration or file sharing service that may include hosted cloud services and/or cloud storage services and/or any set of capabilities for enabling a desktop application.

The cloud-based platform for collaborating on projects or jointly working on documents can be used by individual users and shared among collaborators. In addition, the collaboration platform can be deployed in an organized setting including a company (e.g., an enterprise setting), a department in a company, an academic institution, a department in an academic institution, a class or course setting, or any other types of organizations or organized setting.

When deployed in an organizational setting, multiple workspaces (e.g., workspace A, workspace B, workspace C) can be created to support different projects or a variety of work flows. Each workspace can have its own associated content items. For example, workspace A 205 may be associated with content items 215, workspace B 225 may be associated with content items 235, and workspace N may be associated with content items 255. The content items 215, 235, and content items 255 may be unique to each workspace but need not be. For example, a particular word document can be associated with only one workspace (e.g., workspace A 205) or it may be associated with multiple workspaces (e.g., Workspace A 205 and workspace B 225, etc.).

In general, each workspace has a set of users or collaborators associated with it. For example, workspace A 205 is associated with multiple users or collaborators 206. In some instances, workspaces deployed in an enterprise may be department specific. For example, workspace B may be associated with department 210 and some users shown as user A 208. Workspace N 245 can be associated with department 212 and department 216 and with the users shown as user B 214.

Each user associated with a workspace can generally access the content items associated with the workspace. The level of access will depend on permissions associated with the specific workspace and/or with a specific content item. Permissions can be set for the workspace or set individually on a per content item basis. For example, the creator of a workspace (e.g., one of user A 208 who creates workspace B) can set one permission setting applicable to all instances of content items 235 for other associated users and/or users associated with the affiliate department 210, for example. A creator may set different permission settings for each content item, which may be the same for different users, or varying for different users.

In each workspace A, B . . . N, when an action is performed on a content item by a given user or any other activity is detected in the workspace, other users in the same workspace may be notified (e.g., in real-time or in near real-time, or not in real-time). Activities which trigger real-time notifications can include adding, deleting, or modifying collaborators in the workspace; uploading, downloading, adding, deleting a content item in the workspace; and/or creating a discussion topic in the workspace.

Specifically, items or content downloaded or edited in accordance with the techniques described in the present disclosure can be cause notifications to be generated. Such notifications can be sent to relevant users to notify them of actions surrounding a download, an edit, a change, a modification, a new file, a conflicting version, and/or an upload of an edited or modified file.

In one embodiment, users can interact, using user interface 104 to interface with the web-based collaboration platform. Users can, via the same interface, create action items (e.g., tasks) and delegate the action items to other users including collaborators pertaining to a content item 215, for example. The collaborators 206 may be in the same workspace A 205 or the user may include a newly invited collaborator. Similarly, in the same user interface where discussion topics can be created in a workspace (e.g., workspace A, B or N, etc.), actionable events on content items can be created and/or delegated/assigned to other users such as collaborators of a given workspace or other users. Through the same user interface, task status and updates from multiple users or collaborators can be indicated and reflected. In some instances, the users can perform the tasks (e.g., review or approve or reject, etc.) via the same user interface.

Figure 3:
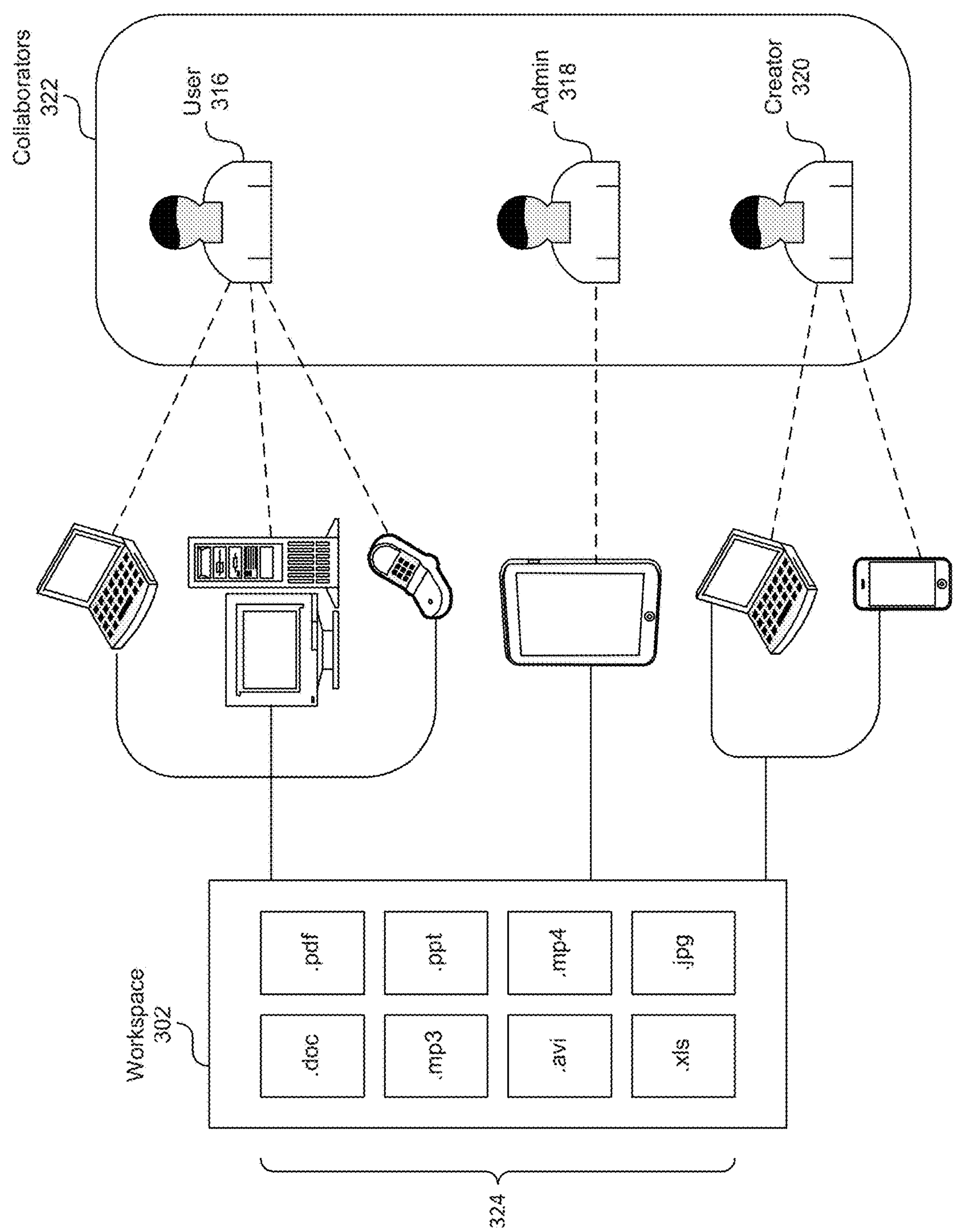
FIG. 3 depicts an example diagram of a workspace in an online or cloud-based collaboration platform accessible by multiple collaborators through various devices authorized to access the workspace.

FIG. 3 depicts an example diagram of a workspace 302 in an online or cloud-based collaboration platform accessible by multiple collaborators 322 through various devices authorized to access the workspace.

Each of the users (e.g., user 316, admin 318, or creator 320) can individually use multiple different devices to access and/or manipulate instances of content items 324 in the workspace 302 with which the content items are associated. For example, the users can be collaborators on a project to which content items 324 are relevant. Since the content items 324 are hosted by the collaboration platform (e.g., a cloud-based platform), each user can access the content items 324 anytime from any physical location using any device (e.g., including devices they own or any shared/public/loaner device).

Content items to be edited or viewed can be accessed from the workspace 302 in accordance with the platform- and/or application-independent mechanisms. Users can also be notified of access, edit, modification, and/or upload related actions performed on content items 324 by other users or any other types of activities detected in the workspace 302. For example, if user 316 modifies a document, one or both of the other collaborators 318 and 320 can be notified of the modification in real-time, or near real-time, or not in real-time. The notifications can be sent through any or all of the devices associated with a given user, in various formats including one or more of, email, SMS, or via a pop-up window in a user interface that the user uses to access the collaboration platform. In the event of multiple notifications, each notification can be depicted preferentially (e.g., ordering in the user interface) based on user preferences and/or relevance to the user (e.g., implicit or explicit).

For example, a notification of an activity such as a download, access activity, read activity, write activity, edit activity, and/or upload related activities can be presented in a feed stream among other notifications through a user interface on the user device according to relevancy to the user determined based on current or recent activity of the user in the web-based collaboration platform.

Skills Overview

Migration to cloud-based storage of data has facilitated access to more and more digital information. While users have more information at their fingertips than ever before, the vast volume of information has made it challenging for users to derive meaning from the information. To address these challenges, a framework is introduced herein that leverages emerging data processing technologies to derive or extract insights or other information from content stored in a cloud-based collaboration platform.

FIG. 4A1 shows a diagram that illustrates a Skills environment 413 for integrating data processing technologies with a cloud-based collaboration platform using the herein-disclosed framework. As shown in FIG. 4A1, a framework 410 can be implemented between a content hosting system such as a cloud-based collaboration platform 414, and one or more data processing technologies 412. As will be described in more detail, the one or more data processing technologies 412 may be offered by one or more third-party vendors as data processing services accessible via application program interfaces (APIs). The framework 410 can be used to facilitate processing of a content item 402 that is uploaded into a hosting system of the one or more data processing technologies 412.

In exemplary embodiments, the hosting system of the one or more data processing technologies 412 is situated in a first network domain and the cloud-based collaboration platform 414 is situated in second network domain. In some embodiments, the framework 410, which comprises the aforementioned integration layer may be in a third network domain. In this and other configurations, even though the data processing services may be executed in a network domain that is different from the network domain of the cloud-based collaboration platform 414, access to the data processing services is provided from the domain of the hosting system of the one or more data processing technologies.

As shown in FIG. 4A2, a user may interact with a user device that hosts a browser 455 and or an application running on the user device such that the user can navigate through content items that are shown in a content item display 454. As such, a user can indicate (e.g., using the user interface of the browser or the user interface of the content item display) a content item of particular interest. The shown integration layer 411 includes all or part of the framework 410, and may include application programming interfaces to communicate to/from hosts of the data processing technologies and/or application programming interfaces to communicate to/from components of the cloud-based collaboration platform. As such, the integration layer, either singly, or in combination with any of its components may trigger execution of the data processing services (e.g., based on events raised within the cloud-based collaboration platform, or based on events raised within the framework) and receive outputs of the data processing services. As can be seen from this architecture, the data processing services are plugged-in to the integration layer 411 rather than into the browser or application running on the user device. More specifically, network interfaces to and from any of the external data processing services, and/or corresponding APIs that facilitate communication to and from any of the external data processing services are plugged-in to the integration layer, not into the browser. The invocation of a data processing service to perform a particular function on a particular content item may be triggered by one or more plug-ins of the integration layer (e.g., via a set of corresponding APIs that facilitate communication to and from any of the external data processing services) in response to user interaction with a browser.

As used herein, a plug-in is executable code, with or without corresponding data or metadata that facilitates communication between the cloud-based collaboration system and any one or more hosts of data processing services. The interfaces of such plug-ins can be called from components of the cloud-based collaboration system and/or can be called from one or more hosts of data processing services.

The aforementioned plug-ins may be registered with the integration later. A registration process may be facilitated by an application programming interface provided for access to the integration layer for the purpose of registration of a data processing service with the integration layer, which in turn may register the existence of the data processing service with components of the cloud-based collaboration platform 414. In example embodiments, the registration process includes (1) registration of the domain of the host of the data processing service, (2) registration of a mechanism to invoke the data processing service from the integration layer, (3) registration of the function of the data processing service, (4) registration of one or more characteristics of inputs to the data processing service (e.g., specification of file format of the inputs, specification of a function-to-file format mapping, etc.), (5) registration of one or more characteristics of outputs from the data processing service (e.g., specification of file format of the outputs), and (6) confirmation that the registration process has completed successfully.

In some situations, aspects of the registration process may include establishment of permissions. For example, during registration, the integration layer may correlate a set of permissions, (e.g., invocation permissions, invocation restrictions, invocation quotas, etc.) to a particular customer of the cloud-based collaboration platform. Also, in some situations, during registration, the integration layer may correlate a set of metering and billing parameters, (e.g., metered costs, mechanisms for automated billings, etc.) to a particular customer of the cloud-based collaboration platform.

Note that although depicted as separate components in FIG. 4A1 and FIG. 4A2, in some embodiments, one or more of the framework 410 and/or the data processing technologies 412 may be integrated into the cloud-based collaboration platform 414.

Figure 4B:
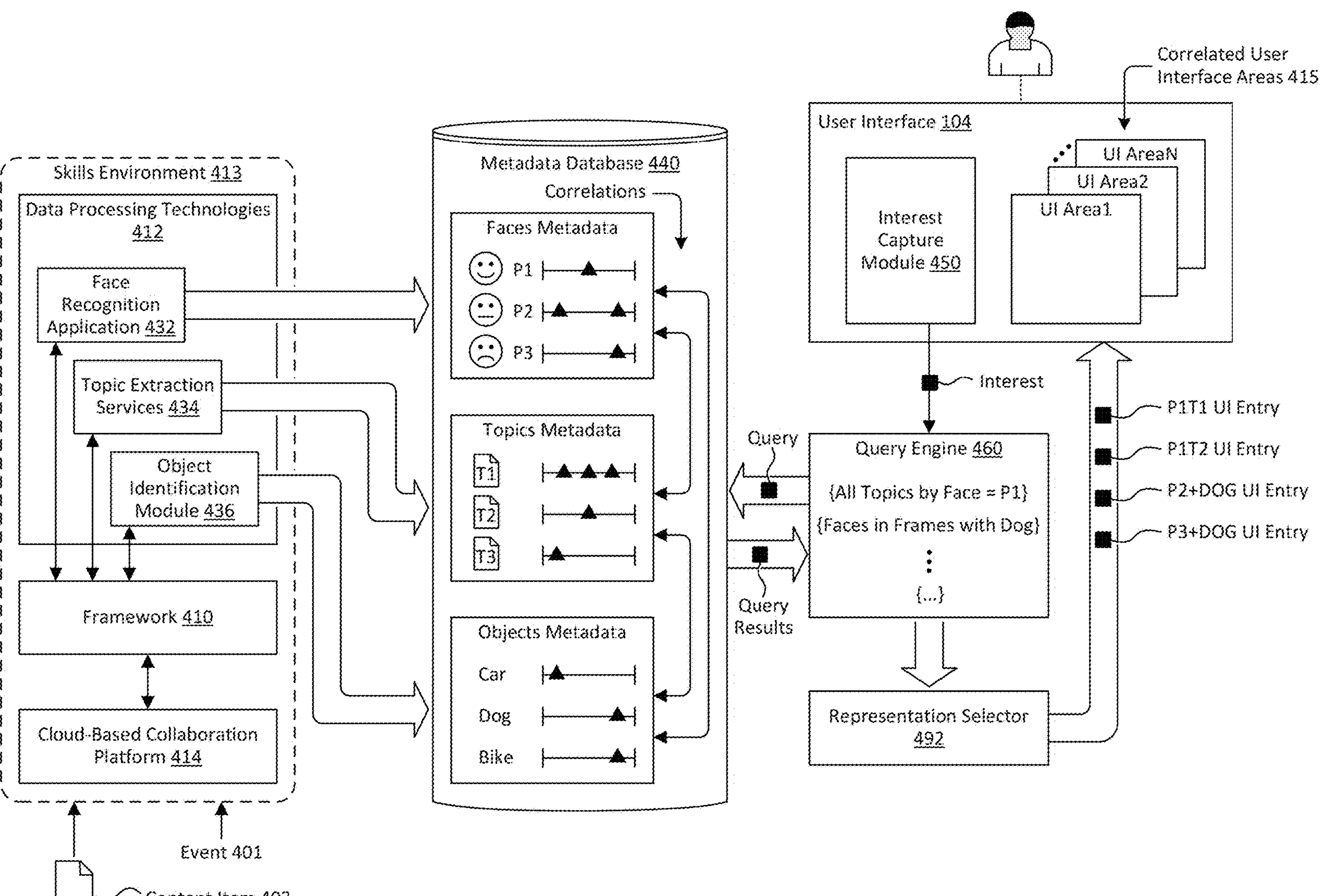

FIG. 4B presents a diagram that illustrates examples for integrating Skills that use data processing technologies with a cloud-based collaboration platform using the general framework to implement an integration layer. FIG. 4B shows how an event pertaining to a content item can cause that content item 402 to be processed within Skills environment 413 to produce set of correlated user interface areas 415

As shown, a Skills environment 413 comprises three components, specifically the shown data processing technologies 412, a cloud-based collaboration platform 414 and a framework 410 that serves as an integration layer between the cloud-based collaboration platform 414 and the data processing technologies 412. In this embodiment, strictly as an illustrative example, the data processing technologies 412 comprises a face recognition application 432, a set of topic extraction services 434, and an object identification module 436.

Given a content item 402 that is uploaded into the cloud-based collaboration platform (e.g., a video clip) and an event 401 that specifies at least some aspects of desired output(s) and how the outputs are to be correlated with each other, the integration layer invokes specific ones of the data processing technologies. In this example, the content item 402 is a video clip. Event 401 specifies that the video clip is to be processed for (1) extraction of faces from the video clip, (2) extraction of topics from the video clip, and (3) extraction of objects from the video clip. As shown, this is accomplished by the face recognition application, the topic extraction services 434 and the object identification module. Each of the constituents of the data processing technologies produce outputs that are stored in a metadata database 440 and/or in any alternative storage device, whether volatile or non-volatile to at least temporarily hold stored data. As indicated above, the event 401 includes information that specifies how the outputs are to be correlated. Accordingly, each of the triggered data processing services produces output that observes the specified correlation. In this example scenario, the correlation might be the timecode of the video clip. As such, the faces metadata is correlated with the topics metadata by timecode, and the topics metadata is correlated with the objects metadata and vice versa such that, for example, the person or persons involved in a discussion of a particular topic at a particular timecode can be identified by their face. As another example, the person or persons that appear (e.g., by their face) in the same scene as a recognized object (e.g., "Car", "Dog", "Bike") can be identified by their face. The foregoing example characterizes a correlation by timecode, however, in another scenario, the correlation might be a page of a document or a slide from a presentation, or a chapter from an eBook, etc.

The shown user interface 104 includes an interest capture module 450 that serves to engage a user through the user interface to determine what a user might want to see in other UI areas, and how the user might want to see it in the other UI areas. For example, a user might indicate an interest in seeing a graphical depiction of "Which people were present when topic 'Ti' was being discussed", or "Which people were present when dogs were present in the scene". The interest capture module 450 is configured with screen devices such as checkboxes, and/or text boxes, and/or drop-down menus, and/or carousels, etc., which screen devices serve to confirm (e.g., through UI interactions) the areas of interest to the user. Based on the captured confirmations, the interest capture module 450 may formulate input (e.g., a query) to submit to query engine 460. The query engine in turn interfaces with the metadata database 440 to retrieve data corresponding to the submitted query. The metadata database 440 may be stored at and be accessible from any location. For example, the metadata database 440 may be stored and managed from within the cloud-based collaboration platform 414 or, the metadata database may be stored and managed from within the framework 410 or, the metadata database may be stored and managed from any other location. In example embodiments, contents of the metadata database 440 are accessible through query engine 460, which many comprise a query interface that receives and processes queries that are formulated in a query language. Such a query language can codify aspects of search terms, search predicates, and query results output specifications, etc.

The returned query results are further processed by a representation selector 492 that combines query results from one or more queries to form widgets or other entries that can be displayed on any one or more UI areas of the user interface 104. In example embodiments, combining query results from multiple queries operates by correlating a first query result with a second query result. Such a correlation operates by determining a common metric for correlation (e.g., a common set of timecodes). When two or more sets of query results correspond to the same metric, aspects of the two or more sets of query results can be aligned with respect to the common metric.

The foregoing example characterizes a correlation by a common timecode, however, in another scenario, the common metric for the correlation might be a page number of a document or a slide number from a presentation, or a chapter from an eBook, etc. Additional scenarios and corresponding processes are shown and discussed as pertains to FIG. 5.

Figure 5:
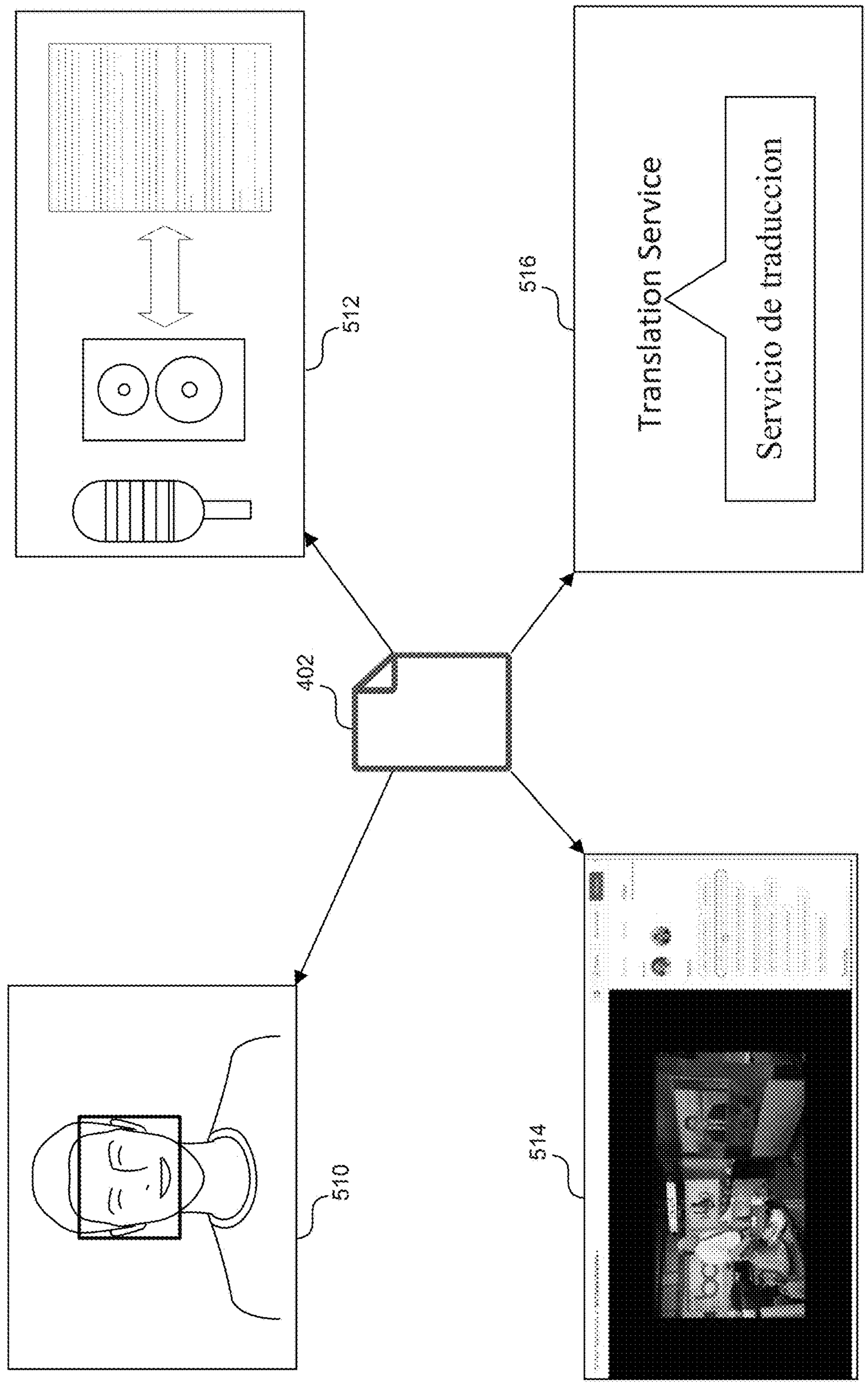
FIG. 5 depicts additional example scenarios that invoke processes to be applied to a digital content item to derive or extract insights or other information.

FIG. 5 depicts additional example scenarios that invoke processes to be applied to a digital content item to derive or extract insights or other information. As shown in FIG. 5, the processing applied to a digital content item to derive or extract insights or other information can include, for example, image processing 510 (e.g., for object detection, object identification, face recognition, optical character recognition (OCR), topic or keyword extraction, etc.), speech recognition and/or transcription 512, intelligent video analytics 514, and translations 516. For example, an uploaded instance of content item 402 in the form of a digital image may be automatically processed by one or more image-based digital processing services to detect objects appearing in the digital image and to generate keyword metadata based on the detected objects. These example applications are provided for illustrative purposes and are not to be construed as limiting. A person having ordinary skill will recognize than any other types of processing of digital information may similarly be applied using the techniques introduced herein.

For context, and referring again to FIG. 4A1, framework 410 can be generalized to enable rapid scaling and adoption of new data processing technologies for integration with a cloud-based collaboration platform 414. Processing applications can be conceptualized within this general framework as "Skills." In this context, a "Skill" may refer to a module that operates within or in conjunction with framework 410 to handle the processing of particular content items, using one or more data processing technologies 412 to derive or extract a particular insight or some other information associated with the content item. As an illustrative example, an OCR Skill module may be configured to process images of documents (e.g., in .pdf format) uploaded to a cloud-based collaboration platform 414 to identify and extract textual information. To perform this processing, the OCR Skill module may call, invoke, request, or otherwise access one or more external vendors that provide OCR processing services (e.g., Microsoft® Azure, Google® Cloud Vision, etc.) to process an uploaded image. In some embodiments, a Skill can be configured to chain the functionality of multiple data processing services to provide a particular set of insights or solve a particular challenge. As an illustrative example, an enterprise such as a ride-sharing service may implement a Skill to validate the drivers' licenses of contracted drivers. A Skill for validating drivers' licenses may chain together multiple other Skills to, for example, perform OCR, face recognition, text extraction, translation, etc. An example Skill configured for validating drivers' licenses is described in more detail with respect to FIG. 11A.

FIG. 6A, FIG. 6B, FIG. 6C and FIG. 6D are diagrams that describe some example Skills that may be implemented within a framework 410 associated with a cloud-based collaboration platform 414. The example Skills depicted in FIGS. 6A-6D are provided for illustrative purposes and are not to be construed as limiting. As will be apparent, a Skill may be set up within a framework 410 to process any type of content using any one or more data processing technologies.

Figure 6A:
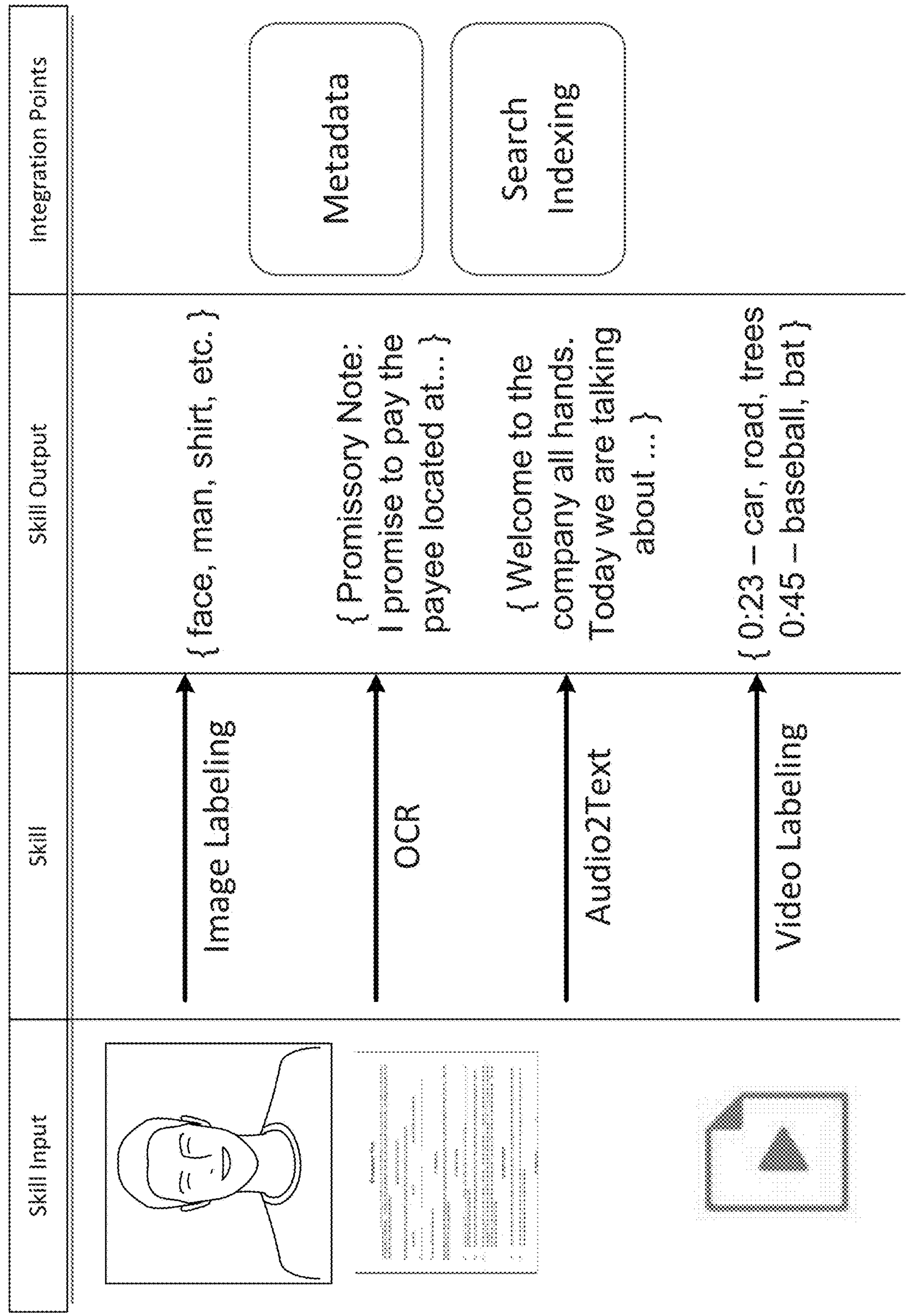
FIG. 6A, FIG. 6B, FIG. 6C and FIG. 6D are diagrams that describe some example processes that may be implemented within a framework associated with a cloud-based collaboration platform to derive or extract insights or other information from stored content items.

FIG. 6A depicts some example Skills related to the structuring of content. For example, as shown in FIG. 6A, an image labeling Skill may receive an uploaded image as an input, process the input image and then output information based on processing of the image. For example, the image labeling Skill may access one or more external image processing services (e.g., Microsoft® Azure, Google® Cloud Vision, etc.) to process the image using machine learning-based computer vision technology. The Skill may return a set of textual information that includes tags indicative of objects or characteristics identified in the image. Similarly, an audio-to-text Skill may receive an uploaded audio file as an input and then output information such as identified keywords, transcriptions, lyrics, etc. Similarly, a video labeling Skill may receive an uploaded video file as an input and then output information such as tags indicative of objects or characteristics identified in an uploaded video. Information returned by such Skills may then be automatically integrated into the cloud-based collaboration platform as metadata associated with the content. This integration of information associated with the content may help to solve the problem of managing unstructured content (e.g., images, video, audio, etc.) in a cloud-based collaboration platform. Instead of requiring manual categorizing and labeling of unstructured content, metadata is automatically generated using Skills such as those depicted in FIG. 6A.

Further, because the Skills are configured to operate within a general framework, the set of available Skills to process content can be expanded and/or updated to meet the needs of the users of the cloud-based collaboration platform. For example, although not depicted in FIG. 6A, additional Skills for the structuring of content may be implemented that apply intelligent content extraction. In an embodiment pertaining to intelligent content extraction, a Skill may first recognize a type of content item to be processed and then extract information from the content item based on the processing. As an illustrative example, an intelligent content extraction Skill may recognize an uploaded image as a scan of a promissory note (e.g., by comparing to a database of known document templates). In response, the intelligent content extraction Skill may specifically extract (e.g., using OCR) certain key information from the uploaded image such as an identification of the promisor and promise, the terms of the promise, the date, signatures, etc. Other examples of intelligent content extraction include specifically extracting a company logo from a scanned letter, identify a topic of a piece of content, extract certain components from a content item, etc.

Figure 6B:
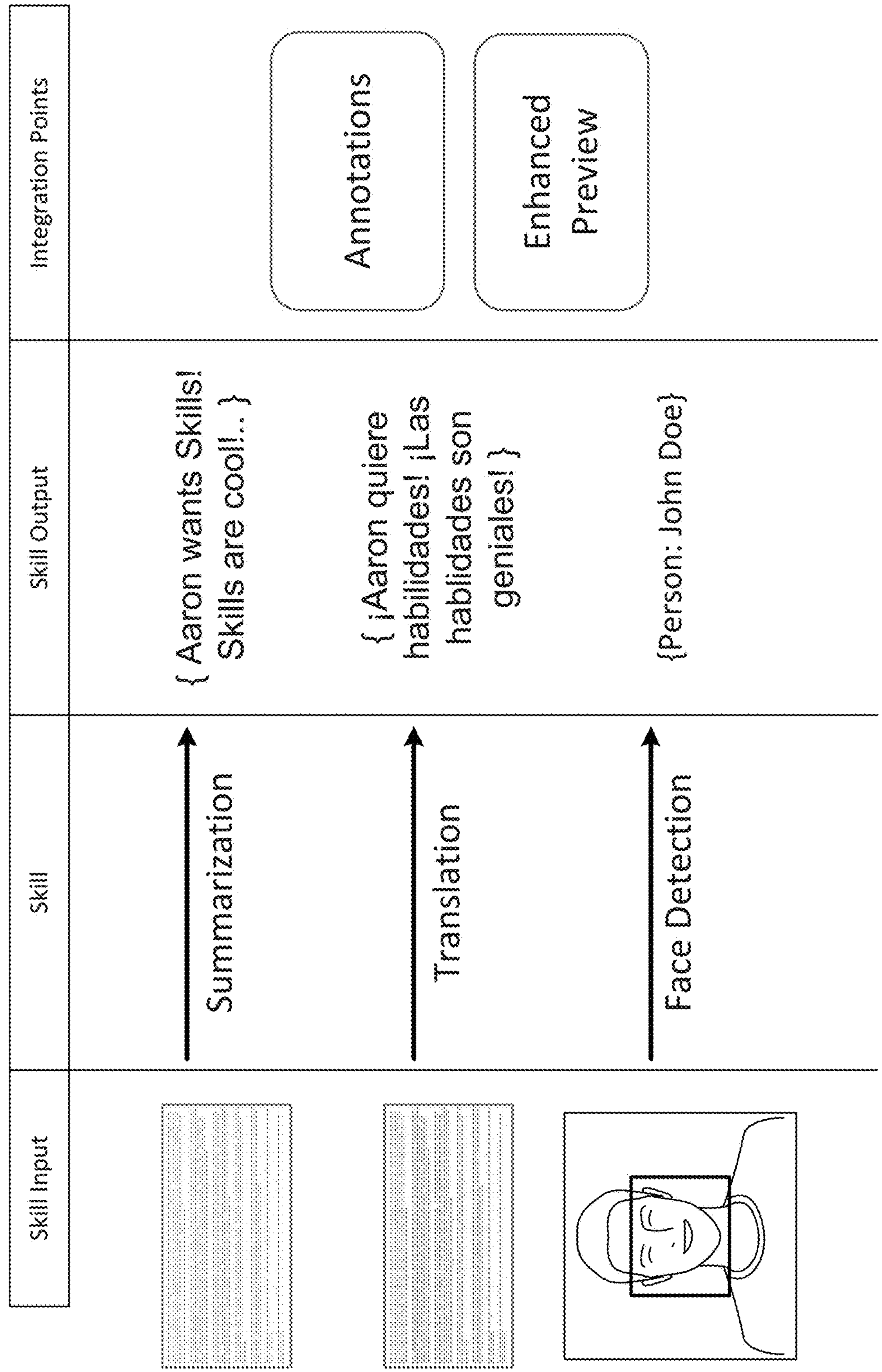

FIG. 6B depicts some example Skills related to intelligent content assistance. For example, as shown in FIG. 6B, a summarization Skill may receive an uploaded content item (e.g., a text-based document) and output a summarization of the content based on a processing of the content item. For example, the summarization Skill may access one or more external intelligent data processing services to process the content item using machine learning and may return a textual summary of the content item. Similarly, a translation Skill may receive an uploaded content item in one language (e.g., text, audio, video, etc.) and output a translation of the content item in another language. Such a Skill may access an external translation service such as Google® Translate to process the content item. A face detection Skill may receive an image or video as an input and then output information indicative of an identity of a person depicted in the image or video. Such a skill may access an external face recognition service such as the Microsoft® Azure Face API to process the image or video. Information returned by such Skills may then be automatically integrated into the cloud-based collaboration platform, for example, as metadata associated with the content (e.g., a personal identification), a transformed version of the content (e.g., a translation), and/or a generated preview of the content (e.g., a summary). This integration of information associated with the content may help users to better understand the content stored in the cloud-based collaboration platform. Further, as previously mentioned, the set of available Skills related to intelligent content assistance may be expanded and/or updated to meet the needs of users of the cloud-based collaboration platform. Although not depicted in FIG. 6B, additional Skills for intelligent content assistance may be implemented, for example, to automatically detect inappropriate materials, interpret graphs or other visualizations, etc.

Figure 6C:
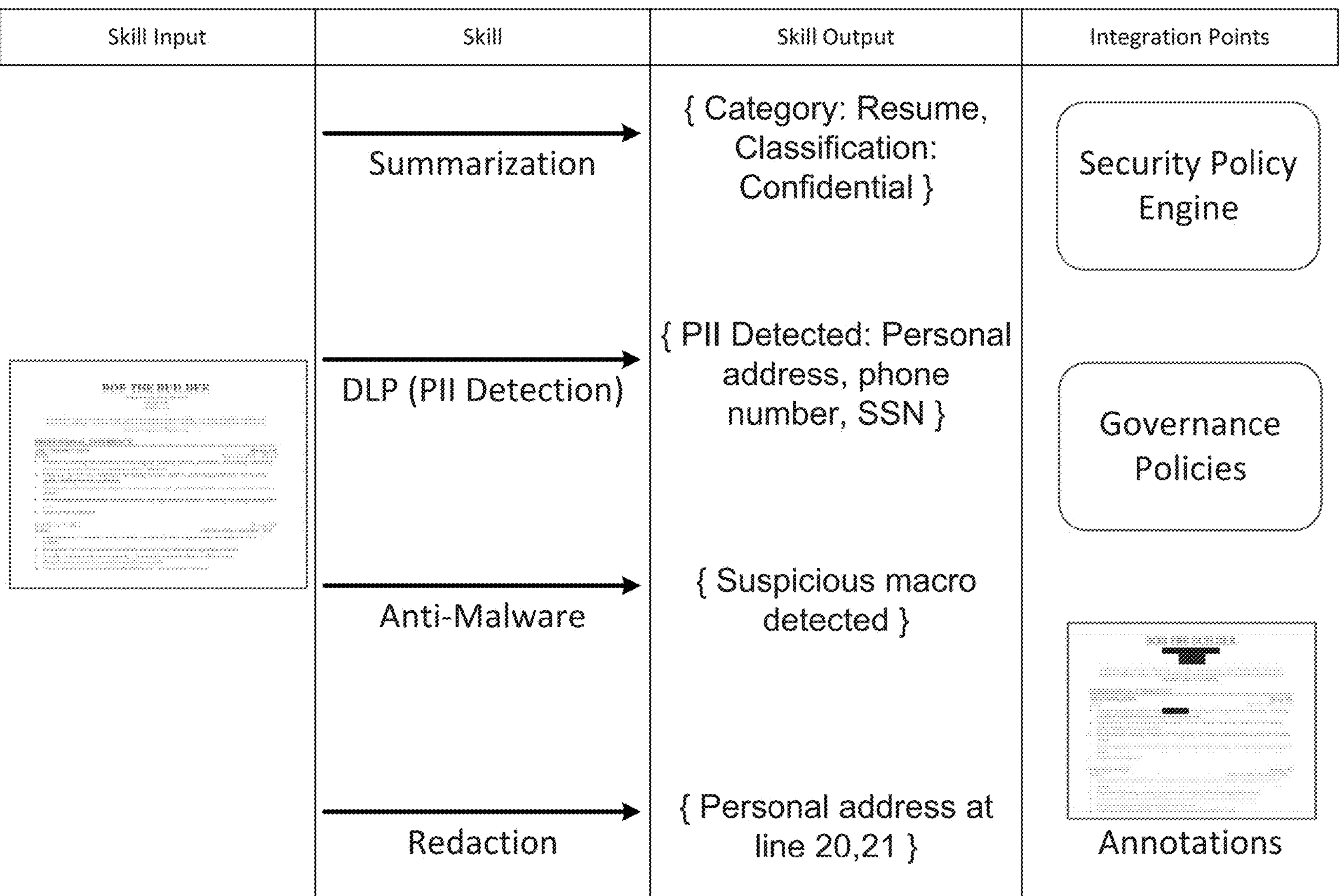

FIG. 6C depicts some example Skills related to security and policy governance. For example, as shown in FIG. 6C, a category/classification Skill may receive an uploaded content item as an input and then output information indicative of a classification of that content item. For example, the resume depicted in FIG. 6C is processed by the category/classification Skill, which then outputs information identifying the content as a resume and identifying the content as including classified information. A personally identifiable information (PII) detection Skill might take that same content item and output a set of PII such as a name, address, identification number, etc. that is represented in the content item. A network security Skill (e.g., anti-malware detection) may process the content item to determine if it contains any malicious software. A redaction Skill may process the content item to redact certain portions of the content item including sensitive information (e.g., classified information, PII, etc.). Information returned by such Skills may then be automatically integrated into the cloud-based collaboration platform, for example, as metadata associated with the content (e.g., a category or classification), a transformed version of the content (e.g., a redacted version), and/or as inputs into certain automated network security and policy governance workflows. For example, a security policy engine of a cloud-based collaboration platform may automatically delete or clean an uploaded content item in response to detection, by a network security Skill, of some type of malicious software in the content item. As another example, a policy governance engine may automatically set permissions for other users accessing the content item based on a classification of the content item or any sensitive information (e.g., PII) detected in the content item. This integration of information associated with security and policy governance may help avoid the failure of such policies due to the manual inspection of content. Accordingly, the effectiveness of existing security and policy governance in the cloud-based collaboration platform can be improved. Further, as previously mentioned, the set of available Skills related to security and policy governance may be expanded and/or updated to meet the needs of users of the cloud-based collaboration platform. For example, although not depicted in FIG. 6C, additional Skills for security and policy governance may be implemented, for example, to achieve other data loss prevention (DLP) goals such as automatically encrypting content that includes sensitive information.

Figure 6D:
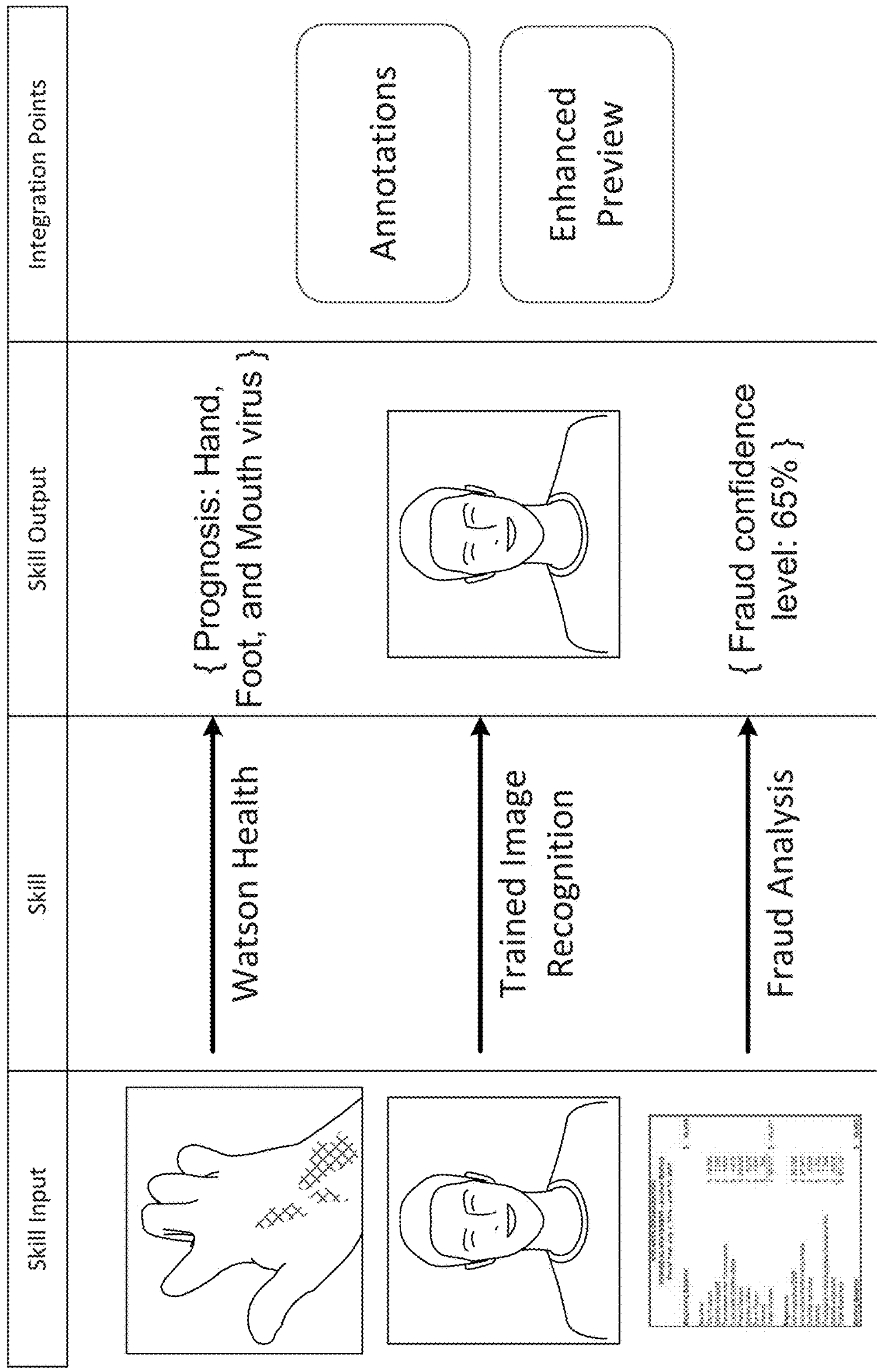

FIG. 6D depicts some example Skills related to hypothesis generation. For example, as shown in FIG. 6D, a health diagnosis/prognosis Skill may receive an uploaded content item such as a digital image or a list of symptoms and may output information providing a health diagnosis and/or prognosis. The health diagnosis/prognosis Skill may access external health services to process the content item. For example, the external health service such as IBM® Watson Health uses machine-learning to analyze health related information and produce an output such as a diagnosis or prognosis. As another example, a fraud analysis Skill may receive an uploaded document and output an indication on whether a the document is fraudulent. This indication may be expressed in the form of a level of confidence that the document is fraudulent. Information returned by such Skills may then be automatically integrated into the cloud-based collaboration platform, for example, as metadata associated with the content, annotations in the content, or may trigger automated alerts (e.g., in response to fraud detection). This integration of information associated with a generated hypothesis can help assist users in reviewing and analyzing content, for example, by automatically providing actionable information regarding the content. Further, as previously mentioned, the set of available Skills related to hypothesis generation may be expanded and/or updated to meet the needs of users of the cloud-based collaboration platform. For example, although not depicted in FIG. 6D, additional Skills for hypothesis generation may be implemented, for example, to detect plagiarism in a document, diagnose mechanical failures, perform sentiment analysis of audio and/or text, etc.

Example Framework Architecture

Figure 7:
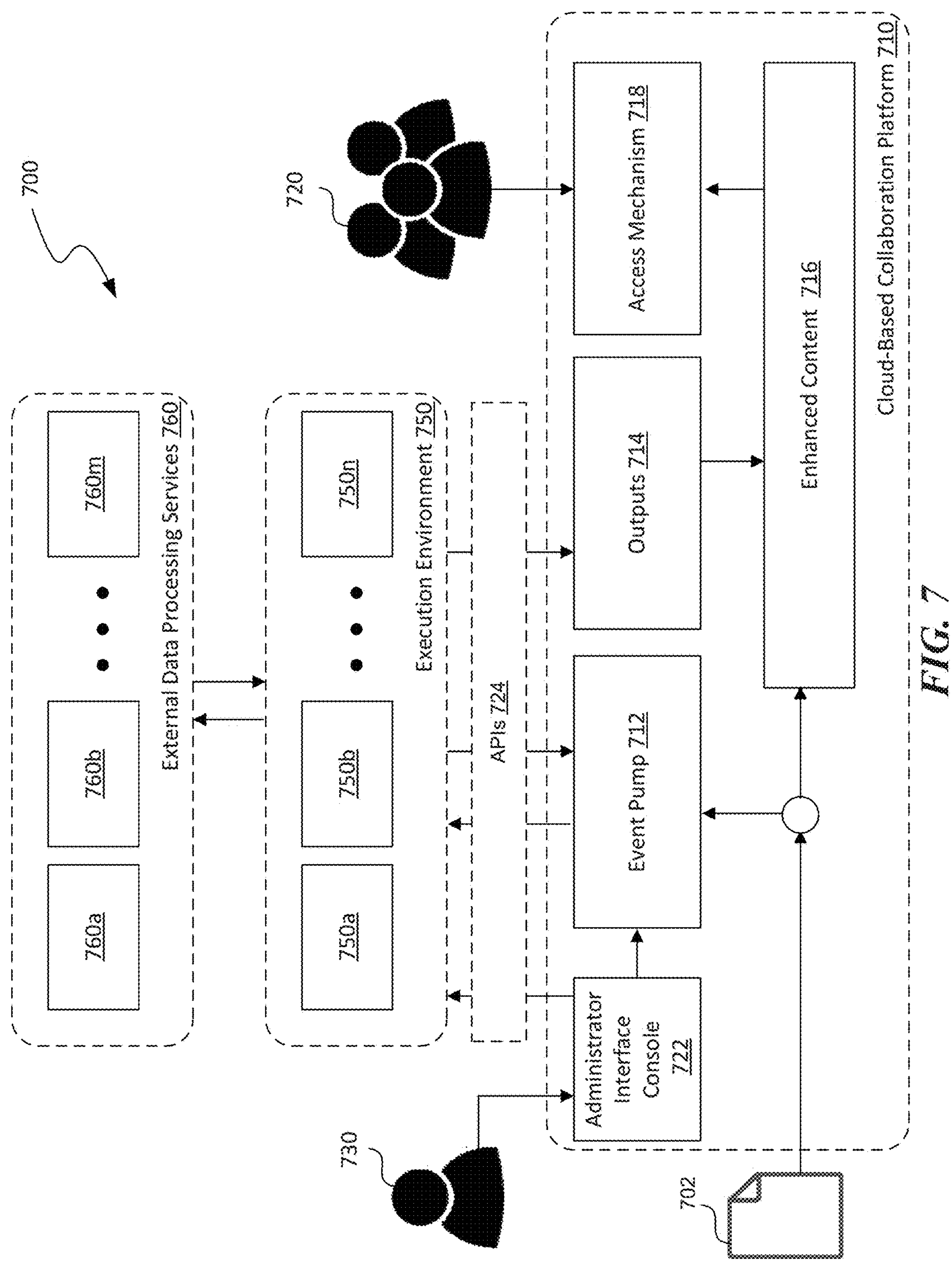
FIG. 7 shows a high-level diagram of an example framework architecture for implementing various Skills with a cloud-based collaboration platform.

FIG. 7 shows a high-level diagram of an example framework architecture 700 for implementing various Skills with a cloud-based collaboration platform 710. The cloud-based collaboration platform 710 depicted in FIG. 7 may be the same or similar to the cloud-based collaboration platform described with respect to FIGS. 1-3.

As shown in FIG. 7, the framework architecture 700 further includes an execution environment 750 in which Skills are authored and/or executed. In an embodiment, one or more Skills are executed by one or more execution entities 750*a*-*n* that operate in the execution environment 750. Each execution entity may represent a particular processing instance for performing a particular Skill. For example, an image processing Skill may be associated with multiple execution entities (any two or more of the set of execution entities 750*a*-*n*) at any given time, each tasked with performing the image processing Skill with respect to a particular content item. In other words, two images uploaded by different collaborators may lead to triggering or otherwise invoking two execution entity instances to process the two images. Although depicted separately, the execution environment 750 may reside within the cloud-based collaboration platform 710. For example, the one or more execution entities 750*a*-*n* implementing the one or more Skills may execute at server devices operated by a provider of the cloud-based collaboration platform. Alternatively, or in addition, the execution environment 750 may be hosted in a public cloud computing platform. For example, in an embodiment, the execution environment 750 is hosted by a public cloud-computing platform such as Amazon® AWS, wherein each of the one or more execution entities represent an on-demand serverless processing entity such as an AWS Lambda instance. An AWS Lambda instance is generally understood to be a computing service that runs code in response to triggering events and automatically manages computing resources within the execution environment 750 to run the code. Other examples of third-party computing platforms similar to Amazon® AWS include Google® Cloud Functions and Microsoft® Azure Functions.

Configuring the framework architecture 700 to execute Skills using a public cloud-based execution environment such as Amazon® AWS may be beneficial in certain implementations because it allows for scaling in response to user demand. For example, as will be described in more detail, the execution entities (e.g., AWS Lambda code) may be triggered in response to events occurring with respect to content items 702 in the cloud-based collaboration platform. As more content items 702 are introduced and more activities occur with respect to the content items 702, the execution environment 750 may automatically and seamlessly scale the number of execution entities handling the execution of Skills without negatively impacting the performance of the cloud-based collaboration platform.

In some embodiments, the cloud-based collaboration platform is configured to communicate data to the one or more execution entities running in a commercially-available type of cloud-based execution environment using event-based webhooks (e.g., webhooks 3.0) and file-specific tokens. For example, a webhook may be configured within the integration layer to transmit notifications to execution entities in response to detecting upload events associated with content items 702. The webhook message may include a file-specific token associated with the uploaded content item that permits the one or more execution entities running in the execution environment 750 to access the uploaded item. Communications between entities operating as part of the cloud-based collaboration platform and the entities in the execution environment 750 may be over one or more computer networks comprising any number of network interfaces such as the network interfaces described with respect to FIG. 1.

As mentioned, each of the one or more execution entities may be associated with a particular Skill configured to process a content item to return outputs 714, for example, derived or extracted insights, or other information. As an illustrative example, the execution entity 750*a* may be associated with a face recognition Skill and be automatically triggered in response to uploading an image file into the cloud-based collaboration platform.

In some embodiments, each of the one or more execution entities may access one or more external data processing services 760*a-m* in order to process a content item. In other words, while the execution entity may include logic that governs handling of a content item to execute a Skill, the actual processing (e.g., OCR, translation, transcription, etc.) of the content item according to the Skill may be performed by one or more external data processing services 760*a-m*.

In some embodiments, the one or more external data processing services 760*a-m* may be provided by third-party vendors that are external to both the cloud-based collaboration platform and the execution environment 750. Examples of third-party data processing services include Google® Cloud (e.g., Vision API, Translation API, Natural Language API, Video Intelligence API, DLP API, etc.), Microsoft® Azure (e.g., Machine Learning, Face API, Computer Vision API, Translator API, etc.), IBM® Watson (e.g., Watson Health), Skyhigh® (e.g., enterprise DLP), etc. As implied by the list of examples, the one or more data processing services may use advanced machine learning-based cognitive services that make use of the computing power of large-scale cloud-computing platforms such as those provided by vendors like Amazon, Google, Microsoft, and IBM. The data processing services provided by such third-party vendors may be accessible via APIs. For example, the Google® Cloud Speech API is configured to receive requests including uploaded audio files and to convert the uploaded audio files into textual information. As applied to the framework architecture 700, an execution entity associated with an audio-to-text Skill may process an audio file of the cloud-based collaboration platform by transmitting the audio file and a request to the Google® Cloud Speech API. In response, the Google® Cloud Speech API may return text-based information (e.g., a transcript, identified keywords, etc.) to the execution entity associated with the audio-to-text Skill.

As alluded to above, the example framework architecture 700 depicted in FIG. 7 may be configured as an event-based architecture. In other words, the execution of Skills to process content items 702 within the frame work architecture 700 may be automatically triggered in response to events occurring with respect to the content items. FIG. 7 shows an event pump 712 as a component of the framework architecture 700. The event pump 712 in this context may be generally understood as a notification queue that is involved in the triggering of Skills in response to certain events occurring with respect to content items 702 in the cloud-based collaboration platform. As an illustrative example, the event pump 712 may be configured to notice when content of a certain type (e.g., images) is uploaded into the cloud-based collaboration platform. In response to noticing this particular event occurring, the event pump 712 passes information associated with the content item and/or the observed event to one or more of the execution entities associated with a particular Skill (e.g., a face recognition Skill). As previously mentioned, in some embodiments, this information is transferred using webhooks.

The information transferred by the event pump 712 in response to detecting the particular event may include any type of information associated with the content item involved in the event or any other information associated with the event. Information associated with the content item may include the content item itself (or a copy thereof), data generated based on a preprocessing of the content item (e.g., a transformation of the content item into a different format, metadata, etc.), a file-specific access token associated with the content item, or any other data associated with the content item. Information associated with the event can include machine data generated in response to the occurrence of the event. This machine data can generally be referred to as "event data." In some cases, event data may include time-stamped machine data (e.g., log data) that describes the associated content item (e.g., a file identifier, token, etc.) and describes the activity (e.g., view, edit, update, revise, comment, download, upload, preview, tag, etc.) that may have occurred with respect to the content item at a particular point in time.

In some instances, event data can have a predefined format, where data items with specific data formats are stored at predefined locations in the data. For example, the event data may include data stored as fields in a database table. In other instances, event data may not have a predefined format, that is, the data is not at fixed, predefined locations, but the data does have repeatable patterns and is not random. This means that some event data may comprise various data items of different data types and that may be stored at different locations within the data. For example, when a data source is an operating system log, an event can include one or more lines from the operating system log containing raw data that includes different types of performance and diagnostic information associated with a specific point in time.

Examples of components that may generate event data include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc. For example, event data may be automatically generated by internal notification components (not shown) of the cloud-based collaboration platform for handling other tasks unrelated to the execution of Skills such as content synchronization across devices, collaborator notifications, and other automated workflows.

As previously mentioned, Skills may be triggered in response to certain events occurring with respect to content items 702 in the cloud-based collaboration platform. Such events are generally referred to as "trigger events." Trigger events can include creation of a new content item, creation of a new folder containing the content item, uploading/downloading the content item, deleting the content item, renaming the content item, reformatting the content item, editing the content item, moving the content item to another folder or workspace, inviting other users to collaborate on the content item, modifying the list of users collaborating on the content item, modifying permissions associated with the content item, generating a link for sharing the content item, viewing the content item, previewing the content item, etc. As an illustrative example, an on-demand translation Skill can be triggered in response to detecting any one or more of the following events: a user request to translate a content item, a user viewing the content item, a uploading the content item, etc. Note that this list of example trigger events is provided for illustrative purposes and is not to be construed as exhaustive. Any other type of activity by a user, by the cloud-based collaboration platform, or by any other associated entity may similarly be specified as a trigger event.

In some embodiments, one Skill may be configured to generate events that trigger other Skills. For example, as will be described later, custom Skills may be configured that make use of one or more other built-in Skills. Consider, for example, a set of built-in Skills that include a face recognition Skill, an OCR Skill, an intelligent text extraction Skill, a fraud detection Skill, and a translation Skill. A user (e.g., a developer) may create a custom Skill to validate drivers' licenses for authenticity that is triggered in response to a detected image upload (e.g., a scan of a driver's license). Instead of redefining all the individual sub-processes that may be required to validate a scan of a driver's license, the custom Skill may be configured to generate events that are picked up by the event pump 712 and that cause the triggering of one or more other built-in Skills to process the uploaded image. This concept of custom Skills is described in more detail with respect to FIGS. 10-11.

As previously indicated, in a given implementation of the framework architecture 700, Skills are only executed if they qualify as trigger events. In other words, execution entities associated with a particular Skill should only be triggered if a detected event satisfies some type of criterion associated with the Skill. To this end, the event pump 712 may, in some embodiments, operate to filter only trigger events that meet the criterion (or criteria) from all of the events occurring within the cloud-based collaboration platform. Qualifying criteria in this context may be based on any number of factors. For example, the criteria may be based on an enterprise associated with the cloud-based collaboration platform. In such an example, an enterprise may selectively enable and disable certain Skills by setting the qualifying criteria for an event filter, for example, via an administrator interface console. In another example, the criteria may be based on the file type (e.g., image, video, audio, text, etc.). In such an example, a particular Skill (e.g., face detection) may only be triggered in response to a detected upload of an image file and not in response to a detected upload of a text file. In another example, the criteria may be based on a folder in which the content item is stored. In such an example, a particular Skill may only be triggered in response to a detected upload of a content item into a particular one or more folders. These example criteria are provided for illustrative purposes and are not to be construed as limiting. Other criteria may be based on associated users, type of event, time that an event occurred, geographic location, processing load in the execution environment and/or cloud-based collaboration platform, etc.

Figure 12:
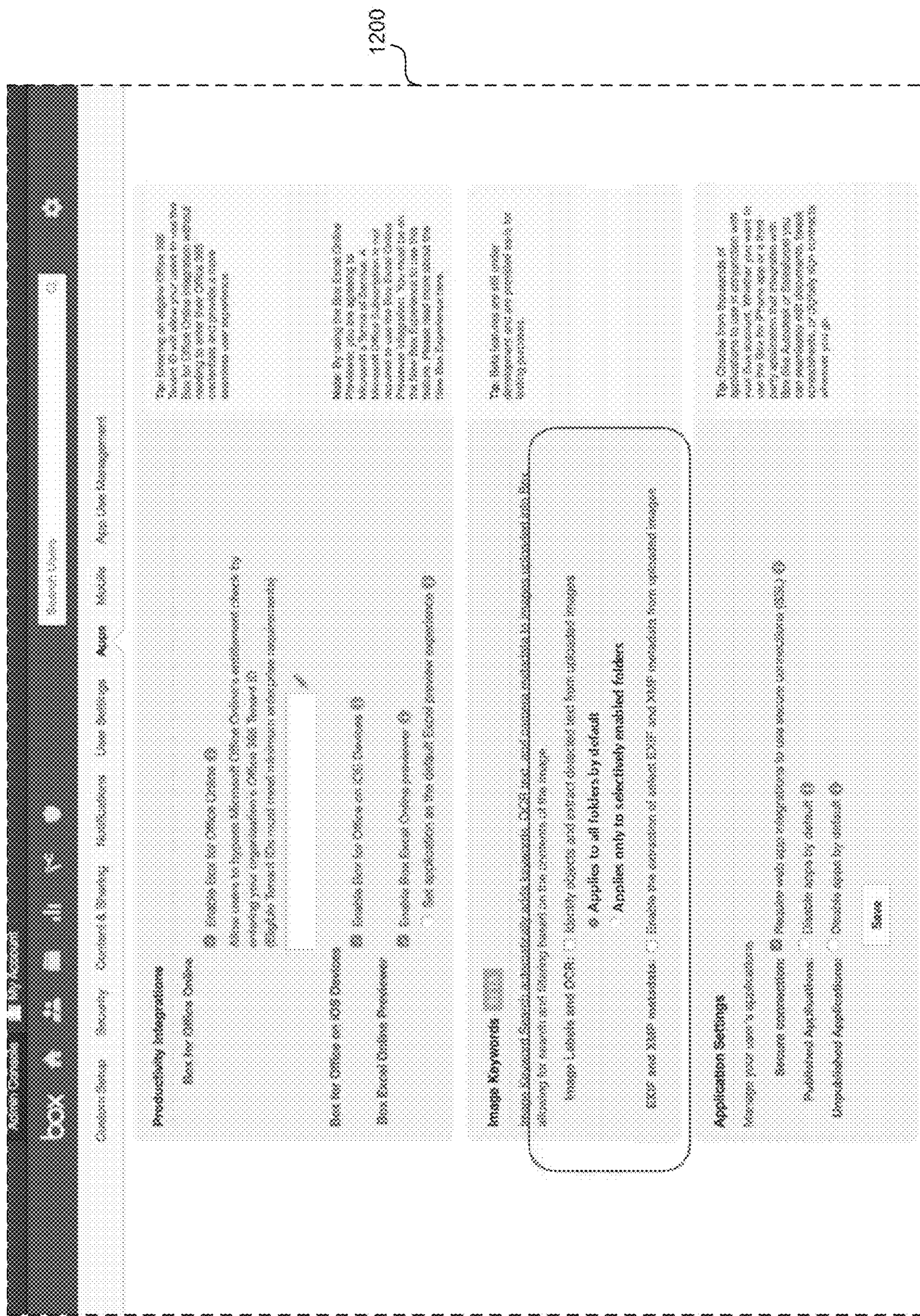
FIG. 12 shows a screenshot of an example user interface an administrator console of a cloud-based collaboration platform.

In some embodiments, an administrator interface console may provide an interface through which to configure various components of the framework architecture 700. For example, as shown in FIG. 7, the administrator interface console 722 may be used to at least configure how events are handled at the event pump 712. As an illustrative example, an administrator 730 may use the administrator interface console to configure certain event criteria that will determine (at least in part) which events trigger the execution of Skills. Consider FIG. 12 that shows a screenshot of an example user interface 1200 of the administrator interface console. As shown in FIG. 12, an administrator 730 is provided an option to define whether a particular Skill is to be applied to all folders or to selectively enabled folders. In this example, the administrator's 730 selection may impact whether the event pump 712 filters out certain events or passes those events on to cause the triggering of the Skill. For example, selection by an administrator 730 to apply the Skill to only selectively enabled folders might configure the event pump 712 to transfer information to the execution environment 750 to trigger execution of the Skill if a particular event (e.g., image upload) is associated with one of the selectively enabled folders. As further indicated in FIG. 7, user interaction at and/or other inputs received by the administrator interface console may, in some cases, configure aspects of the execution entities tasked with executing the Skills. For example, an administrator 730 may provide input on when to execute a given Skill (e.g., in real-time or near real-time as the event is detected, or at a later time as part of a batch process).

Once triggered, an execution entity associated with a particular Skill will process the content item and return some type of output 714. Again, the actual processing of the content item to derive or extract insights or other information from the content item may be performed by an external data processing service. In either case, the output 714 generated based on the processing may be integrated into the cloud-based collaboration platform as enhanced content 716. As previously mentioned, the output 714 may include generated metadata (e.g., image keywords), extracted metadata (e.g., a name or address from a text document), new generated content (e.g., a text transcription of an audio file), a transformed version of the content (e.g., a .pdf of an uploaded .doc file), an edited version of the content (e.g., a redacted text document), a hypothesis indication (e.g., a health diagnosis), a notification, configuration data (e.g., a security policy or governance policy input), or any other type of information based on the processing of the content item.

The specific manner in which output is integrated into the cloud-based collaboration platform as enhanced content 716 may depend on the type of content item as well as the type of Skill generating the output. In some embodiments, output comprising metadata associated with a content item may be stored in the same file or folder as the content item in a repository (e.g., data repository 130) of the cloud-based collaboration platform. Alternatively, or in addition, the metadata can be stored in a separate metadata file or even in a separate metadata repository and linked to the content item in some way. In some embodiments, output comprising a transformed or edited version of the content item may be stored as a separate version of the original uploaded content item or may replace the original uploaded version of the content item. In some embodiments, output comprising a notification may be automatically placed into a notification message (e.g., email, sms text, etc.) and transmitted to one or more users of the cloud-based collaboration platform. In some embodiments, output comprising a security policy or governing policy indication may cause the automatic change in an existing permission setting for a particular content item for a folder or workspace in which the content item resides. For example, uploaded text document may automatically trigger a DLP Skill which returns an indication of whether the document includes PII or not. If the document includes PII, the output may cause the cloud-based collaboration platform to restrict access to the content item only to the uploading user and to any other users specifically invited by the uploading user.

In some embodiments, metadata or other outputs are stored in the cloud-based collaboration platform according to guidelines specified by a provider of the cloud-based collaboration platform. For example, a Skill such as an image keyword extraction Skill may be configured to output keyword metadata generated by an external image processing service for integration into the cloud-based collaboration platform in a format and location specified by the provider of the cloud-based collaboration platform. This may be accomplished, in some embodiments, by configuring the execution entity associated with the Skill to output information via a particular one or more APIs 724 associated with the cloud-based collaboration platform. In some cases, outputs by the execution entity are integrated via multiple API portals. For example, image recognition keywords can be output into an API specifically configured to ingest metadata for search indexing as well as another API specifically configured to ingest metadata for security policy applications.

In some embodiments, a Skill may propose a metadata schema for integrating metadata where the cloud-based collaboration platform does not include specified guidelines. Consider for example, an intelligent form extraction Skill configured to extract and/or generate metadata based on particular types of forms (e.g., an insurance claim form). In such an example, the cloud-based collaboration platform may include general guidelines for storing metadata associated with a content item, but may not include any guidelines for storing the metadata according to a schema that is tailored for business use cases associated with the Skill (e.g., insurance claims). Accordingly, the Skill may be configured to dictate or at least suggest an appropriate schema for integrating the metadata to the cloud-based collaboration platform. In some embodiments, the schema may be predefined by an author of the Skill (e.g., a third-party developer). In other embodiments, a processing entity associated with the Skill (e.g., execution entity) may be configured to generate a schema tailored for the metadata, for example, by applying rules and/or machine learning techniques.

Users 720 of the cloud-based collaboration platform can access the enhanced content 716 via any access mechanism 718 associated with the cloud-based collaboration platform (e.g., those described with respect to FIGS. 1-3). The specific manner in which users 720 access enhanced content may depend on the type of content item as well as the type of Skill generating the output. In an illustrative embodiment, a text-based transcript that is returned as output by an audio-to-text Skill may be integrated into the cloud-based collaboration platform as metadata associated with an originally uploaded audio file. This metadata may be integrated into a text-based search engine associated with the cloud-based collaboration platform such that users can easily search for content included in the stored audio file by submitting text-based searches. In another illustrative embodiment, keywords returned as output by an intelligent video Skill may be integrated as metadata associated with an originally uploaded video that triggered the intelligent video Skill. When viewing the uploaded video, users 720 may be presented with a customized user interface including enhanced metadata-based features such as audio transcripts, topic tags, recognized faces, file information, etc. Examples of such user interfaces are described with respect to FIG. 13A-13F.

A framework architecture for implementing Skills similar to the architecture 700 depicted in FIG. 7 holds several advantages. First, the framework architecture may help to secure the cloud-based collaboration platform from the Skills. Skills have very limited access to the inner workings of the cloud-based collaboration platform when implemented in accordance with the framework architecture 700 depicted in FIG. 7. Processing by an execution entity associated with the Skill can be based on notifications received from an event pump 712 with results returned to the cloud-based collaboration platform via an API. Second, the framework architecture 700 allows for seamless scaling to handle the varying loads of a cloud-based collaboration platform. Third, the modular nature of Skills allows for quick development. A developer need only know certain specifics regarding interface points (e.g., APIs) for the cloud-based collaboration platform and certain specifics regarding network interface points to access the various data processing services in order to develop a powerful data processing services (Skills) for processing content items 702. A range of different types of developers may author such data processing services for use in the framework architecture. For example, a customer (e.g., an enterprise using an enterprise-specific deployment of the cloud-based collaboration platform) may develop a particular data processing service to meet specific business needs. Further, a third-party provider of a data processing service (e.g., Google®, Microsoft®, etc.) may develop further data processing services to encourage integration (e.g., development of plug-ins) between their services and the cloud-based collaboration platform. Also, a provider of a cloud-based collaboration platform may author further data processing services to expand the capabilities of the system by "chaining" or otherwise leveraging the many data processing services offered by third parties. As used herein a data processing service is a collection of executable instructions and computer data that are configured to produce an output based on contents of and/or metadata pertaining to one or more input files that are stored in storage devices of a cloud-based collaboration platform.

Figure 8A:
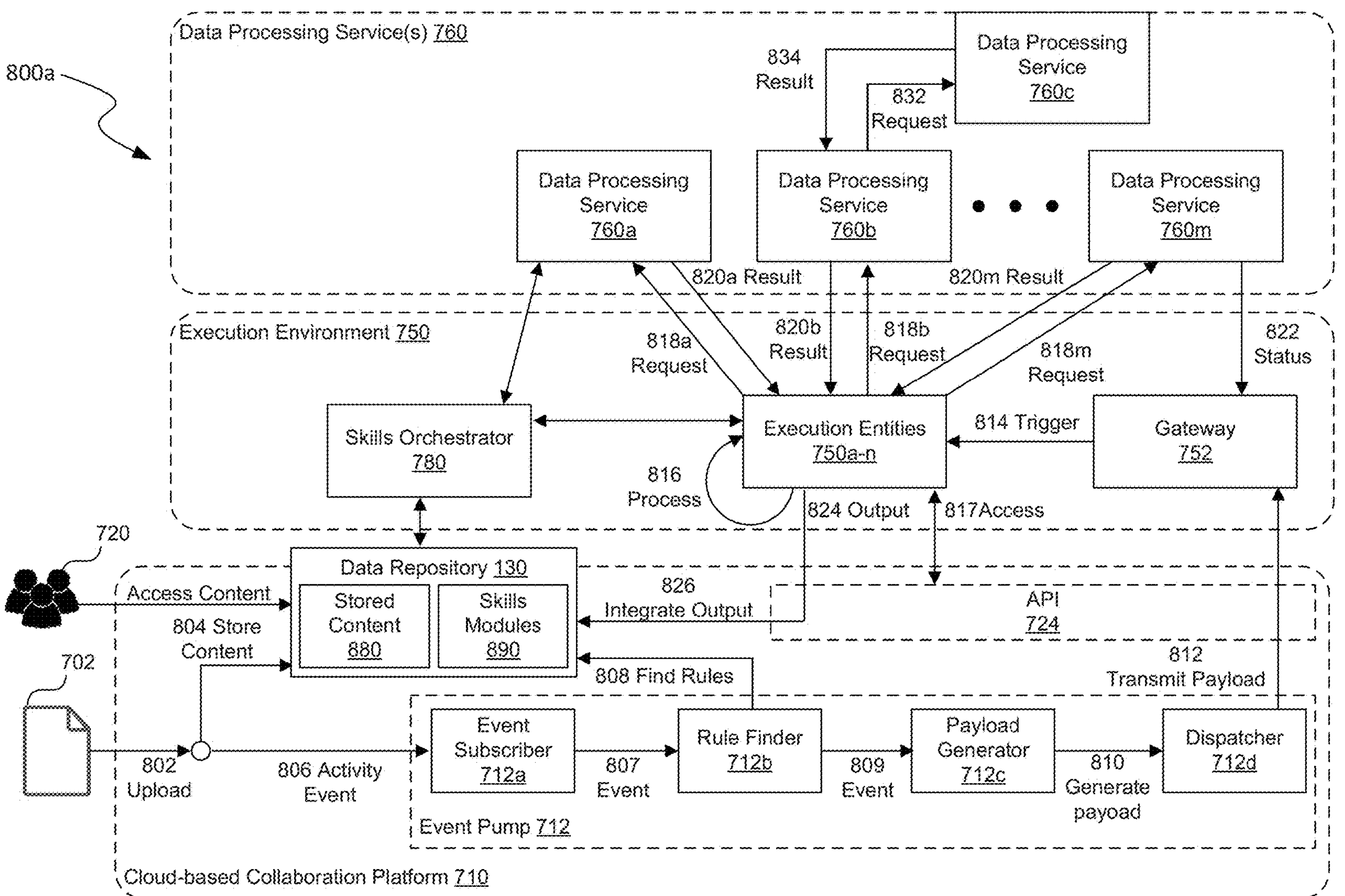
FIG. 8A shows a diagram of an example process flow for executing a Skill in accordance with a first example framework architecture.

FIG. 8A shows a diagram of an example process flow 800*a* for executing a Skill in accordance with a first example framework architecture such as, or similar to the framework architecture 700 of FIG. 7.

As shown in FIG. 8A, a data repository 130 may include one or more stored Skills modules 890. In this context a Skills module 890 may represent at least part of the code including instructions, rules, machine learning models, etc. for implementing a given Skill. For example, each Skill (e.g., image recognition, voice-to-text, translation, etc.) may be associated with a separate Skills module 890. In some cases, Skills modules are developed and implemented by a provider of the cloud-based collaboration platform 710. Alternatively, or in addition, some Skills modules may be authored by second- or third-party developers, for example, by using a software developer kit (SDK) provided by the provider of the cloud-based collaboration platform. Although shown within the data repository 130 of the cloud-based collaboration platform, in some embodiments, at least some of the code associated with the Skills module 890 may reside in the execution environment 750 where the Skill is executed by execution entities when triggered.

Also shown in FIG. 8A is a Skills orchestrator 780 for monitoring, managing, coordinating, etc. the various Skills being implemented across the system. The Skills orchestrator 780 may include logic as well as local storage. In some embodiments, the Skills orchestrator 780 monitors various tasks associated with Skills. For example, the Skills orchestrator may track task retries by the various execution entities 750*a-n*, verify whether tasks are being successfully executed, monitor how long the tasks take to execute, coordinate multiple tasks executing simultaneously, verify whether tasks are complying with various security policies (e.g., content access rights), handle synchronous and/or asynchronous execution of Skills, etc. In some embodiments, the Skills orchestrator may perform a resource management role, for example, by predicting workload and spooling up execution entities to meet demand. As an illustrative example, consider an image processing Skill. In such an example, the Skills orchestrator may determine or be configured to know that most images are uploaded to a particular enterprise deployment of the cloud-based collaboration platform during business hours. With this information, the Skills orchestrator may predict an image processing workload during business hours and spool up a certain quantity of execution entities before the start of business hours to meet the predicted demand without any processing interruption. In some embodiments, the Skills orchestrator may dynamically start and stop execution entities based on predicted demand as well as observed actual demand. In some embodiments, the Skills orchestrator may initiate execution of a first Skill, receive outputs from that first Skill, and use all or portions of the outputs of the first Skill as inputs to a second Skill, and then use all or portions of the outputs of the second Skill as inputs to a third Skill, and so on.

To perform its various roles (e.g., monitoring, managing, coordinating, etc.), the Skills orchestrator may communicate with any one or more of the execution entities 750_a-n_, other components of the execution environment 750, the external data processing services 760, and/or various components of the cloud-based collaboration platform (e.g., the Skills modules, components of the event pump 712, etc.).

In some embodiments, the Skills orchestrator may be Skill-specific. In other words, although shown as a single component in FIG. 8A, in some embodiments, each of the one or more implemented Skills (e.g., image processing, audio-to-text, translation, etc.) may be associated with a separate Skills orchestrator. In such embodiments, the various Skills orchestrators may coordinate with each other or be managed by a master Skills orchestrator (not shown).

Although depicted in FIG. 8A as residing in the execution environment 750, the Skills orchestrator may also reside in the cloud-based collaboration platform. For example, the Skills orchestrator may be a subcomponent of any one or more of the Skills modules 890 shown in FIG. 8A as being stored in data repository 130 or may be a subcomponent of the event pump 712.

The example process flow 800_a_ begins at step 802 with some activity occurring with respect to the content item. For the purpose of illustrative clarity, the activity in this case is an uploading of the content item by a user into the cloud-based collaboration platform. As previously discussed, step 802 may also involve any other type of activity associated with the content item (e.g., view, edit, update, revise, comment, download, upload, preview, tag, etc.).

In response to the uploading of the content item at step 802, the cloud-based collaboration platform at step 804 stores the content item (e.g., in data repository 130 as described with respect to FIG. 1). As shown in FIG. 8A, the data repository 130 includes stored content 880. This stored content 880 may represent at least a subset of the content stored in the cloud-based collaboration platform. This stored content 880 may also include any content uploaded and shared by collaborators as well as any enhancements (e.g., metadata) to the content (collectively, enhanced content 716) generated, for example, using the techniques described in this disclosure.

The uploading of the content item may also cause event data to be generated and disseminated at step 806. For example, as previously discussed, the event data may include a log in an action log framework (ALF) noting the upload activity that occurred at step 802. The event data disseminated at step 806 may have a number of different purposes unrelated to the execution of the Skill. For example, the cloud-based collaboration platform may include rules that trigger other automated workflows in response to detected events. As an illustrative example, the event data disseminated at step 806 may automatically cause notifications to be sent to one or more users 720 informing them of the newly uploaded content item.

A receiving component of the event pump 712 such as event subscriber 712_a_ may receive the event indicating the upload of the content item. Note that although depicted in FIG. 8A as a subscriber component, the event subscriber may also include or be referred to as an event listener. Although these terms can be used to describe different types of entities, for the purpose of this disclosure they are assumed to be interchangeable. The event subscriber 712_a_ may be configured to listen for all events occurring within the cloud-based collaboration platform or to specifically listen for certain types of events (e.g., based on file type, activity type, user, folder, workspace, geographical location, etc.) or to particular event dispatchers operating within the cloud-based collaboration platform. For example, in the scenario depicted in FIG. 8A, an event listener may be configured to listen for events indicating the uploading of a content item of any type.

At step 807, a received event is passed to a rule finder 712_b_ of the event pump 712 to determine which Skills, if any, are to be initiated based on the received event. To determine this, the rule finder 712_b_ may, at step 808, access a set of one or more stored rules in a repository (e.g., data repository 130) to find a related rule that matches certain characteristics of the received event (e.g., file type, activity type, user, folder, workspace, geographic location, etc.). These rules accessed in data repository 130 may be associated with the one or more Skills modules 890.

The rules are codified to consider aspects of (1) the event type and/or other characteristics of the event (e.g., upload event, specific action request event, etc.); (2) characteristics of objects associated with the event; and (3) characteristics of candidate Skills. Any one or more of the event type and/or the characteristics of objects associated with the event can be used as criteria that determines (a) if the rule is to be activated based on the criteria, and (b) if one or more Skills are to be triggered.

Strictly as nonlimiting examples, a first set of rules might correspond to certain event types, whereas a second set of rules might correspond to certain other event types. Furthermore, there may be multiple rules for a given event type, where the multiple rules correspond to different object types that are associated with the event. Furthermore, a set of rules might be organized in a list or hierarchy so as to indicate preferences or priorities for application of the rule. A rule is activated when the then-current conditions satisfy the criteria of the rule.

When there are multiple rules that correspond to a particular event and object, the rule with the highest preference controls the event pump 712 and/or controls the triggering of the particular Skill that is referenced in the rule of highest preference or priority. For example, a first rule of a higher priority might reference a Skill from VendorA, whereas a second rule of a lower priority might reference a Skill from VendorB. Moreover, a first rule might reference a Skill module that is embodied as a web service, whereas a second rule might reference a different Skill module that is embodied as an application programming interface (API). Still further, a single rule might specify multiple data processing services that are to be executed in parallel (e.g., to generate multiple output types in parallel) or that are to be executed serially in a chaining fashion where output from a first data processing service is used as input to a second data processing service.

The determined one or more Skills are only triggered if the received event satisfies certain criteria. As such, and assuming that a relevant rule is found at step 808 (e.g., indicating that the instruction received is to initiate a Skill), the event is then forwarded at step 809 to a payload generator 712*c*. Recall that, in some embodiments, a Skill is executed at least in part by transmitting information to one or more execution entities (e.g., AWS Lambdas) operating in an execution environment 750 (e.g., Amazon® AWS). The information transmitted may include any information needed by the one or more execution entities to carry out execution of the Skill (e.g., including accessing and processing the content item and integrating any returned outputs). This set of information transferred to the execution environment 750 is referred to herein as the "payload."

Accordingly, example process flow 800*a* continues at step 810 with generating the payload by the payload generator 712*c*. As mentioned, the payload may include any type of information needed by the one or more execution entities to execute a given Skill. The information included in the payload may differ depending on the organization of the framework architecture in various embodiments. In some embodiments, the payload includes any one or more of file information, event information, collaboration information, access credentials, custom parameters, or any other information. In some embodiment, the step of generating the payload may include gathering, by the payload generator 712*c*, information to be included in the payload from various components of the cloud-based collaboration platform. In some embodiments, the step of generating the payload may include generating, by the payload generator 712*c*, new data (e.g., metadata, identifiers, access tokens, notification messages, etc.) to be included in the payload. The specific process performed by the payload generator 712*c* may differ depending on the organization of the framework architecture in various embodiments.

File information included in the payload may include any type of information associated with the content item. For example, file information may be any of, the entire content item, a preview of the content item, an identifier associated with the content item, a file type identifier associated with the content item, a version identifier associated with the content item, configuration parameters associated with the content item, etc. In some embodiments, the payload generator 712*c* accesses file information for incorporation into the payload by submitting a request to an API 724 associated with the cloud-based collaboration platform. For example, an API call to API 724 may return a file-specific access token associated with the content item now stored in data repository 130. Alternatively, or in addition, the payload generator 712*c* may extract file information from event data forwarded by the event subscriber 712*a*, for example, by parsing the event data.

Event information in the payload can include any type of information associated with the event that is triggering execution of the Skill. For example, event information may include any of the full set of event data generated in response to the activity (e.g., uploading of content item) at step 802 or a subset of the generated event data. For example, as previously mentioned, the event data may include any of a content item identifier, a timestamp, a description of the activity, an identifier of an entity (e.g., user, device, address, etc.) associated with the activity, or any other information associated with the activity. In some embodiments, the payload generator 712*c* accesses event information for incorporation into the payload by submitting a request to an API associated with the cloud-based collaboration platform. For example, an API call to the API 724 may return event data associated with the activity at step 802. Alternatively, or in addition, the payload generator 712*c* may extract event information from event data forwarded by the event subscriber 712*a*, for example, by parsing the event data.

Collaboration information may include any type of information associated with users 720 that are collaborating on the content item now stored in the cloud-based collaboration platform. For example, collaboration information may include any identifiers (e.g., names, usernames, email addresses, etc.) of users that have collaborator access to the content item. The users with collaborator access to the content item may include any of, a user that uploaded the content item, or another user invited by the uploading user to collaborate on the content item, or users with access permissions to a folder or workspace where the content item resides, or a user with administrator privileges, etc. In some embodiments, the payload generator 712*c* accesses collaboration information for incorporation into the payload by submitting a request to an API 724 associated with the cloud-based collaboration platform. For example, an API call to API 724 may return identifiers associated with users that have access to the content item. Alternatively, or in addition, the payload generator 712*c* may extract event information from event data forwarded by the event subscriber 712*a*, for example, by parsing the event data.

Access credentials may include any type of information that may be necessary for the execution 750*a-n* to execute the Skill. For example, an access credential may include a webhook signature key used to authenticate that a webhook notification associated with the transmitted payload has originated from the cloud-based collaboration platform. The access credential may also include a file-specific access token that allows the execution entities 750*a-n* to operate on the uploaded content item. An access token may be scoped specifically to the particular content item. In some embodiments, the payload generator 712*c* accesses credentials for incorporation into the payload by submitting a request to an API 724 associated with the cloud-based collaboration platform. For example, an API call to API 724 may return credentials associated with the content item.

The access token may be generally understood as any piece of data that allows access to view the content item, download the content item, update the content item, update metadata associated with the content item, comment on the content item, etc. In some embodiments, the access token may be specific to the execution of a particular instance of a Skill on the content item. The access token may expire upon completion of the Skill. In such embodiments, a new access token may be required in order to perform the same Skill again or another Skill on the content item. In some embodiments the access token persists for a limited period of time (e.g., 10 minutes) and automatically expires at the end of the period.

Once the payload is generated by the payload generator 712*c*, a dispatcher 712*d* may at step 812 transmit the payload (e.g., via an API 724) to the execution environment 750. In the case of a commercially-available type of cloud-based execution environment (e.g., Amazon AWS), the payload may be transmitted over one or more networks.

As previously discussed, the overall process of transmitting some type of payload to the execution environment in response to a trigger event occurring in the cloud-based collaboration platform may be accomplished using webhooks. Webhooks enable a system to attach certain trigger events to particular content items 702, folders, workspaces, etc. When the triggering event occurs (e.g., uploading of content item), the webhook may transmit a notification via an HTTP request to a specified URL associated with an execution entity. A webhooks API can be used to define methods (e.g., GET, POST, PUT, and DELETE) used to create webhooks for certain Skills, define the events that trigger notifications, set the URLs they communicate with, and remove them when they are no longer needed. For example, a developer (e.g., a third-party developer) of a particular Skill may use the webhooks API to define the webhooks used for that Skill.

Generally, when an event (e.g., upload of content item) is observed within the cloud-based collaboration platform that the webhook is listening for, the webhook sends a notification in the form of an HTTP request to a specified notification URL. The notification payload includes a notification header and a notification body. The notification header may include information such as a unique notification identifier, a timestamp, a webhook signature (primary and secondary), etc. The following shows a structure of an example HTTP-based notification header:

```
Delivery-Id: 462fc1b2-7bc5-4e50-bda3-c094daf12f99
Delivery-Timestamp: 2016-07-12T13:14:19-07:00
Signature-Algorithm: HmacSHA256
Signature-Primary:
m2zzDEo888sLGDiQ+5a0fj3Fc3LF8awRsKLO/ZtGClk=
Signature-Secondary:
IBgiKXC+5vwpoEdZWtXvb+LqAQEeZ9UXoIu0ejR72uA=
Signature-Version: 1
Cache-Control: max-age=259200
Connection: close
Content-Length: 316
Content-Type: application/json; charset=UTF-8
    Host:
    Surrogate-Capability:
    web-proxy2004.sv2.cloud.net="Surrogate/1.0 ESI/1.0"
    User-Agent: WH-Client/0.1
```

The notification body may include a Javascript Object Notation (JSON) object that describes the webhook and the event that triggered the notification. The following is a structure of an example notification body in the form of a JSON object:

```
{
    "type":"webhook_event",
    "id":"0f46a6ca-86bf-44ab-8cf5-f08e1e02876b",
    "created_at":"2016-07-12T13:14:19-07:00",
    "trigger":"FILE.UPLOAD",
    "webhook":{
        "id":"53",
        "type":"webhook"
    },
    "created_by":{
        "type":"user",
        "id":"2",
        "name":"John Q. Developer",
        "login":"johnq"
    },
    "source":{
        "id":"73835521473",
        "type":"file"
    },
}
```

The payload transmitted by the dispatcher 712*d* leads to the triggering of an execution entity to execute the Skill. In the embodiment depicted in FIG. 8A, the notification sent by the dispatcher 712*d* is received via a gateway 752 of the execution environment 750. For example, the gateway 752 may be an API gateway associated with a third-party provider of the execution environment 750 such as Amazon® AWS. In some embodiments, the notification is received at a Simple Queuing Service (SQS) (not shown) associated with the execution environment 750.

In any case, at step 814, one or more execution entities (e.g., AWS Lambda instances) operating in the execution environment 750 are triggered to begin, at step 816, processing to execute the Skill. Recall that execution of a Skill may occur in real-time or near real-time (i.e., within a range of milliseconds to seconds) as an activity causing an event occurs. For example, a face recognition Skill may be triggered within seconds after an image is uploaded to the cloud-based collaboration platform. Other skills may be executed at a later time, for example, as part of a batch process. For example, Skills that require greater processing resources that are not needed immediately (such as an intelligent video analysis Skill) may be held in a queue to be processed at a later time, for example, as part of a batch process during off-peak hours. A developer of a particular Skill or an administrator of the cloud-based collaboration platform may configure how and when a Skill is executed.

As previously mentioned, in some embodiments, a payload transmitted to an execution entity may include all of the data needed to execute the Skill including the content item to be processed. Alternatively, in some embodiments, the payload transmitted (i.e., at step 812) may only include information that the execution entity can then use to access the necessary data. For example, the payload may include an access token and file identifier that then execution entity can then use at step 817 to access the content item from the cloud-based collaboration platform. For example, the execution entity may call an API 724 which may then return any of an access token and the content item (or a copy thereof).

In some embodiments, the execution entity may access one or more data processing services (described previously) to process the content item. In such embodiments, the execution entity may, at steps 818*a-m*, transmit one or more requests to the data processing services to process the content item. The requests may include the content item and be transmitted over a computer network (e.g., network interfaces 106) via an API associated with the data processing services. For example, in an embodiment, a request 818*a* may include uploading a copy of the content item via an API pertaining to any one or more of the external data processing services 760. In some embodiments, status regarding the processing of a content item at the one or more data processing services may be communicated at step 822 back to the execution entity, for example, via gateway 752 associated with the execution environment.

A request 818*a-m* may also include instructions for processing the content item. Instructions may be in the form of values for one or more parameters defined by an API of the data processing services. For example, a data processing service API may provide various options to a requesting entity to define how the content item is to be processed. Options can include, for example, an output format, output timing, an output goal, etc. If available, the execution entity requesting the service may define values for such options, for example, based on configuration by a developer of the Skill or by an administrator. In some embodiments, the execution entity may apply machine learning (trained or untrained) to provide instructions to a data processing service that has a history of returning the best output results.

As indicated in FIG. 8A, any given execution entity may access multiple data processing services. In some situations, the execution entity may access two different external data processing services (e.g., 760*a* and 760*b*) to perform two different types of processing on the content item. For example, a translated audio-to-text Skill may require automated transcription of an audio file followed by translation of the transcription. Depending on the capabilities of various data processing services, the execution entity may need to access two different services to perform the Skill. In some cases, two different types of external data processing services (e.g., 760*a* and 760*b*) may be offered by two different vendors. For example, the translated audio-to-text Skill mentioned above may involve accessing, by an execution entity, a Microsoft® Azure API to generate a text based transcription of an audio file before accessing a Google® Cloud API to translate the generated transcription into another language. As implied in this example scenario, execution of the Skill may involve processing by various data processing services in a particular order. In other words, the execution entity may wait for a result from a first external data processing service 760*a* before requesting processing of the result by another external data processing service 760*b*.

In some embodiments, one or more of the data processing services may be configured so as to access other data processing services to return a result. For example, as depicted in FIG. 8A, in response to a request 818*b* from an execution entity, the external data processing service 760*b* accesses another external data processing service 760*c*, for example, by transmitting a request at step 832 to the other external data processing service 760*c*. As an illustrative example, a data processing service for intelligent text extraction may use another data processing service to handle an OCR task of an intelligent text extraction service. In some cases, these two services may be provided by different vendors (e.g., Microsoft and Google) and may interact via respective APIs. In any case, a result is returned by the other external data processing service 760*c* at step 834 in response to the request. The original receiving external data processing service 760*b* may then process the result returned at step 834 and return its own result to the execution entity at step 820*b*. Notably, the execution entity that submitted the initial request at step 818*b* may be unaware of the other external data processing service 760*c* in the depicted scenario. In other words, the secondary request may depend on the internal configurations of the external data processing service 760*b* that are not visible to the requesting execution entity. The example interaction between external data processing service 760*b* and external data processing service 760*c* is provided to illustrate how one data processing service may depend on other data processing services, but is not to be construed as limiting. In other scenarios, the external data processing service 760*b* may access multiple other data processing services (not depicted). Similarly, the external data processing service 760*c* receiving the secondary request at step 832 may in turn access one or more other data processing services (not shown) to process the request.

Inevitably, different vendors may offer similar data processing services. For example, both Google® and Microsoft® offer various overlapping image processing services (e.g., face detection/recognition, object detection, OCR, keyword extraction, etc.) through their respective APIs. Accordingly, certain Skills may access one or more of several different data processing services to perform a particular type of processing on a given content item. The specific one or more data processing services accessed to perform the processing of the content item may be defined within the code of the execution entity executing the Skill. For example, a data processing services vendor such as Google may author an image processing Skill that specifically accesses the Google® Cloud Vision API to perform processing of images uploaded to the cloud-based collaboration platform.

In some embodiments, a developer of a Skill may include in the code the ability for users to select from multiple available data processing services to perform the Skill. This option might be presented to an administrator via an administrator interface console. In such an example, an administrator may configure a particular Skill to use a first external data processing service 760*a* to process the content item if a trigger event meets a first criteria and to use a second external data processing service 760*b* to process the content item if the trigger event meets a second criteria. As an illustrative example, an administrator may configure an image processing Skill to use the Google® Cloud Vision API if an image is uploaded into a general "images folder" and to use the Microsoft® Azure Face API if an image is uploaded into a "portraits" folder. Similarly, options may be presented to end users to select the particular data processing service to perform the Skill. For example, in response to uploading an image, the uploading user may be presented with an interactive option, for example, via a graphical interface of their computing device. The interactive option may notify the user that uploading the image will trigger a face detection Skill and may prompt the user to select from one of several different data processing services (e.g., Google® Cloud Vision API or Microsoft® Azure Face API) to perform the face detection Skill.

In some embodiments, a Skill may apply machine learning (trained or untrained) to automatically select from multiple data processing services. For example, execution entity executing an image processing Skill may analyze returned results from multiple image processing services over time. Based on this analysis, and by applying machine learning, the execution entity may automatically select the image processing service that produces superior results (objectively and/or subjectively). For example, by applying machine learning, an execution entity (or any other entity associated with executing a Skill) may observe that the Microsoft® Azure Face API returns objectively more accurate face recognition results than the Google® Cloud Vision API. Accordingly, the execution entity may automatically access the Microsoft® Azure Face API to execute a face recognition Skill on an uploaded image, even if this is not predefined in the execution entity code. In embodiments that use trained machine learning, feedback from an administrator or one or more end users may be incorporated into the machine learning models to improve machine learning based selections of data processing services. For example, after completing a Skill (e.g., face recognition) a user may be prompted for feedback (e.g., a level of satisfaction, accuracy, timeliness, etc.) regarding the execution of the Skill. In another embodiment, results from multiple data processing services for a particular Skill are integrated (e.g., as metadata) into the cloud-based collaboration platform and monitored for feedback. For example, an image uploaded to the cloud-based collaboration platform may include associated keyword metadata based on results from multiple different data processing vendors offering computer vision services. A user accessing the uploaded image may have access to the associated metadata based on results from different vendors and may provide feedback as to their relative levels of quality, accuracy, etc. Feedback may be expressly provided by a user and/or inferred based on user actions such as accessing one set of metadata more frequently than another.

In some embodiments, analysis performed comparing results from multiple data processing services may be provided as a service to external parties (e.g., vendors providing the data processing services). Data processing vendors (e.g., Google, Microsoft, IBM, etc.) may be interested to see how results generated using their respective services rated or how they compare to other data processing vendors. In an illustrative example, each time a data processing service returns a result to the cloud-based collaboration platform based on a processing of a content item, that service may receive feedback on the quality, accuracy, etc. of the result from the cloud-based collaboration platform.

The one or more data processing services return results at steps 820*a-m* (respectively) to the execution entity after completing their processing. The format of the results may depend on the particular type of data processing service used. For example, as previously discussed, results may be in the form of generated metadata (e.g., image keywords), extracted metadata (e.g., a name or address from a text document), new generated content (e.g., a text transcription of an audio file), a transformed version of the content (e.g., a .pdf of an uploaded .doc file), an edited version of the content (e.g., a redacted text document), a hypothesis indication (e.g., a health diagnosis), a notification, configuration data (e.g., a security policy or governance policy input), or any other type of information based on the processing of the content item.

The execution entity then generates an output (at step 824) based on the returned result(s) for integration (at step 826) into the cloud-based collaboration platform. The manner in which data output at step 824 is integrated (at step 826) into the cloud-based collaboration platform 710 is described in more detail with respect to FIG. 7. In some embodiments, the execution entity may simply pass through results returned from the one or more data processing services, for example, via an API 724 of the cloud-based collaboration platform. Alternatively, or in addition, the execution entity may process the results returned from the one or more data processing services before providing an output at step 824. For example, the execution entity may transform metadata returned from the one or more data processing services to conform with a metadata schema of the cloud-based collaboration platform. As another example, the execution entity may generate a new event as an output at step 824 based on the results returned from the one or more data processing services. This new event may then trigger execution of another Skill, for example, based on the previously described aspects of example process flow 800*a*. As another example, an execution entity may use the results returned from the one or more data processing services as inputs into some type of function to generate an output at step 824. For example, a hypothesis generation Skill (e.g., health diagnostics) may be configured to poll multiple data processing services for multiple hypotheses and then to output, at step 824, an overall hypothesis based on the multiple hypothesizes from the polled data processing services. This overall hypothesis may be the most statistically significant or represent an aggregation of the multiple returned hypotheses. Consider, for example, a fraud analysis Skill in which the results returned from the multiple data processing services are multiple fraud confidence level values (e.g., from 0% and 100%). The execution entity will then process the results returned from the multiple data processing services to, at step 824, output a fraud confidence level value that is representative of the returned set (e.g., the maximum value, minimum value, average value, median value, etc.).

In some embodiments, results returned by the one or more data processing services at steps 820*a-m* (respectively) may trigger separate execution entities to process the results and return an output at step 824 that is then integrated in some way into the cloud-based collaboration platform. For example, the processing of a particular Skill may involve triggering a first execution entity 750*a* in the execution environment 750 in response to an event notification by the event pump 712 to access and provide the content item to one or more data processing services for processing. A second execution entity 750*b* may then be triggered once results are returned from the one or more data processing services to handle processing the results, generating an output, and/or integrating the results/output into the cloud-based collaboration platform. In some embodiments, the Skills orchestrator may handle the monitoring, managing, coordinating, etc. of the multiple execution entities to perform the particular Skill.

As previously mentioned, the framework architecture depicted in FIG. 8A is an example provided for illustrative purposes and is not to be construed as limiting. The architecture may be arranged differently while remaining within the scope of the present disclosure. For example, FIGS. 8B-8C depict alternative configurations of the framework architecture with which the techniques described herein may be practiced.

Figure 8B:
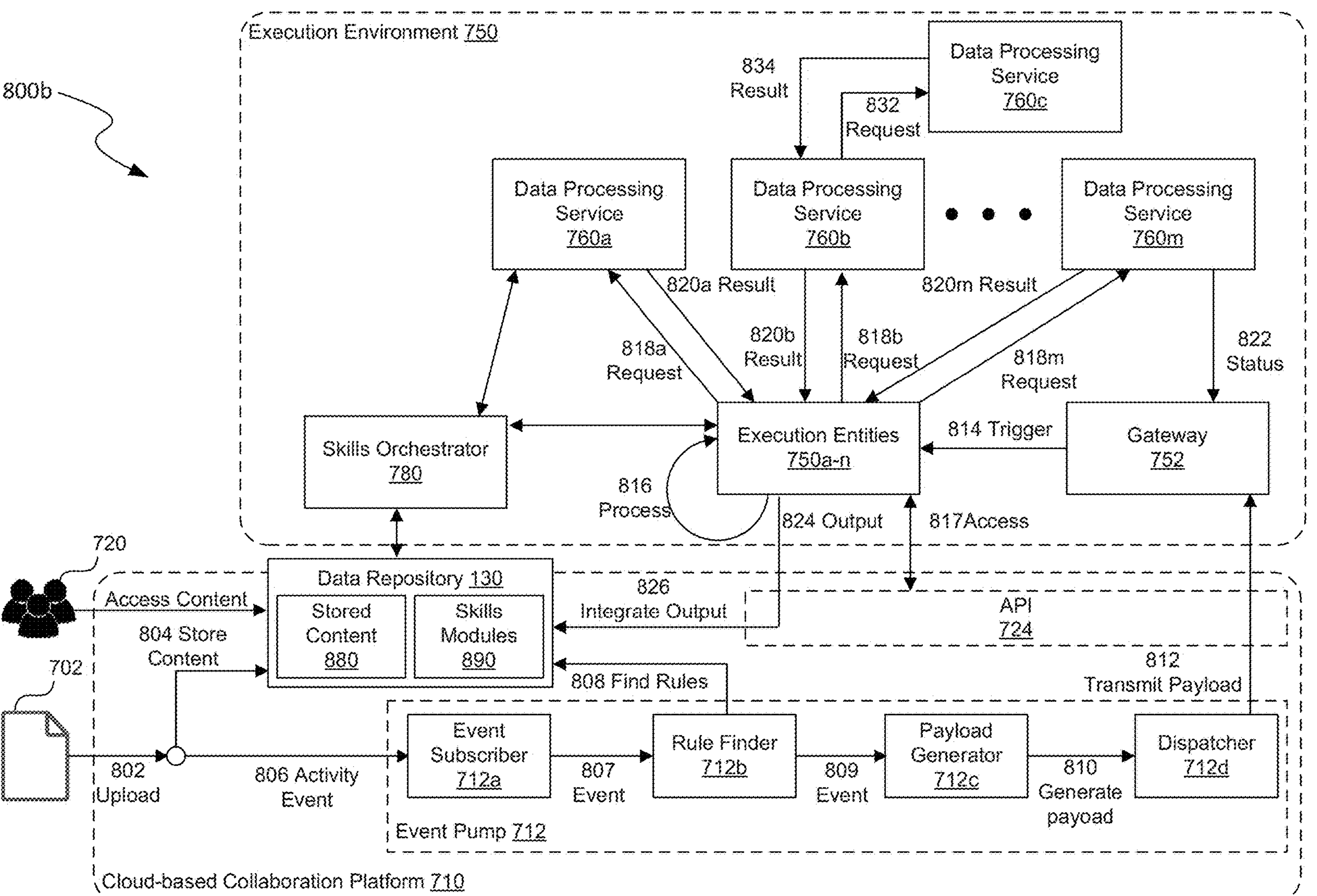
FIG. 8B shows a diagram of an example process flow for executing a Skill in accordance with a second example framework architecture.

FIG. 8B depicts an example process flow 800*b* through a framework architecture that is similar to that depicted in FIG. 8A except that the execution environment 750 includes one or more data processing services. In other words, the example framework architecture depicted in FIG. 8B envisions a provider (e.g., Amazon) of an execution environment 750 that also provides one or more data processing services. In this example the data processing services may still be external to the cloud-based collaboration platform while being internal to the execution environment 750. The steps of example process flow 800*b* for executing a Skill may otherwise be the same or similar as described with respect to process flow 800*a* in FIG. 8B. A person having ordinary skill will recognize adjustments that may be needed to certain process steps to accommodate the changes to the architecture. Also note, although not depicted in FIG. 8B, the example process flow 800*b* may also include accessing other data processing services that are external to the execution environment 750, for example, as described with respect to process flow 800*a* of FIG. 8A.

Figure 8C:
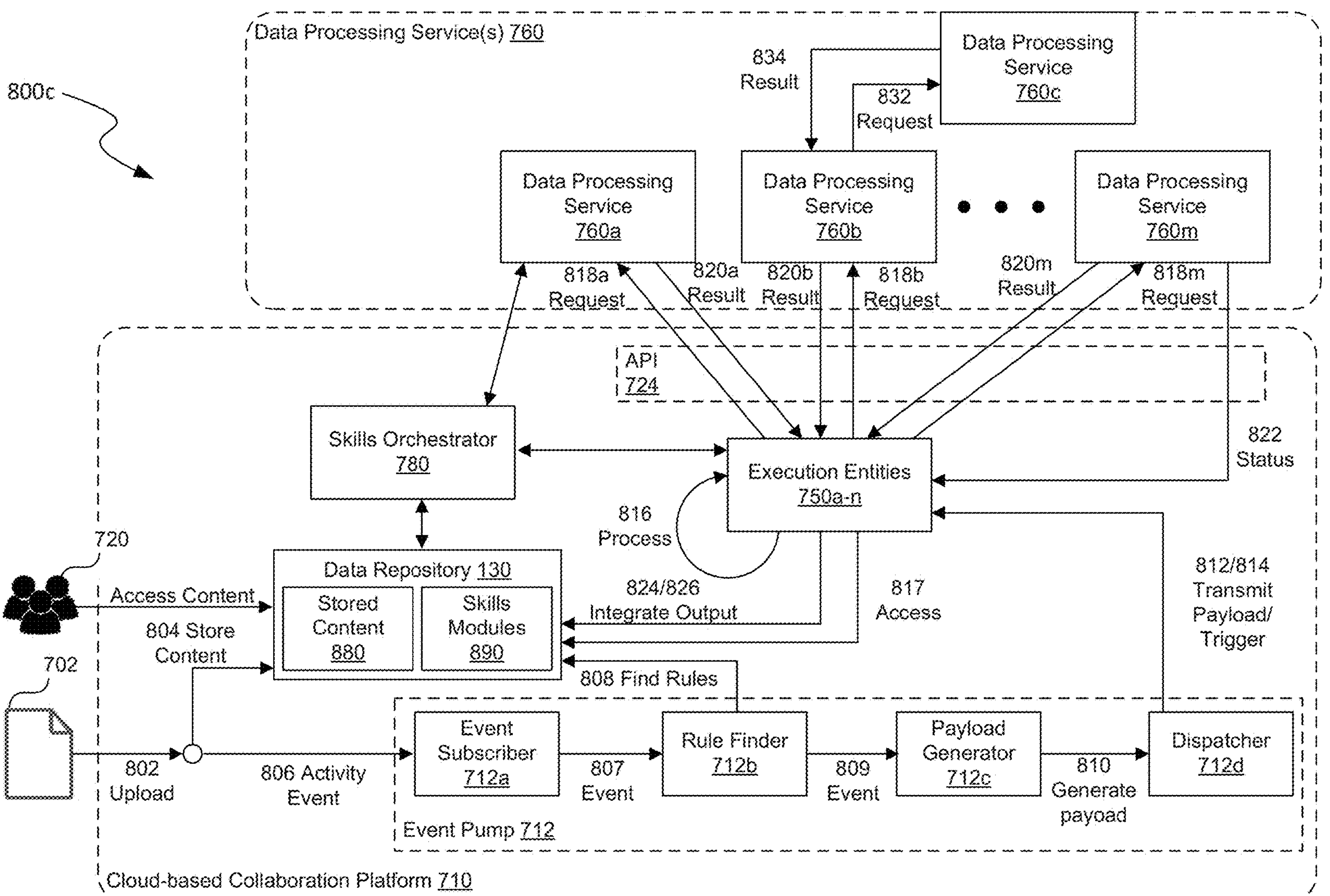
FIG. 8C shows a diagram of an example process flow for executing a Skill in accordance with a third example framework architecture.

FIG. 8C depicts another example process flow 800*c*, showing how elements of the execution environment 750 (e.g., execution entity) are incorporated into the cloud-based collaboration platform 710. In other words, the example framework architecture depicted in FIG. 8C envisions the execution of Skills within the cloud-based collaboration platform without relying on a commercially-available type of cloud-based environment such as Amazon AWS. As shown in FIG. 8C, one or more execution entities operating within the cloud-based collaboration platform may process a content item by accessing one or more external data processing services, for example, as described with respect to process flow 800*a* depicted in FIG. 8A. The steps of example process 800*c* for executing a Skill may otherwise be the same or similar as described with respect to process flow 800*b* in FIG. 8B. A person having ordinary skill will recognize adjustments that may be needed to certain process steps to accommodate the changes to the architecture. For example, communication between the execution entities and the external data processing services may be via an API 724 associated with the cloud-based collaboration platform.

Figure 9A:
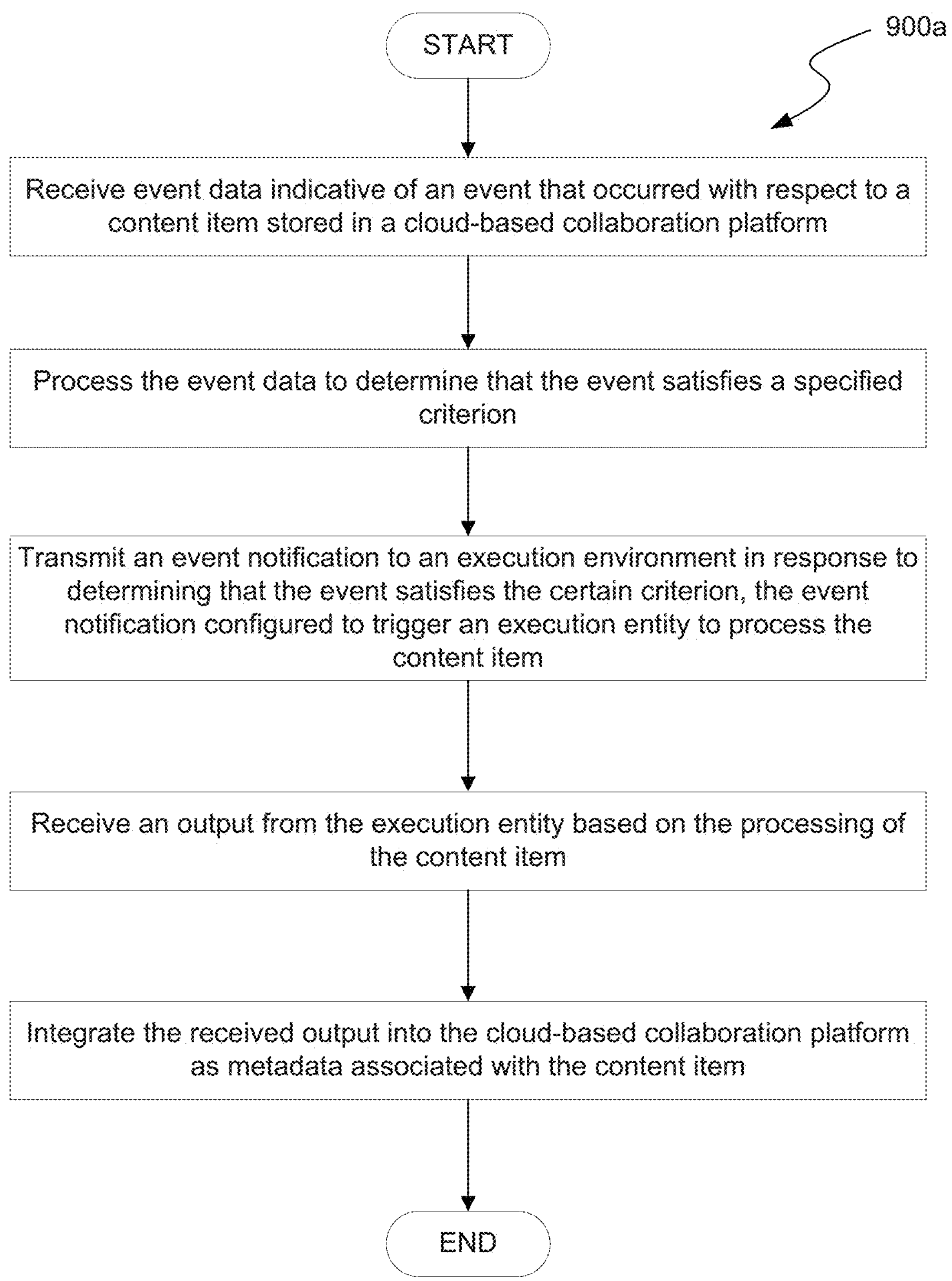
FIG. 9A shows a flow chart describing an example process for transmitting an event notification configured to initiate execution of a Skill by an execution entity.
Figure 9B:
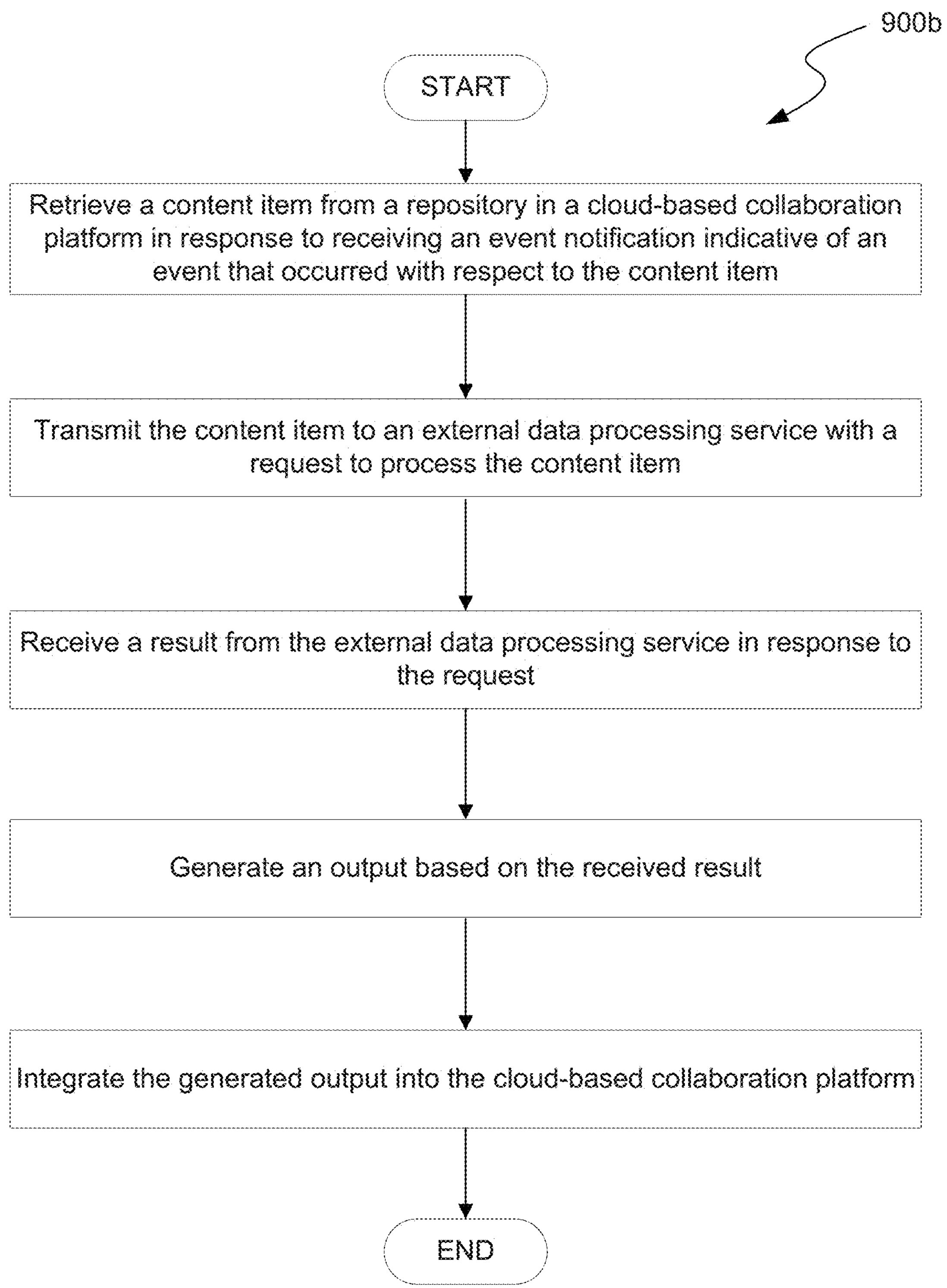
FIG. 9B shows a flow chart describing an example process performed by an execution entity to process a content item according to a Skill.
Figure 9C:
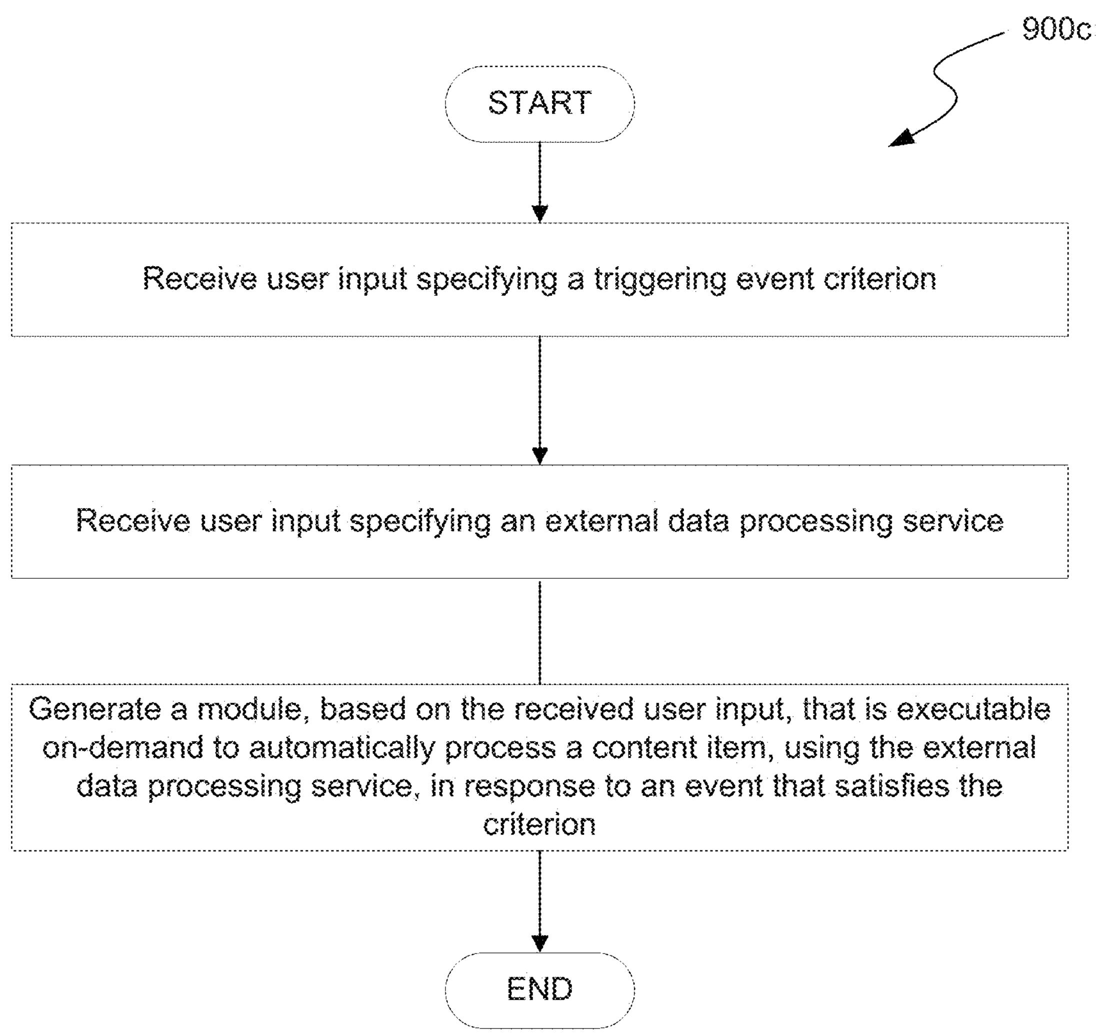
FIG. 9C shows a flow chart describing an example process performed by a developer computer system to generate a Skill module for use in the framework.

FIG. 9A, FIG. 9B, FIG. 9C, and FIG. 9D are flow charts describing example processes that may be performed by various entities associated with the framework architecture described with respect to FIG. 7 and FIG. 8. Specifically, FIG. 9A shows a flow chart describing an example process 900*a* for transmitting an event notification configured to initiate execution of a Skill by an execution entity. FIG. 9B shows a flow chart describing an example process 900*b* performed by an execution entity to process a content item according to a Skill. FIG. 9C shows a flow chart describing an example process 900*c* performed by a computer system under direction by a developer so as to generate a Skill module for use in the framework architecture.

Figure 14:
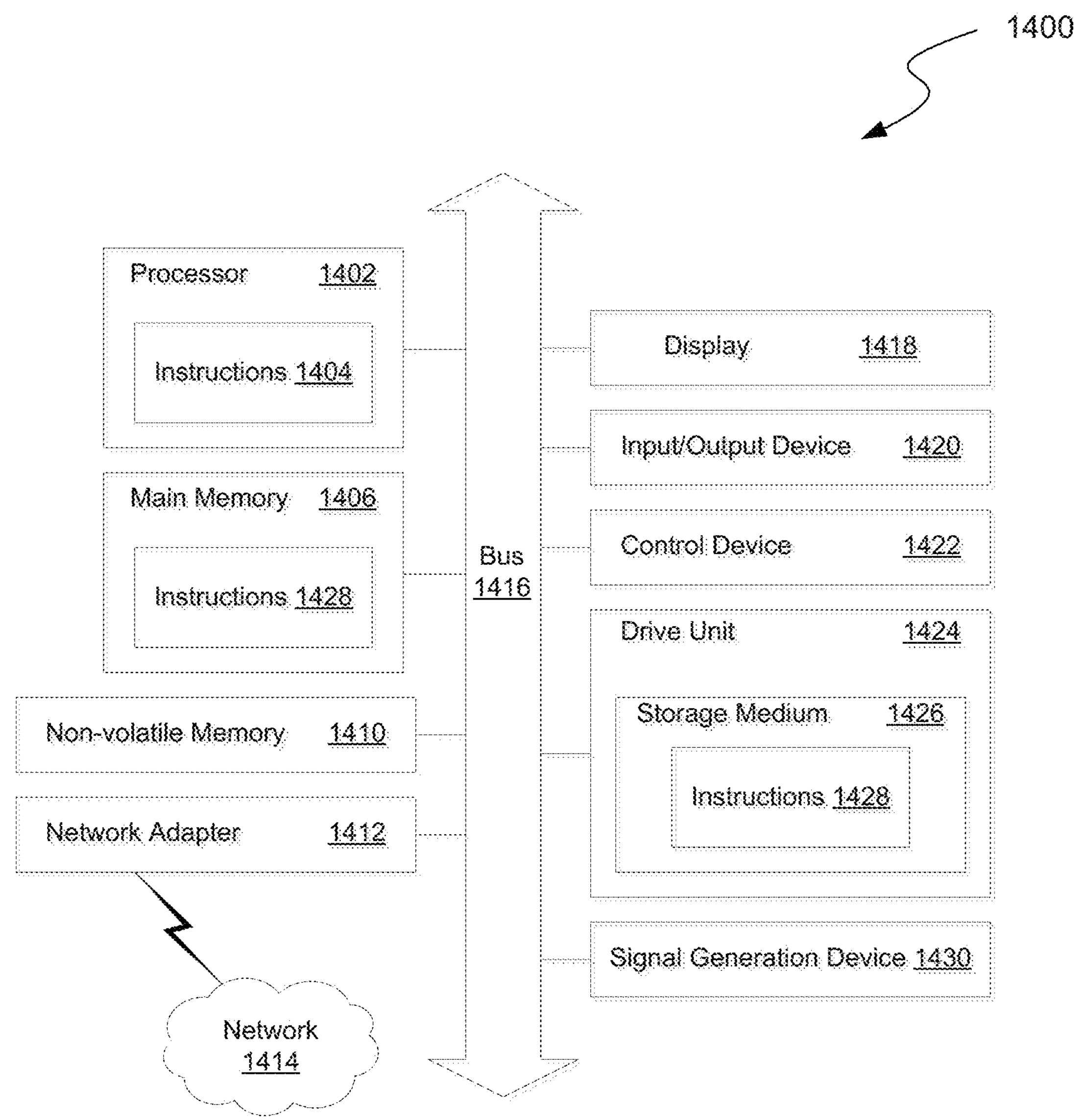
FIG. 14 is a block diagram illustrating an example of a processing system in which at least some operations described herein can be implemented.

One or more steps of the example processes depicted in FIGS. 9A-9D may be performed by any one or more of the components of the example processing systems described with respect to FIG. 14. For example, the processes depicted in FIGS. 9A-9D may be represented in instructions stored in memory that are thereafter executed by a processing unit. The processes described with respect to FIGS. 9A-9D are examples provided for illustrative purposes and are not to be construed as limiting. Other processes may include more or fewer steps than depicted while remaining within the scope of the present disclosure. Further, the steps depicted in the example processes may be performed in a different order than is shown.

The set of Skills implemented with a given system may include both built-in Skills and custom Skills. A "custom Skill" in this context may refer to a Skill designed to a specific application or use case. For example, a custom skill may be designed by a developer to solve a particular problem.

Figure 9D:
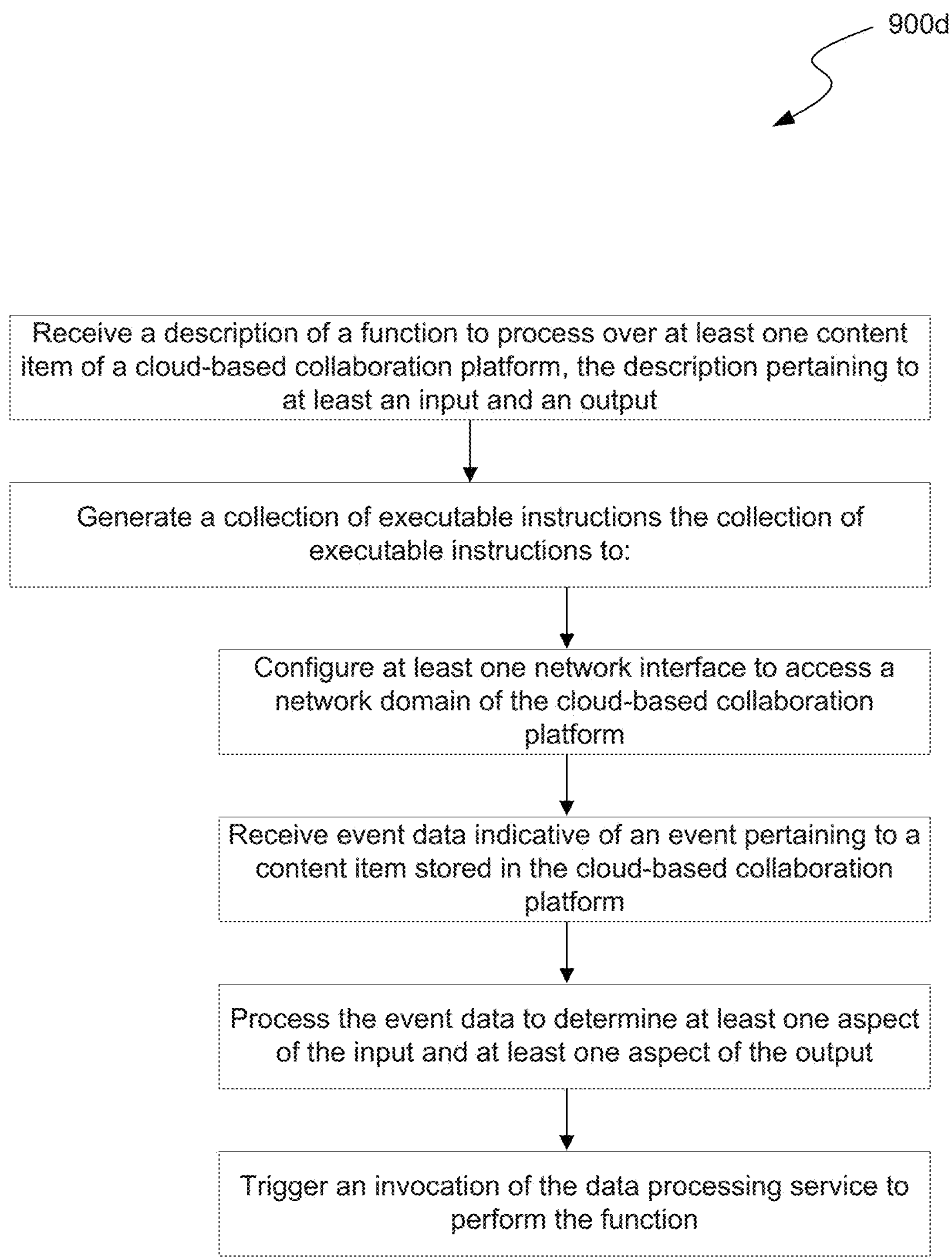
FIG. 9D shows a flow chart describing an example process performed by a developer computer system to generate a Skill module for use in the framework.

FIG. 9D shows a flow chart describing an example process 900*d* for deploying a data processing service. The method comprises steps of receiving a description of a function to process over a content item of a cloud-based collaboration platform. The description describes an input and an output. The description can be a text description that comports with a machine-readable markup language. For example, the description might include portions of extensible markup language (XML), and/or web services description language (WSDL), etc.

As shown, the method includes steps for generating a collection of executable instructions to configure at least one network interface to access a network domain of the cloud-based collaboration platform. The method also includes steps for receiving event data indicative of an event pertaining to the existence of, or an action pertaining to a content item stored in the cloud-based collaboration platform. The collection of executable instructions includes any number of processes, routines, threads, etc. that serve to process event data to determine at least one aspect of the input and at least one aspect of the output. In some embodiments, and as shown, the collection of executable instructions includes processes, routines, threads, etc. that serve to trigger an invocation of data processing services to perform the function as given in the foregoing description.

Figure 10:
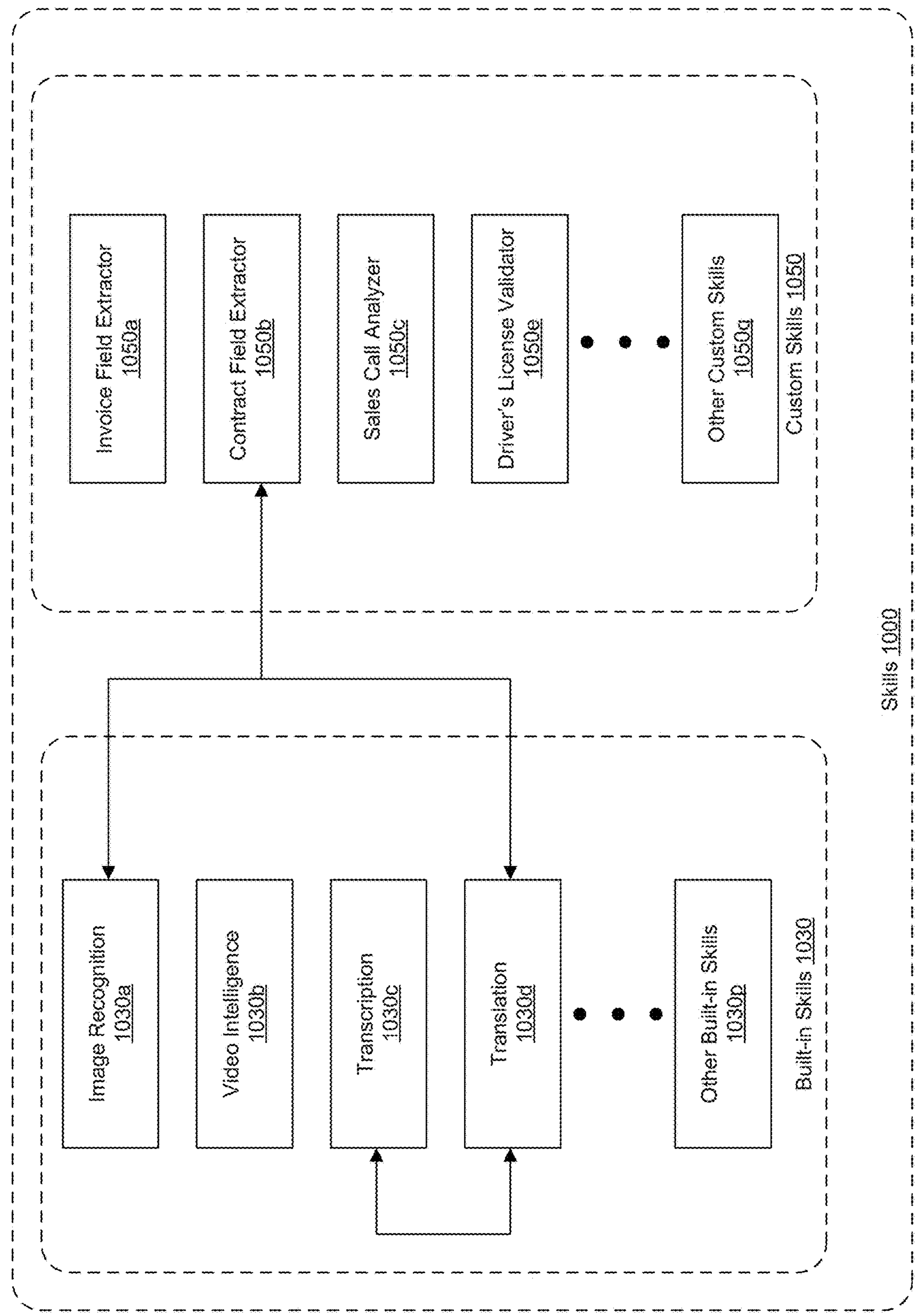
FIG. 10 shows a diagram that lists a set of built-in Skills and custom Skills implemented in a framework architecture associated with a cloud-based collaboration platform.

FIG. 10 shows a diagram that lists a set of Skills 1000 implemented in a framework architecture that interfaces with a cloud-based collaboration system. The set of Skills 1000 include both built-in Skills 1030 and custom Skills 1050. The set of built-in Skills 1030 include Skills designed to produce specific results for specific use cases. For example, the set of built-in Skills may include an image recognition Skill 1030*a*, a video intelligence Skill 1030*b*, a transcription Skill 1030*c*, a translation Skill 1030*d*, and any number of other built-in Skills 1030*p*. Additionally, the set of custom Skills 1050 may include custom Skills designed to address more specific user cases such as an invoice field extractor Skill 1050*a*, a contract field extractor Skill 1050*b*, a sales call analyzer Skill 1050*c*, a driver's license validator 1050*e*, and any number of other custom Skills 1050*q*.

The set of available custom Skills 1050 may be based on the particular enterprise deployment of a cloud-based collaboration platform. For example, an insurance company using an enterprise-specific deployment of the cloud-based collaboration platform may elect to use a custom contract field extractor Skill 1050*b* for automatically extracting data from fields in uploaded scans of insurance policy contract documents. As will be described, this custom Skill may be based, at least in part, on one or more of the built-in Skills 1030. In other words, custom Skills may, in some embodiments, represent the aggregated functionality of multiple Skills. For example, as indicated by the arrows in FIG. 10, a contract field extractor Skill 1050*b* may use the functionality of a built-in image recognition Skill 1030*a* for processing uploaded scans of contract documents and the functionality of built-in translators/transcribers (e.g., translation Skill 1030*d*, transcription Skill 1030*c*) for handling documents in various languages. Alternatively, or in addition, built-in Skills may be aggregated in certain embodiments. For example, as indicated by the arrows in FIG. 10, a transcription Skill 1030*c* may use the functionality of a translation Skill 1030*d* (and vice versa) to handle, for example, transcribing audio in one language into text in another language. This represents some illustrative examples of how Skills may be aggregated, but are not to be viewed as exhaustive. A person having ordinary skill will recognize that Skills within the context of this disclosure can be aggregated in any number of ways to suit user requirements.

In some embodiments, custom Skills may be offered as software modules or applications, for example, in an online store. An online store would enable users to download custom Skills to configure into and/or to interface with a cloud-based collaboration platform. For example, a user with a platform account might access (e.g., download, purchase, receive, etc.) a custom Skill configured to automatically recognize and tag faces in uploaded images. The custom Skill accessed by the user via the online store would be associated with that user's account such that, when implemented, images uploaded by the user are automatically tagged based on applied facial recognition.

Figure 11A:
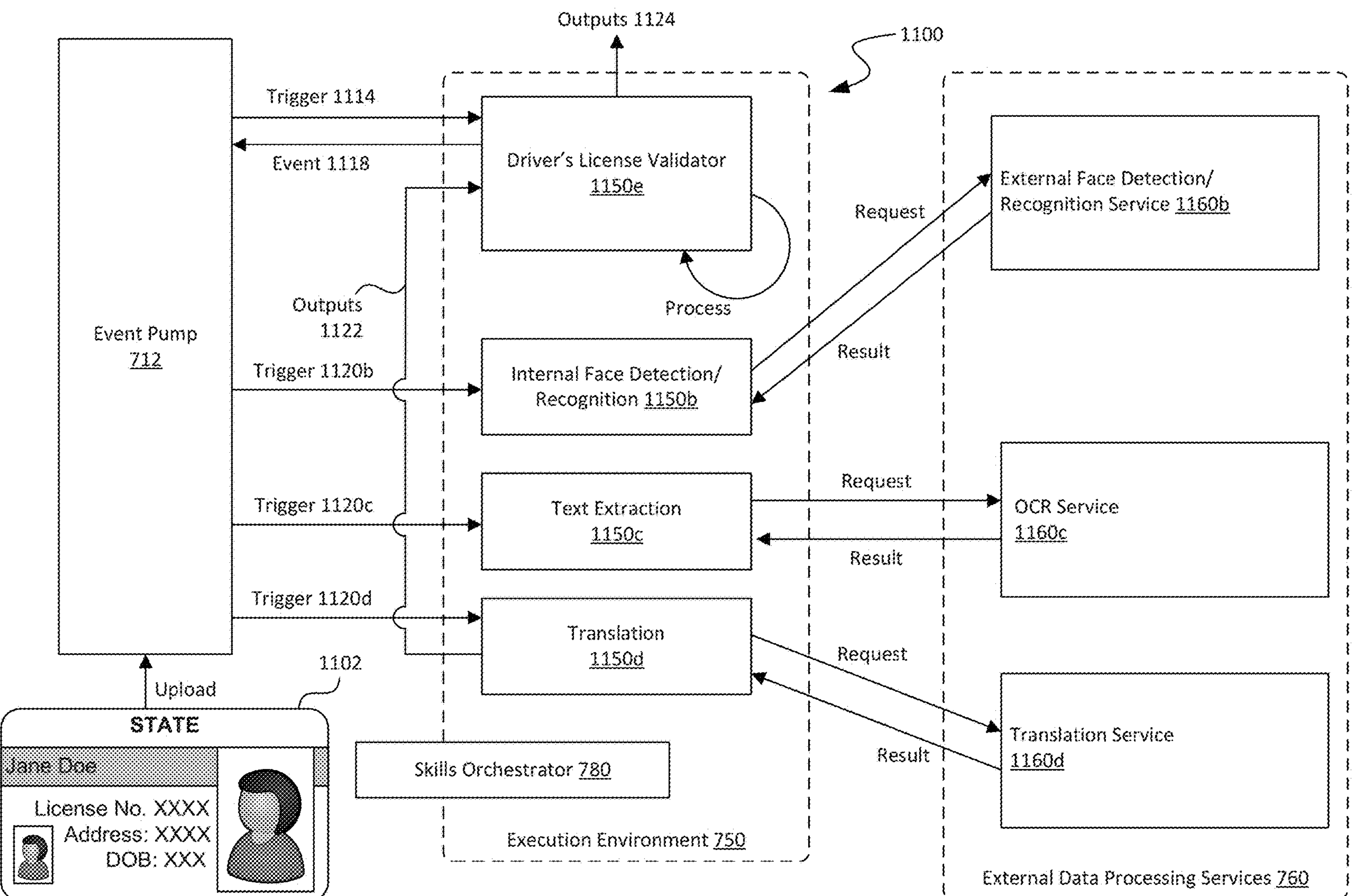
FIG. 11A, FIG. 11B, FIG. 11C, FIG. 11D, FIG. 11E, FIG. 11F, and FIG. 11G present diagrams of example systems and methods for executing a custom Skill in accordance with the example framework architecture.

FIG. 11A is a diagram of an example process 1100 for executing a custom Skill in accordance with an example framework architecture and process flow 800*a* described with respect to FIG. 8A. Note that the described process may be generally applied to any Skill that depends on the functionality of other Skills regardless of whether the Skill is built-in or not.

As shown in FIG. 11A, a driver's license validator 1050*e* associated with a custom Skill for validating drivers' licenses is automatically invoked by trigger 1114 in response to an event indicating the upload of a scan of a driver's license card. Note that the specific mechanisms leading up to the triggering of an execution entity are omitted from FIG. 11A for clarity. In some embodiments, the manner in which the execution entity is triggered may include some or all of the components and steps described with respect to the execution entities of FIGS. 7-8.

As heretofore described, a custom Skill may be based on one or more built-in Skills. Similarly, the example process 1100 depicted in FIG. 11A involves a driver's license validator Skill that is based on multiple built-in Skills, namely, a face detection/recognition Skill, a text extraction Skill, and a translation Skill. To access the functionality of the one or more built-in Skills, a custom Skill may generate outputs in the form of events that are configured to trigger the one or more built-in Skills. For example, as depicted in FIG. 11A, in response to being invoked by trigger 1114, the driver's license validator 1050*e* generates and outputs one or more events 1118. As mentioned, the one or more events that are output responsive to trigger 1114 may be configured to pass through the event pump 712 and cause the triggering (e.g., via triggers 1120*b-d*) to invoke execution entity 1150*b*, execution entity 1150*c*, and execution entity 1150*d*.

After invocation, the execution entity 1150*b*, execution entity 1150*c*, and execution entity 1150*d* associated with the various built-in Skills may process the uploaded scan of the driver's license 1102, for example, by submitting requests to and receiving results from one or more external data processing services. Specifically, in this example, an execution entity associated with an internal built-in face detection/recognition Skill (e.g., execution entity 1150*b*, as shown) may transmit a request including the uploaded scan of driver's license 1102 to an external face detection/recognition service 1160*b* such as the Microsoft® Azure Face API. In response, the built-in face detection/recognition (execution entity 1150*b*) may receive results (e.g., in the form of metadata) from the external face detection/recognition service 1160*b*. Similar exchanges may be performed between the text extraction Skill (execution entity 1150*c*) and the translation Skill (execution entity 1150*d*) of execution environment 750 and/or the OCR service 1160*c* and translation service 1160*d* in the external data processing services 760. The execution entities each may access different data processing services offered by different third-party providers.

Outputs from the execution entities 1150*b-e* are delivered into the execution entity 1150*e* that is executing a customized instance of the driver's license validator. For example, as mentioned, the execution entity 1150*b* may output metadata indicative of an identity (e.g., a name) of a person in the image of driver's license 1102. Conversely, the execution entity 1150*c* may output any extracted text from the image such as the name "Jane Doe," the license number, the address, the date of birth (DOB), etc. If any of the extracted text is not in a local language (e.g., English), the translation capability of execution entity 1150*d* may output a translation of that text. As discussed with respect to FIG. 7 and FIG. 8, the data output 1122 may simply include the results from the external data processing services. Alternatively, or in addition, the data output 1122 may include data generated by the execution entities 1150*b-e* based on their processing of results from the external data processing services 760.

The execution entity 1150*e* associated with the custom license validator Skill processes the outputs (e.g., data output 1122) received from the other execution entities 1150*b-d* and provides a final output (e.g., outputs 1124) to the cloud-based collaboration platform, for example, as described with respect to step 824 in FIG. 8A. For example, the output by the driver's license validator Skill may be a binary indicator of whether the uploaded scan of driver's license 1102 is a valid license. The output may also include a value indicative of a level of confidence in the conclusion (e.g., between 0% and 100%).

The example process 1100 depicted in FIG. 11A is provided for illustrative purposes and is not to be construed as limiting. The data flow though the framework architecture may differ depending on the requirements of a given implementation. The example process 1100 illustrates how Skills, within the meaning of this disclosure, can be configured to interact with each other. For example, any one or more of built-in Skills 1150*b-e* may similarly depend on the functionality of other Skills. For example, the text extraction and translation Skills depicted in FIG. 11A may depend on the functionality of a built-in OCR Skill. In other words, in some embodiments, triggering of the execution entities (e.g., execution entity 1150*c* and execution entity 1150*d*) at steps 1120*c-d* may cause the execution entities to output events that trigger another execution entity (not shown) to perform an OCR process on the uploaded license image. As another example, the driver's license validator Skill associated with execution entity 1150*e* may use the functionality of one or more other custom Skills instead of or in addition to the built-in Skills associated with other execution entities. More specifically, a Skill can be configured to chain together any number of other Skills to address a particular data processing scenario.

In some embodiments, various aspects of the example process 1100 depicted in FIG. 11A may be monitored, managed, coordinated, etc. by a Skills orchestrator 780. An example Skills orchestrator is described in more detail with respect to FIGS. 8A-8C. As an illustrative example in the context of process 1100, a Skills orchestrator may coordinate the processing of the content item (i.e., driver's license 1102) using the various Skills (e.g., face detection recognition, text extraction, translation, etc.) associated with the driver's license validator Skill. For example, the Skills orchestrator may monitor and confirm that a text extraction Skill has been completed successfully before allowing a translation Skill to commence.

Note that although depicted in FIG. 11A as residing in the execution environment 750, the Skills orchestrator may also reside in the cloud-based collaboration platform, for example as mentioned with respect to FIG. 8A. As an example, the Skills orchestrator may be a subcomponent of any one or more of the Skills modules 890 shown in FIG. 8A as being stored in data repository 130.

Figure 11B:
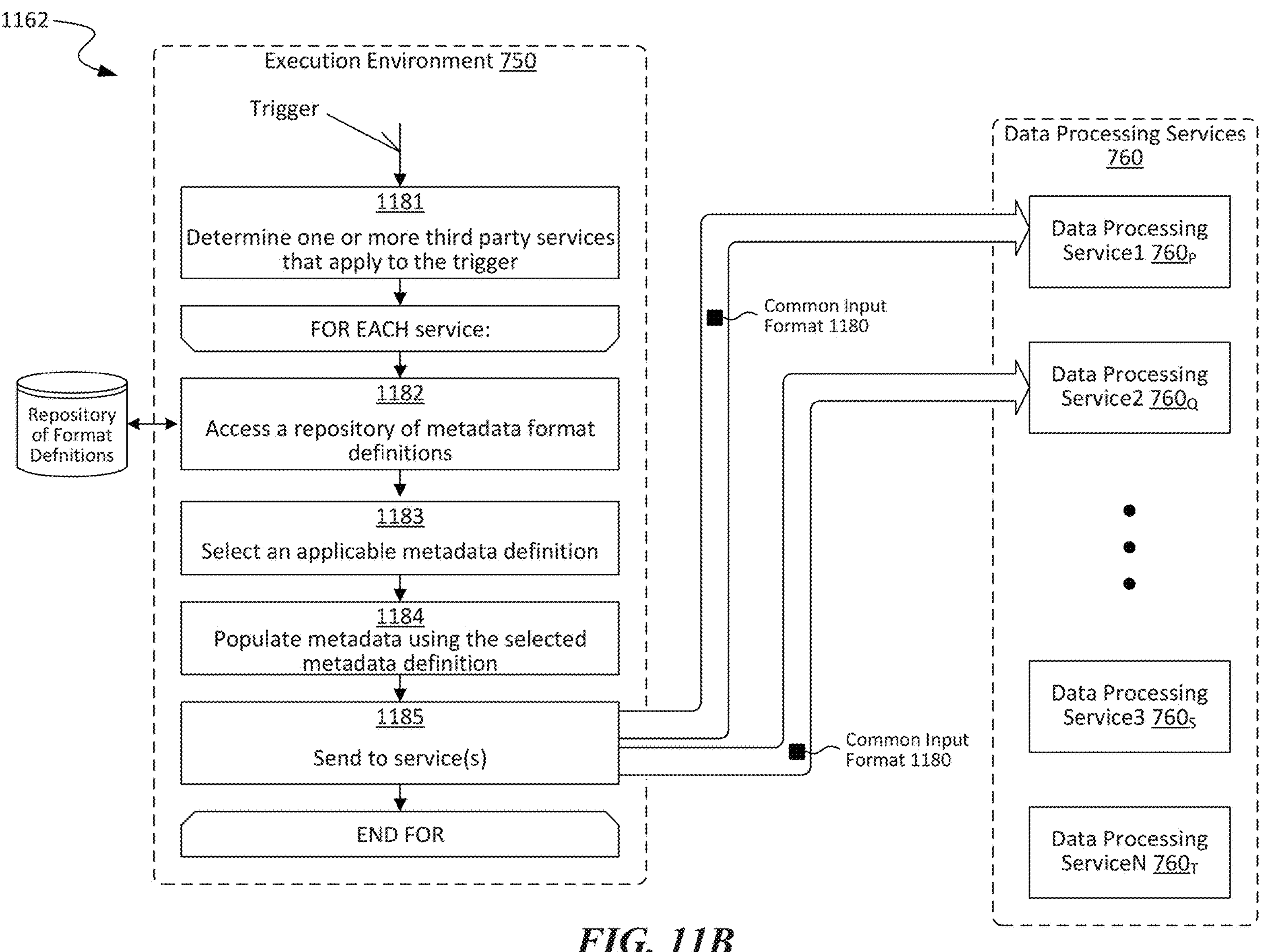

FIG. 11B shows a diagram of an example process flow 1162 for executing a custom Skill. The shown flow depicts operations that are carried out upon receipt of a trigger. In particular, the figure depicts how a message format such as the shown common input format 1180 can be used to invoke Skills at many different third-party providers. In some cases, the common input format 1180 is a standards-based format that is defined by and/or consumed by a plurality of third-party providers. In other cases, the common input format 1180 refers to the nature of the computer representation (e.g., ASCII, Unicode, etc.).

The flow 1162 commences at step 1181, where one or more operations are carried out to determine a set of third-party services that are configured by third party providers. It is possible that one provider can offer multiple services, therefore this step 1181 serves to determine which services apply to the Skills processing that underlies the received trigger. There may be many providers and possibly many services that are employed in a single session, therefore, for each service, several operations within the FOR EACH loop are performed. As shown, the loop commences at step 1182 for accessing a repository of metadata format definitions. The metadata format definitions comprise formats that can be used when interacting with any known provider. Moreover, the metadata format definitions comprise formats that apply to data content and formatting when sending a request to a service provider as well as formats that apply to data content and formatting when processing data items that are received from a service provider in response to a request. The metadata format definitions can be codified in an extensible language such as the extensible markup language (XML). Such XML and any related data and/or files that pertain to the semantics of the definitions and/or that pertain to the extensibility can be made accessible to any Skill.

As a result of the performance of step 1181 where the services pertaining to the received trigger are determined, step 1183 can be carried out to select applicable metadata definitions that apply to the determined services. As earlier indicated, the applicable metadata definitions that apply to the determined services may comprise input formats as well as output formats, some or all of which can be shared between multiple data processing services. The flow 1162 of FIG. 11B includes sending a request to one or more external data processing services 760 (e.g., data processing service1 $\mathbf{760}_P$, data processing service2 $\mathbf{760}_Q$, . . . , data processing service3 $\mathbf{760}_S$, data processing service4 $\mathbf{760}_T$, etc.). Accordingly, after selecting an applicable metadata definition pertaining to a request, the metadata is populated (at step 1184) then sent (at step 1185) to the external data processing services 760 using the selected common input format 1180. The data processing services then process the request and provide data that corresponds to the request. Inasmuch as each data processing service might be different from any other data processing service, the outputs from the various data processing services might differ. Accordingly, the outputs can undergo a process to bring the output data from any particular data processing service into a common format that is used by downstream processing. An example process flow for receiving and normalizing output data from a plurality of data processing services is shown and described as pertains to FIG. 11C.

Figure 11C:
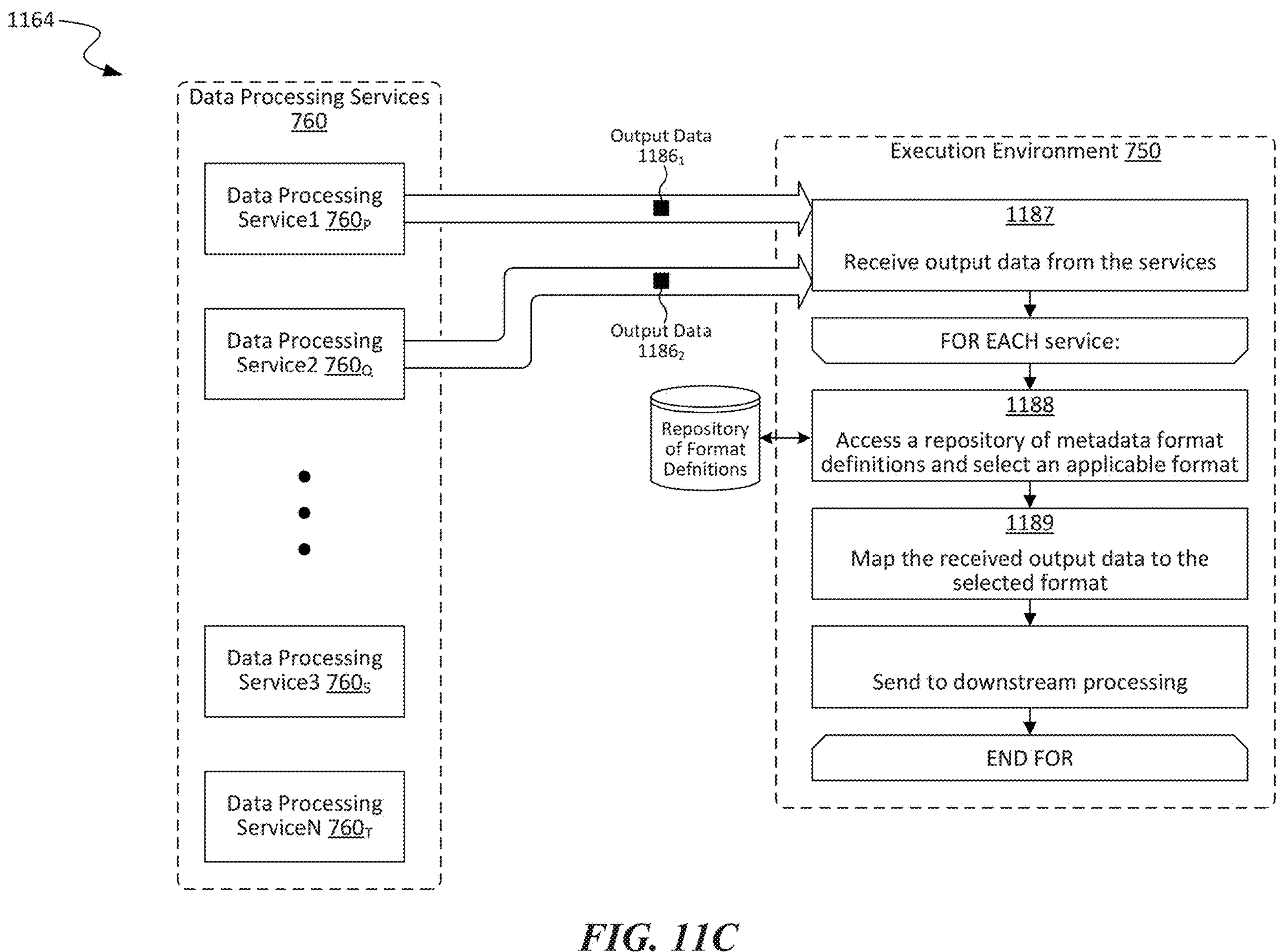

FIG. 11C shows a diagram of an example process flow 1164 for executing a custom Skill. As mentioned in the discussion of FIG. 11B, a given data processing service might provide output data formats that are different from any other data processing service. Accordingly, to bring the output data from any particular data processing service into a common format that is used by downstream processing, the flow 1164 serves to map the received output data into a common format. The mapping is based at least in part on a metadata description, which metadata description provides syntax and semantics to cover substantially all of the possible data items that might be provided by any particular data processing service.

In the shown system, the flow 1164 commences upon receiving output data from the data processing services. In the example of FIG. 11C, at step 1187, the output data is received from external data processing service1 $\mathbf{760}_P$ (output data $\mathbf{1186}_1$) and from external data processing service2 $\mathbf{760}_Q$ (output data $\mathbf{1186}_2$). This example depicts output data as being received from two data processing services, however the output data received might pertain to data outputs of any number of Skills derived from any number of external data processing services. More particularly, in some embodiments, step 1187 might be configured to receive only one set of output data (e.g., output data $\mathbf{1186}_1$). Strictly as an example, an execution environment might include network layers and/or middleware layers that perform various store and forward operations. Operations of a middleware layer might assemble several requests from several external data processing service providers such that they can be sent in a batch to one or more processing agents in execution environment 750. As such, step 1187 can receive a batch and/or other deliveries of multiple sets of output data (e.g., output data $\mathbf{1186}_1$, output data $\mathbf{1186}_2$) that originated from several external data processing services.

In any of the above embodiments, the received output data correspond to services, which in turn correspond to service requests. A loop for processing output data from each service is entered. The loop commences at step 1188 to access a repository of metadata formats, and then proceeds to select an applicable format from the repository. At step 1189, the received output data is then mapped to the selected format. In some cases, all of the received data is deemed as metadata and is thus mapped into the selected format. In other situations, some of the received output data is already in a well understood format, which format might include embedded metadata (e.g., such as the case of MP3 or MP4 data), in which situations it can happen that only certain portions (e.g., non-MP3 and/or non-MP4 data) of the received output data are mapped into the selected format. In still other cases, a particular received format (e.g., MP3) might be mapped into a different representation and/or file type (e.g., ".wav") before sending to downstream processing.

Figure 11D:
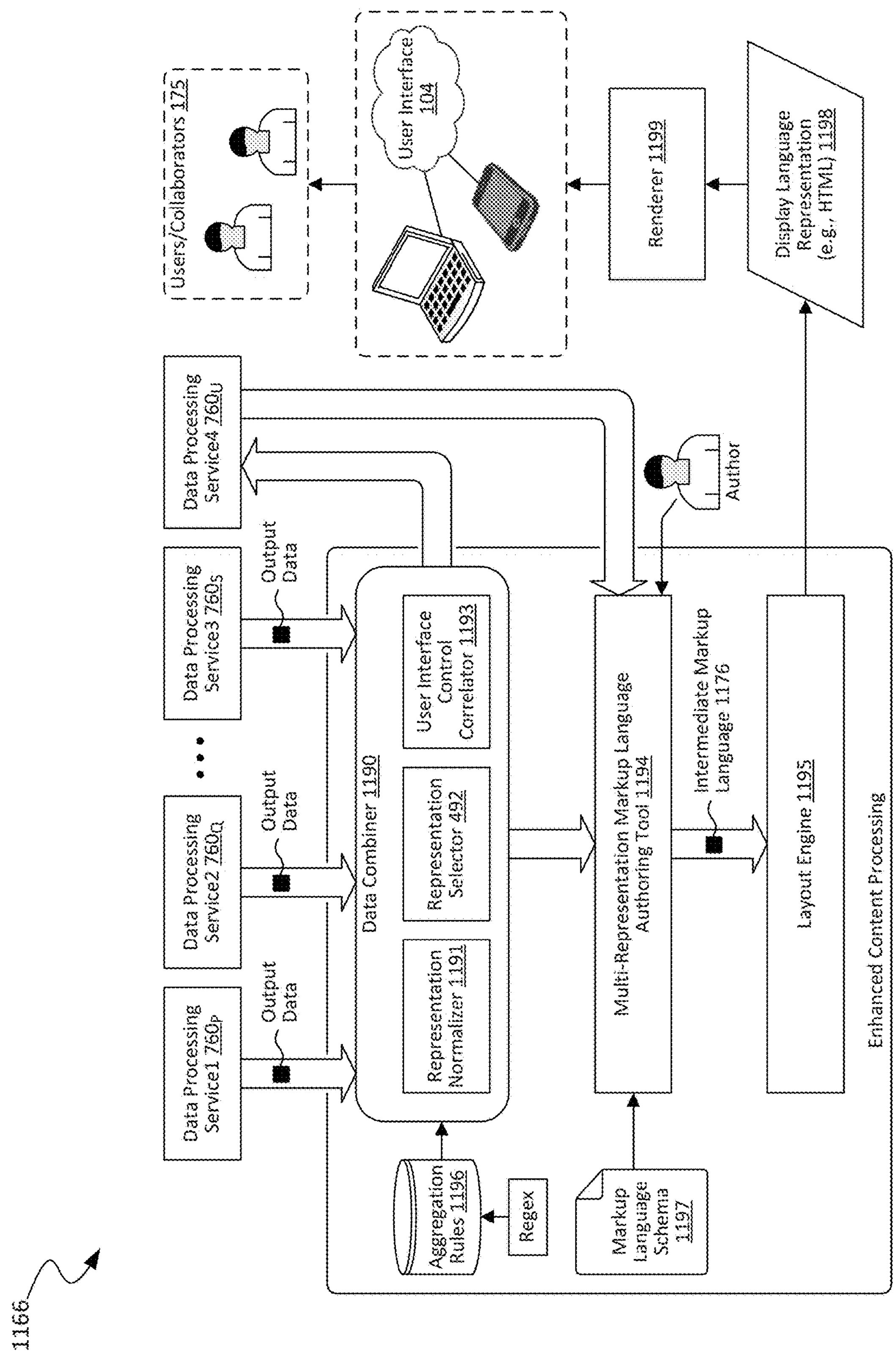

FIG. 11D shows a diagram of an example process flow 1166 for combining two or more outputs from a plurality of external data processing services. As shown, a data combiner 1190 serves to aggregate different outputs from the different services. The shown data combiner includes a representation normalizer 1191, a representation selector 492, and a user interface control correlator 1193. Any or all of the foregoing components of the data combiner can be used to form a correlated user interface in accordance with aggregation rules 1196. The aggregation rules comprise logic used for forming permitted combinations. In some cases, such logic is supplanted with regular expressions and/or a regular expression processor (e.g., depicted here as a regex processor connected to the aggregation rules 1196). Strictly as an illustrative example, a content item in the form of a video clip might have been processed by a first data processing provider that identifies and distinguishes people's faces from the video clip to produce a listing of timecode ranges where a particular face has been detected. Any user can manipulate screen devices that include screen widgets or other visual indications that correspond to the timecode ranges where the particular face has been detected. The user can select one of the indicated faces, upon which event the video clip is forwarded to the beginning of the timecode range. To generate a user interface control that permits manipulation of the video using the aforementioned widgets or other visual indications, the representation normalizer 1191 might be employed to match portions (e.g., time representations, chapters, indexes, frames, etc.) in the video to portions (e.g., corresponding time representations, chapters, indexes, frames, etc.) of the widgets. Further, the user interface control correlator 1193 might define actions to be taken upon a user interface event. Strictly as one illustrative example, a user interface control correlator 1193 might define a listener for particular user interface actions (e.g., clicks, hovering, keystrokes, etc.). The listener in turn might perform other user interface actions such as advancing the video to a particular frame. The particular frame can be determined from the timecode indication, which timecode indication is normalized between the timecode used in the video clip and the timecode used in the screen device used for the face indications. As another illustrative example, a user interface control correlator 1193 might define a listener for particular user interface actions (e.g., video frame selection, clicks, hovering, keystrokes, etc.) while a video clip is being played. The listener might perform other user interface actions such as to display a portion of a transcription that corresponds to a range of video that corresponds to the particular selected frame. The particular frame can be determined from the timecode indication, which timecode indication is normalized between the timecode used in the video clip and the timecode used in the screen device used for the transcription. Further, multiple transcriptions in different languages can be correlated using a normalized timecode.

In many scenarios, representation selector 492 serves to determine how any given particular output data is displayed in the user interface. For example, if the output data is a video clip, then representation selector 492 might select a particular embedded video player, and further determine a location of the embedded video player in the user interface. In another example, if the output data is a transcription of audio taken from a video clip, then representation selector 492 might make a determination to present the transcription in a scrolling region that is juxtaposed next to an embedded video player. Still further, the transcription in the scrolling region might be updated in synchronicity with a user's playback commands such that all or a portion of the transcription in the scrolling region comprises the particular transcription or portion thereof that corresponds to the portion of the video clip that is currently being viewed.

The foregoing are merely examples of combinations. Other combinations include juxtaposition, synchronization, control correlation, and/or other relationships between (1) video and faces, (2) transcription in a first language and transcription in a second language, (3) video and topics, (4) topics and translations, and so on. In some cases, all or portions of aspects of juxtaposition, synchronization, control correlation, and/or other relationships between any representations of data items (e.g., video, transcriptions, output data of a first type, output data of a second type, etc.) can be determined using a multi-representation markup language authoring tool 1194. The multi-representation markup language authoring tool can be operated by a human user, with or without computer-aided assistance from any external data processing services. In some cases, all inputs to the multi-representation markup language authoring tool are derived from output data from a plurality of external data processing services. More particularly, the juxtaposition, synchronization, control correlation, and/or other relationships between any representations of data items can be determined by the multi-representation markup language authoring tool based solely on output data derived from a plurality of external data processing services.

An intermediate markup language schema 1197 is defined to facilitate machine-to-machine communication. The intermediate markup language schema 1197 includes descriptions of permissible relationships between any representations of data items. Moreover, the intermediate markup language schema provides a mechanism whereby a given sample of some intermediate markup language can be parsed for well-formedness, syntactical correctness, and semantic correctness. Intermediate markup language can be received as data outputs from an external data processing service (e.g., such as from external data processing service4 760$_U$). After processing by the multi-representation markup language authoring tool, intermediate markup language that is syntactically and semantically correct is passed as intermediate markup language 1176 to a layout engine 1195. The layout engine is configured to receive syntactically and semantically correct intermediate markup language 1176, then to convert that intermediate markup language into a different display language representation 1198 (e.g., HTML), which in turn is processed by a renderer 1199 (e.g., a browser) to be displayed on user interface 104. Users/collaborators 175 interact with the user interface. In particular, collaborators interact with the correlated controls as provided by the user interface control correlator 1193.

In some embodiments, and as shown, the multi-representation markup language authoring tool 1194 processes given inputs (e.g., from the shown data processing services) to generate the intermediate markup language 1176. In particular, the multi-representation markup language authoring tool is configured to read the markup language schema 1197 (e.g., as coded in an ".xst" or similar format) and output intermediate markup language which in turn is delivered to a layout engine. The layout engine is distinguished from the display renderer at least in that the function of the layout engine is to output markup language that includes placement and/or juxtaposition of displayable items, whereas the function of the display renderer is to input markup language and render graphical display elements onto a display surface.

The multi-representation markup language authoring tool (either natively in its code, or due to semantics inherent in or encoded into the markup language schema) observes semantics that pertain to how the various output from the Skills are coordinated. Strictly as examples, the semantics that multi-representation markup language authoring tool are capable of processing include verbs such as "map" (e.g., map a series of data items in a first data output to a series of data items in a second data output), "correlate" (e.g., correlate a first user control to a second user control), "juxtapose" (e.g., place a first user control in proximity to a second user control), etc.

Characteristics of a given Skill are codified into the metadata of FIG. 11B and FIG. 11C. Mappings between data items of different Skills outputs can be made on the basis of rules that govern how a first characteristic from a first data item of a first type can be mapped and/or correlated to data items of a second data item of a second type. As an example, a data item (a frame) of a video can be mapped to a corresponding data item (e.g., an index marker or other location identifier) into scrollable text. Further, a user control of the video can be correlated to a display function of the scrollable region and vice-versa. Still further, a selection of a portion of scrollable text can be correlated to a corresponding frame to be displayed in a video player. Any of these and other semantics can be processed by the multi-representation markup language authoring tool 1194 so as to output the intermediate markup language 1176 that is then proceed by the layout engine 1195.

In some embodiments, the layout engine includes a processing layer that can be configured to output in different, selectable markup language formats, of which HTML is merely one example. In some cases, the aforementioned processing layer is capable of processing scalable vector graphics (SVG) in combination with HTML.

The depicted partitioning of FIG. 11D is purely an illustrative embodiment. Other partitions are possible. In particular, the user/author interaction with the multi-representation markup language authoring tool can be replaced by a fully automated process. One such fully automated process for enhanced content processing is shown and described in FIG. 11E.

Figure 11E:
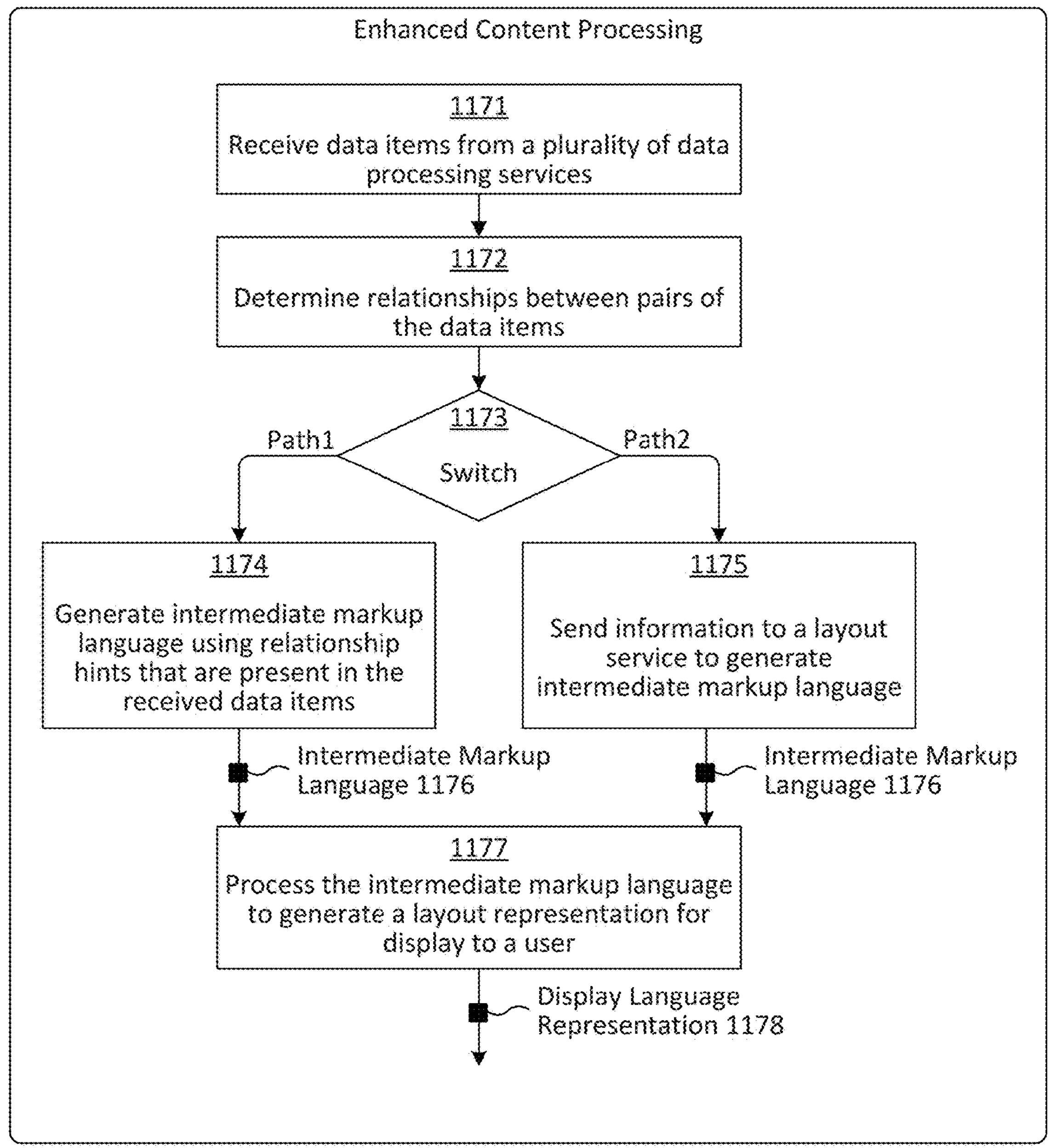

FIG. 11E depicts a process flow 1168 for enhanced content processing when executing a custom Skill in accordance with the example framework architecture described herein. As shown, the process flow 1168 commences at step 1171 by receiving data items from a plurality of external data processing services (e.g., external data processing service1 760$_P$, external data processing service2 760$_Q$, . . . , external data processing service3 760$_S$, and external data processing serviceN 760$_T$ of FIG. 11D). At step 1172, relationships between any pairs of the data items are determined. Based on the determinations, switch 1173 decides if the relationships are of a class (e.g., a simple relationship class) that facilitates generation of intermediate markup language using a markup language tool that is driven by "hints" as delivered by any one or more external data processing services, or if the relationships are of a class (e.g., a compound relationship class) such that layout would be facilitated by an additional external data processing service (e.g., external data processing service4 760$_U$). In the former case, Path1 is taken, otherwise Path2 is taken. When Path1 is taken, at step 1174, a tool such as the multi-representation markup language authoring tool 1194 of FIG. 11D is invoked to facilitate computer-aided generation of the layout (e.g., based on the aforementioned "hints" and/or administrative controls). In some cases, an author or administrator can control or influence at least some aspects of the layout via configuration of administrative controls. When Path2 is taken, at step 1175, the multi-representation markup language authoring tool 1194 is invoked to provide fully-automated generation of the layout.

When Path 1 is taken, the multi-representation markup language authoring tool emits intermediate markup language 1176 for downstream processing. On the other hand, when Path2 is taken, an external data processing service (e.g., external data processing service4 760$_U$) is invoked. In this embodiment, whether flowing through Path 1 or through Path 2, the external data processing service produces intermediate markup language 1176 that is used in downstream processing.

In this particular embodiment, the aforementioned downstream processing comprises step 1177 for processing the intermediate markup language into a layout representation. Such a layout representation is in turn converted into a display language representation 1178 that can be delivered to user interfaces. Such user interfaces can be tailored for use by an administrator (e.g., see FIG. 12) and/or can be tailored for use by an author or collaborator.

Figure 11F:
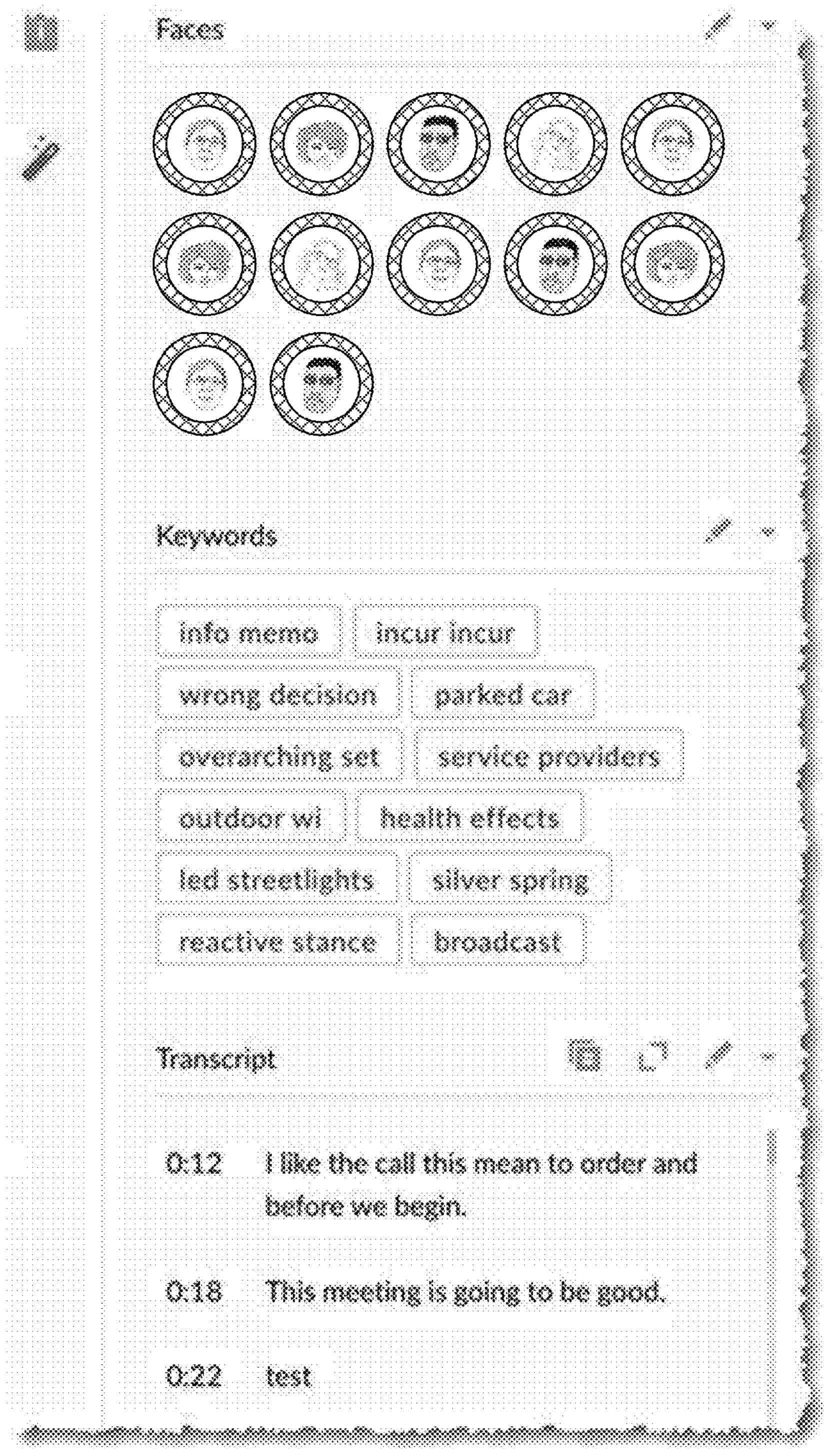

FIG. 11F depicts an illustrative example of a juxtaposition of three screen devices. Specifically, a first screen device depicts faces as were determined from a video clip, which first screen device is juxtaposed to a second screen device that depicts keywords drawn from the same video clip, which second screen device is juxtaposed to a third screen device that depicts an annotated transcript as was generated from the same video clip. The foregoing screen devices as shown and described as pertaining to this FIG. 1F are purely for illustrative purposes and many variations are possible.

Figure 11G:
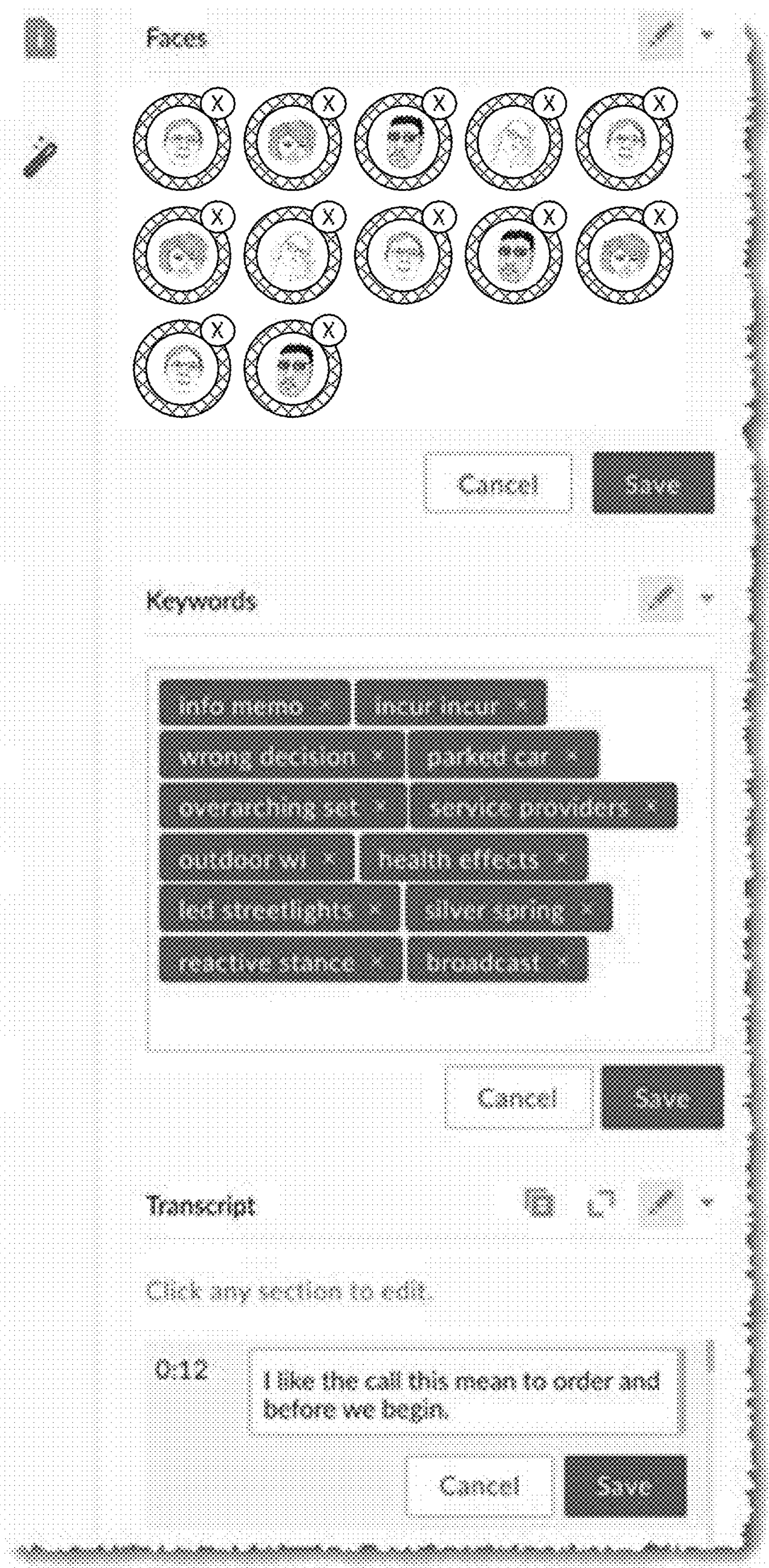

FIG. 11G depicts a variation of the juxtaposition of three screed devices. In this variation, the keywords are presented in widgets that facilitate user interactions over individual keywords. As shown, a keyword can be clicked or moved around so as to indicate keywords of interest and/or an ordering of keywords. Upon a click, any correlated screen devices (e.g., transcript display) would move to a corresponding spot (e.g., frame of a video, or timecode of a transcript). Keywords can be eliminated by clicking the "x". Furthermore, a selection including any order that was provided by the user by moving the widgets around can be saved using the "Save" button. In some cases, and as shown, the transcript screen device includes a mechanism to edit the transcription. Errors in the transcription can thus be addressed by a user.

The foregoing discussions pertaining to relationships, screen devices, and juxtapositions of screen devices based on such relationships are merely for illustration of the correlated functioning between screen devices. In some cases, a particular screen device is accompanied by a timeline. Some examples of a particular screen device accompanied by a timeline are given in FIG. 13-13F.

Example User Interfaces

FIG. 12 shows a screenshot of an example user interface for an administrator console of a cloud-based collaboration platform.

FIGS. 13A-13F shows several example user interfaces through which users may access enhanced content resulting from the execution of various example Skills. The example user interfaces are provided for illustrative purposes and are not to be construed as limiting.

FIG. 13A shows a screenshot of an example UI **1300*a* through which a user may access enhanced content resulting from an image recognition Skill. In the example depicted in FIG. 13A, a user has uploaded an image 1302*a* of a shirt to the cloud-based collaboration platform. This uploading activity may automatically trigger an image recognition Skill to process the image using an external data processing service such as Google® Cloud Vision to extract keyword metadata associated with the objects in the image. When accessing the uploaded image 1302*a* of the shirt via UI 1300*a*, the user is presented with image content metadata 1304*a* resulting from the Skill. In some embodiments, the UI 1300*a* may include an option 1306*a*** to supplement the image content metadata with user input metadata. In some cases, user input metadata may be used to train machine learning models associated with the Skill.

Figure 13B:
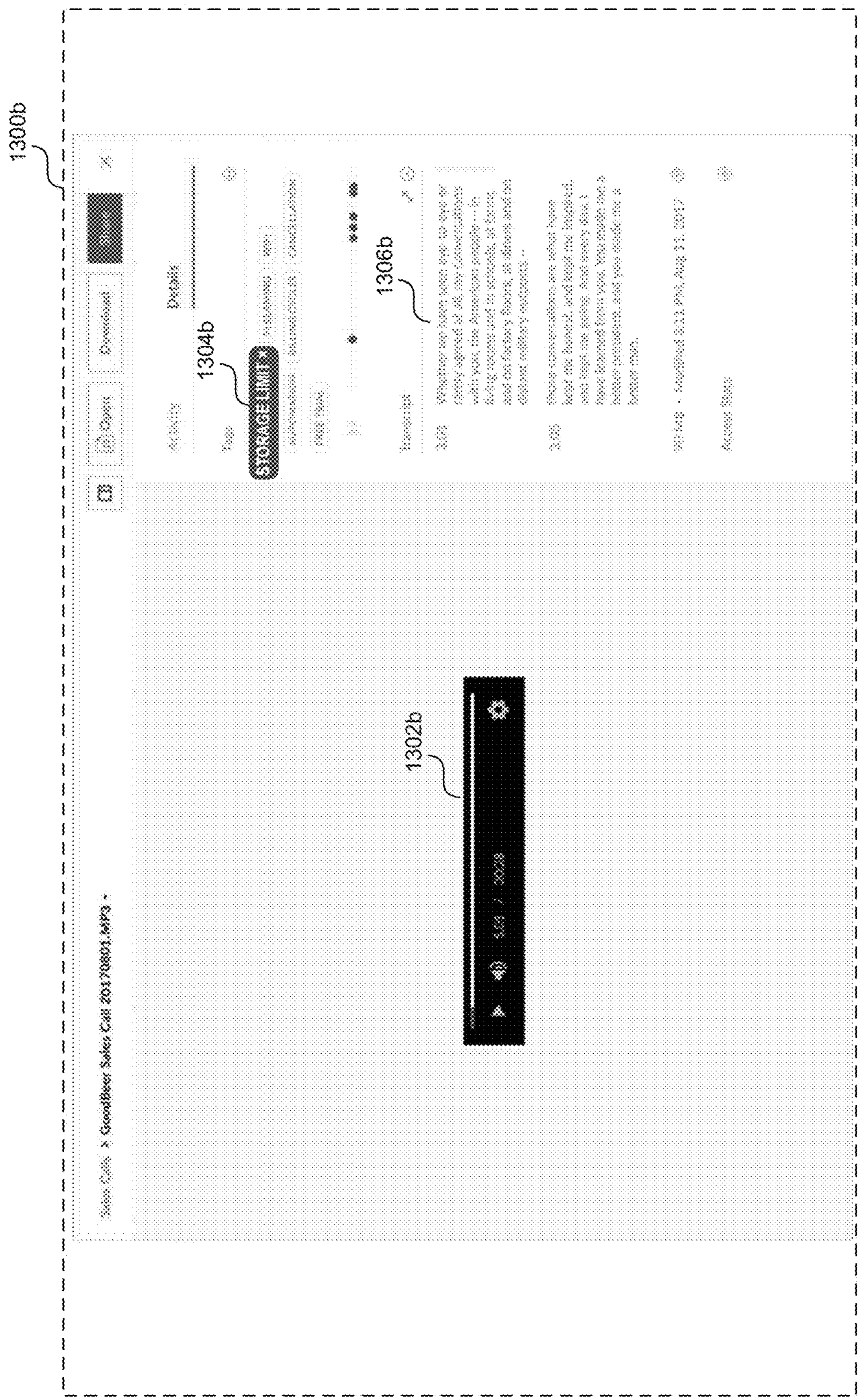

FIG. 13B shows a screenshot of an example UI **1300*b* through which a user may access enhanced content resulting from an audio transcription Skill. In the example depicted in FIG. 13B, a user has uploaded an audio file 1302*b* (e.g., comprising a recording of a sales call) to the cloud-based collaboration platform. This uploading activity may automatically trigger the transcription Skill to process the audio file using an external data processing service such as IBM® Watson to generate a transcript and to identify certain keywords. When accessing the uploaded audio file 1302*b* via UI 1300*b*, the user is presented with the transcript 1306*b* generated from the audio file as well as a listing 1304*b* of certain keywords occurring in the recoding. In some embodiments, the UI 1300*b* may include interactive features for navigating through the audio recording using the transcript and/or the identified keywords. For example, in response to selecting the "storage limit" 1304*b* tag, a user may be presented with a visual indication (e.g., shown below listing 1304*b*) of where, during the recording, the keyword "storage limit" occurs. As another example, in response to selecting a particular portion of the displayed transcript 1306*b***, a user may be presented with the corresponding portion of the audio recording (i.e., the corresponding portion will begin to play).

Figure 13C:
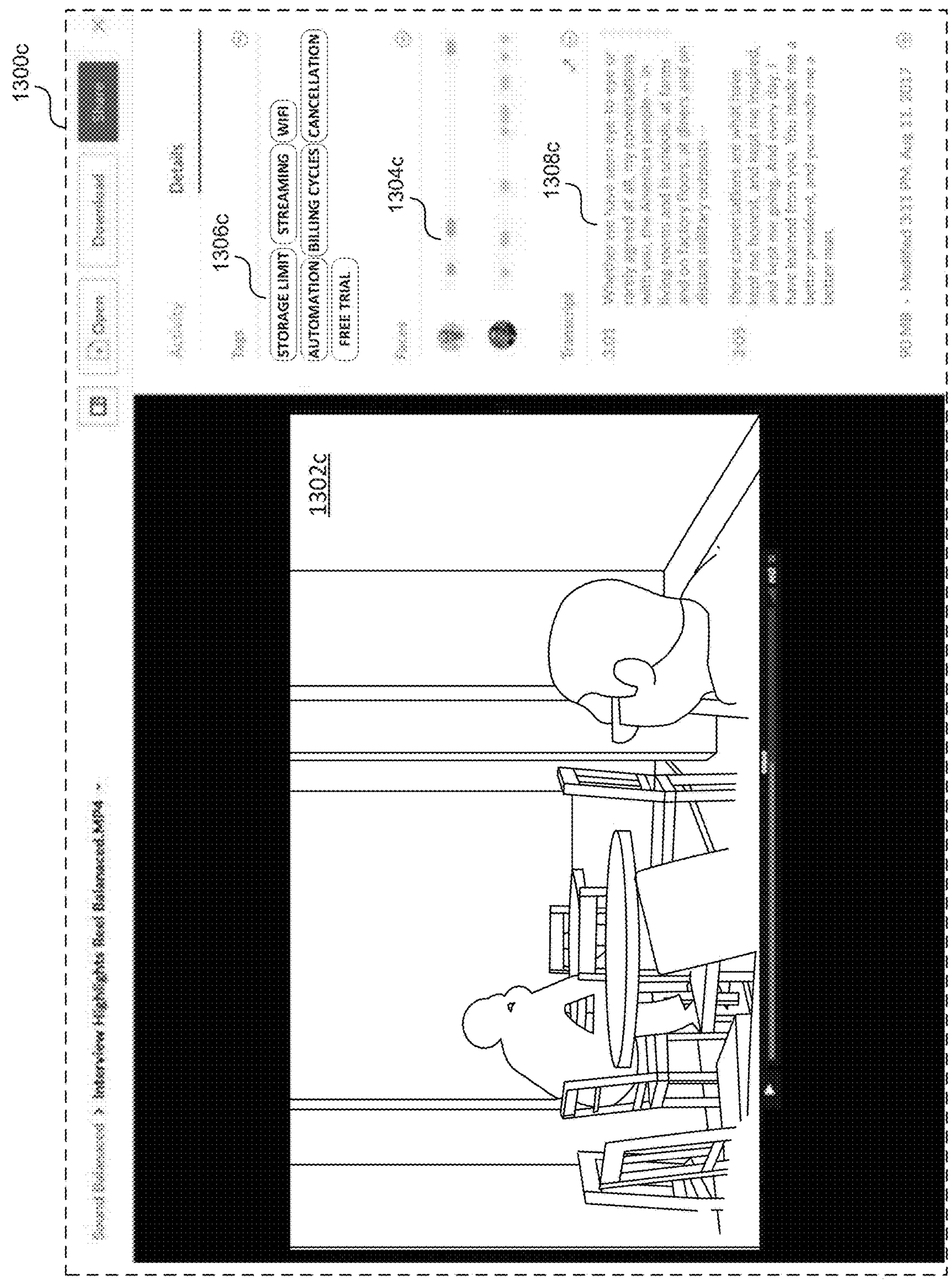

FIG. 13C shows a screenshot of an example custom UI **1300*c* through which a user may access enhanced content resulting from an intelligent video analysis Skill. In the example depicted in FIG. 13C, a user has uploaded a video file 1302*c* to the cloud-based collaboration platform. This uploading activity may automatically trigger the intelligent video analysis Skill to process the uploaded video to, for example, generate a transcript, identify certain keywords, and/or detect and recognize faces. Note that this intelligent video analysis Skill may use the functionality of one or more built-in Skills such as a transcription Skill, a face recognition Skill, etc., for example, as described with respect to FIG. 11A. As shown in FIG. 13C, the example UI 1300*c* includes the displayed video 1302*c* as well as enhanced metadata-based features such as a listing of recognized faces 1304*c*, a listing of topic tags 1306*c***, and the generated transcript

1308*c*. The metadata-based features may be interactive in some embodiments. For example, similar to as described with respect to FIG. 13B, in response to selecting one of the identified faces 1304*c* or keyword tags 1306*c*, a user may be presented with a visual indication of where, during the video, a word corresponding to the keyword is spoken, an object corresponding to the keyword is displayed, or the selected individual is displayed. As another example, in response to selecting one of the identified faces 1304*c*, a user may be presented with other content stored in the cloud-based collaboration platform that is associated with the same individual. Similarly, in response to selecting one of the keyword tags 1306*c*, a user may be presented with other content stored in the cloud-based collaboration platform that is associated with the same or similar topic.

Figure 13D:
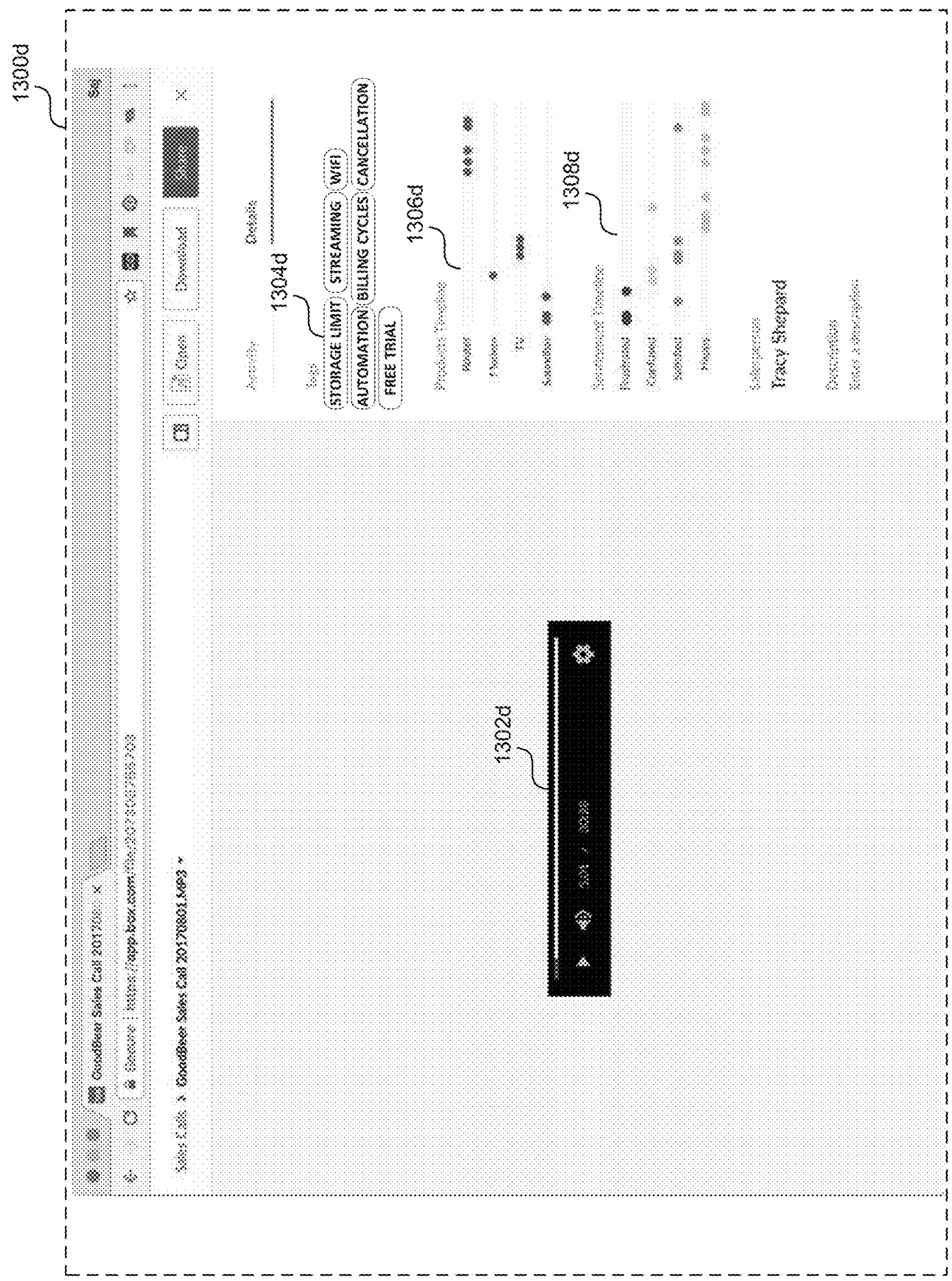

FIG. 13D shows a screenshot of an example custom UI 1300*d* through which a user may access enhanced content resulting from a call center audio analysis Skill. In the example depicted in FIG. 13D, a user has uploaded an audio file 1302*d* to the cloud-based collaboration platform. This uploading activity may automatically trigger the call center audio analysis Skill to process the audio file using one or more external data processing services such as IBM® Watson. This custom Skill may have been tailored to extract particular business-specific insights. For example, the call center audio analysis Skill may be configured to process the uploaded audio file 1302*d* to identify certain keywords, identify references to products and/or services, and/or perform sentiment analysis. As with other custom Skills, this call center audio analysis Skill may use the functionality of one or more built-in Skills such as an audio transcription service, an optical character recognition service, a sentiment analysis service etc., for example, as described with respect to FIG. 11A. As shown in FIG. 13D, the example UI 1300*d* includes the uploaded audio file 1302*d* as well as enhanced metadata-based features such as a listing of topic tags 1304*d*, a visual 1306*d* indication when certain products are mentioned during the call, and a visual indication 1308*d* of the sentiment of a call participant (e.g., a customer) during the call. The metadata-based features may be interactive in some embodiments. For example, similar to as described with respect to FIG. 13B, in response to selecting one of the identified keyword tags 1304*d*, a user may be presented with a visual indication of where during the audio a word corresponding to the keyword is spoken. As another example, in response to selecting one of the sentiment indicators in the visual listing 1308*d*, a user may be presented with the portion of the audio recording corresponding to the detected sentiment. As another example, in response to selecting one of the keyword tags, a user may be presented with other audio recordings stored in the cloud-based collaboration platform that are associated with similar keyword tags.

Figure 13E:
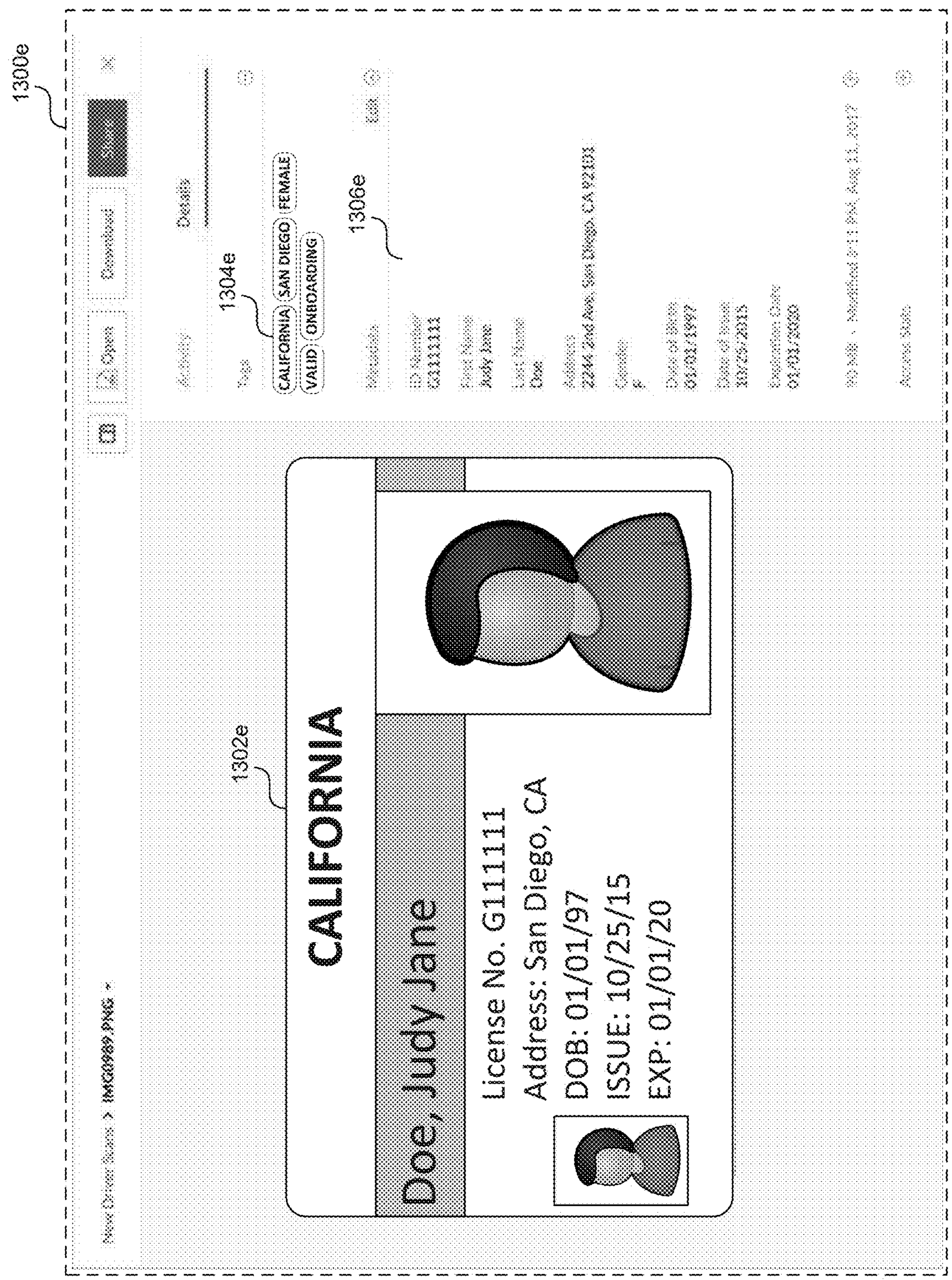

FIG. 13E shows a screenshot of an example custom UI 1300*e* through which a user may access enhanced content resulting from a driver's license validation Skill, for example as described with respect to FIG. 11A. In the example depicted in FIG. 13E, a user has uploaded a scanned image 1302*e* of a driver's license to the cloud-based collaboration platform. This uploading activity may automatically trigger the driver's license validation Skill to process the scanned image using one or more data processing services, again as described with respect to FIG. 11A. As shown in FIG. 13E, the example UI 1300*e* includes the uploaded image 1302*e* of the driver's license as well as enhanced metadata-based features such as a listing of identified topic tags 1304*e* and listing of relevant metadata 1306*e*. The metadata included in listings 1304*e* and/or 1306*e* may have resulted from an intelligent text extraction Skill applied to the scanned image and/or a face recognition Skill applied to the scanned image. For example, in an embodiment, the driver's license validation Skill may use a face recognition Skill (e.g., that uses Microsoft® Azure) to identify the person depicted in the scanned image of the license and may then access another internal or external database of information to retrieve metadata associated with the identified person. In this example, the information retrieved from the database may supplement or replace any metadata extracted from the image through a text extraction Skill. Although not depicted in FIG. 13E, the listing 1306*e* of metadata may include other types of metadata such as a generated determination on whether the scanned driver's license is valid or not. As with other described UIs, the example UI 1300*e* may include interactive features. For example, in response to a user selecting the person's name (e.g., Judy Jane Doe), a user may be presented with other documents stored in the cloud-based collaboration platform 1300*e* that are associated with the same individual (e.g., citations, application forms, contracts, etc.). As another example, in response selecting one of the keyword tags 1304*e* (e.g., San Diego), a user may be presented with a listing of all driver's license scans stored in the cloud-based collaboration platform that are associated with the same tag (e.g., driver's having addresses in San Diego).

Figure 13F:
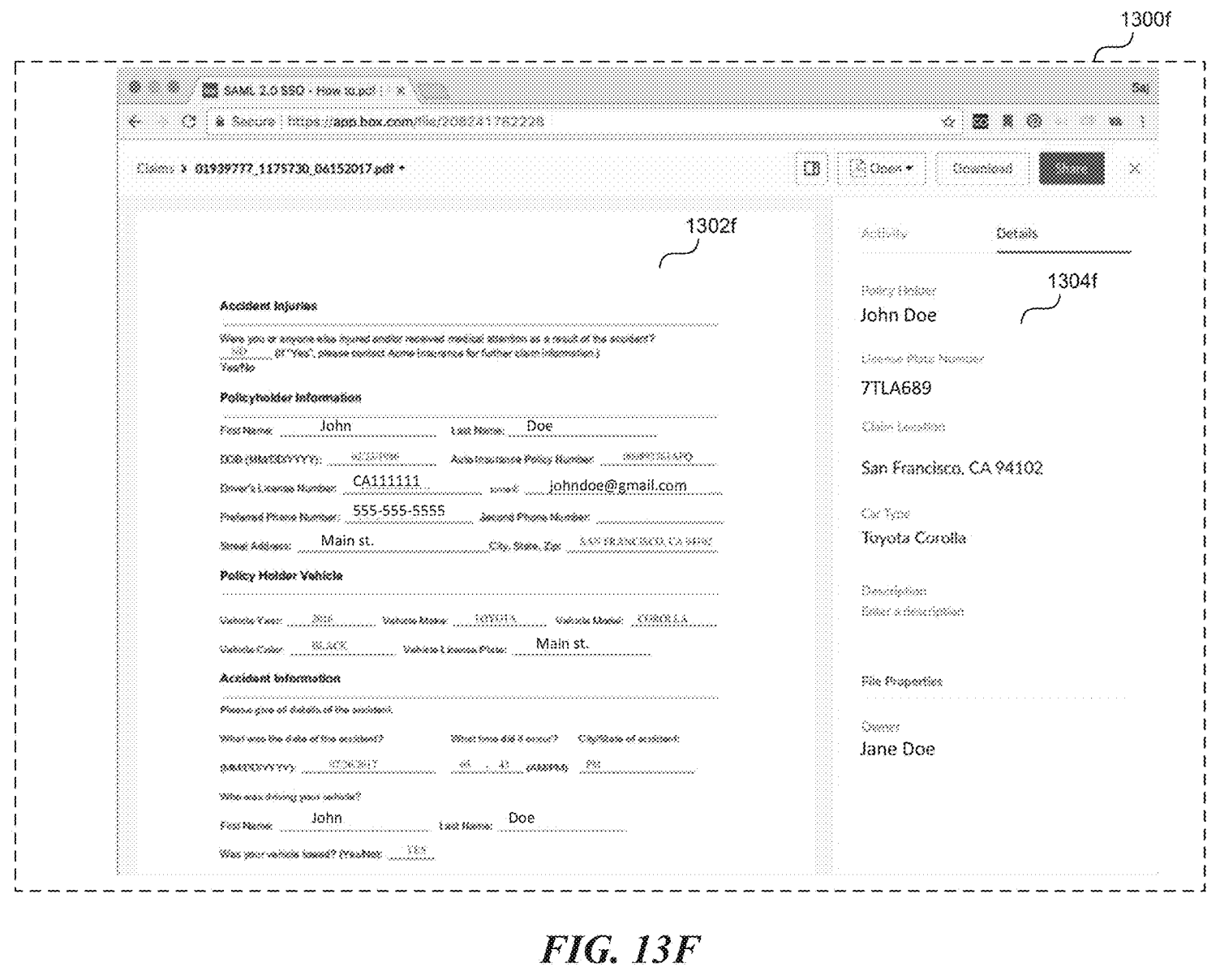

FIG. 13F shows a screenshot of an example custom UI 1300*f* through which a user may access enhanced content resulting from an intelligent form extraction Skill. In the example depicted in FIG. 13F, a user has uploaded a scanned image 1302*f* of a filled-out insurance claim form to the cloud-based collaboration platform. This uploading activity may automatically trigger the intelligent form extraction Skill to process the scanned image using one or more data processing services, similar to as described with respect to FIG. 11A. As shown in FIG. 13F, the example UI 1300*f* includes the uploaded image 1302*f* of the filled-out claim form as well as enhanced metadata-based features such as a listing of relevant metadata 1304*f* The metadata included in listing 1304*f* may have been extracted from the uploaded image 1302*f* (e.g., using a text extraction Skill). In an embodiment, the intelligent form extraction Skill may be configured to recognize the uploaded image 1302*f* as a claim form (e.g., a machine learning model trained with templates of other claim forms), and recognize the relevancy of the information in certain fields of the form. For example, the intelligent form extraction Skill described with respect to FIG. 13F may have been configured to only extract a name of the policy holder, a license plate number, the location of the claim, the type of car, etc. Alternatively, or in addition, some of the metadata included in listing 1304*f* can be sourced from other related documents that have been uploaded (e.g., a driver's license scan, a filled out police report, etc.). As with other described UIs, the example UI 1300*f* may include interactive features. For example, in response to selecting the name of the policy holder (i.e., John Doe) via the listing 1304*f*, a user may be presented with other data (e.g., driver's license scan, copy of insurance policy card, police report, other driver's information, etc.) associated with the current claim and/or may be presented with data associated with past claims by the policy holder. As another example, in response selecting the vehicle type (i.e., Toyota Corolla) via listing 1304*f*, a user may be presented with statistics on past claims associated with the same or similar vehicle.

In some embodiments, various components of the previously described example user interfaces may be based on predefined interactive and non-interactive visualization features that are available for implementation by a Skills author. These predefined UI elements are referred to as "cards." Example UI cards may include "keywords," "timelines," and "transcriptions." Consider again, for example, the UI 1300*c* depicted in FIG. 13C that may be implemented to view enhanced content associated with an intelligent video analysis Skill. Recall that the example UI 1300*c* may include a listing of recognized faces 1304*c*, a listing of topic tags 1306*c*, and a generated transcript 1308*c*. In this example, any one or more of these UI elements may represent one or more predefined UI cards that were selected for incorporation into the UI by a developer of the intelligent video analysis Skill. In other words, without having to generate code that specifically defines how to present enhanced content in a UI, the intelligent video analysis Skill may incorporate predefined UI cards such as a "faces" card to display the listing of recognized faces 1304*c*, a "keywords" card to display the listing of topic tags 1306*c*, and a "transcript" card to display a generated transcript 1308*c*. Predefined UI cards may be made available to a develop of a Skill, for example, in the form of template code that can be incorporated into the Skills code or some other type of API mechanism. In some embodiments, the UI cards displayed in a UI may be selectable by an end-user accessing the enhanced content. For example, a developer may generate a Skill that makes several UI cards available for selection by an end-user when accessing a content item. Alternatively, or in addition, UI cards may be selected for display by an administrator, for example, via an administrator interface console.

Figure 13G:
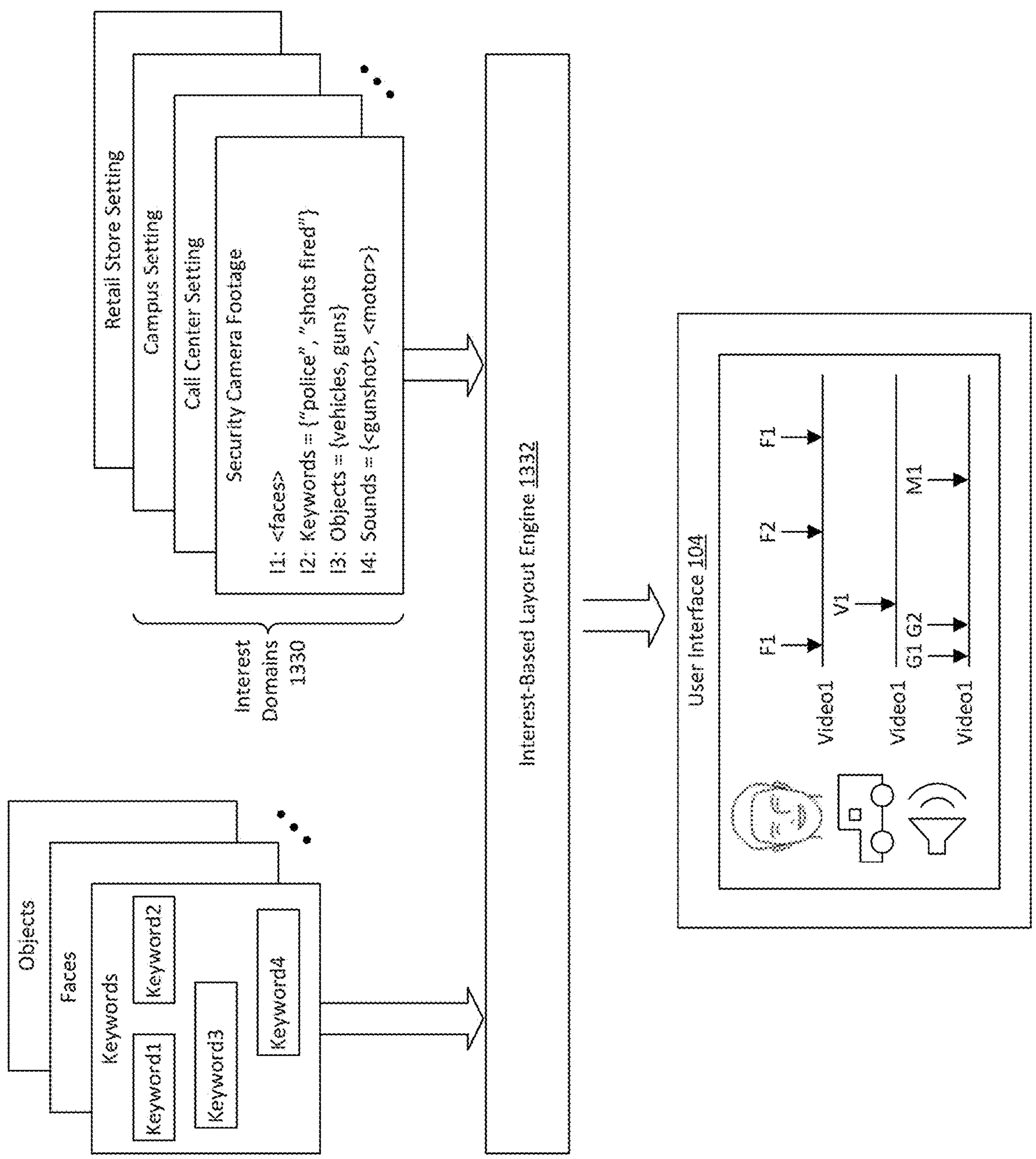
FIG. 13G is a block diagram illustrating an example of a layout system in which at least some embodiments described herein can be implemented.

FIG. 13G is a block diagram illustrating an example of a layout system in which at least some embodiments described herein can be implemented. As shown, the layout system comprises an interest-based layout engine 1332. The interest-based layout engine is configured to accept inputs in the form of any types of data that have been output by any one or more Skills. In some cases, the Skills are selected by considering one or more selections from a given set of interest domains 1330. The interest domains can be codified in a data structure or language. Any number of interest domains can be provided. As shown, the interest domain pertaining to "Security Camera Footage" includes codification of several specific interests (interest I1, interest I2, interest I3, Interest I4). Each specific interest defines an aspect that can be delivered as an input to the Skill. As shown, interest I1 pertains to "Faces" (e.g., depicted as <faces>); interest I2 pertains to "Keywords" or key phrases (e.g., "police", "shots fired"), which keywords or key phrases are listed in a data structure; interest I3 pertains to "Objects"; and interest I4 pertains to "Sounds".

All or portions of an interest specification can be used as inputs to Skills. For example, an input to a Skill might include "raw" video in combination with an interest specification. The output of that Skill will be a version of the video with embedded and/or other timewise correlated tags. As such, the data output from a Skill might include timewise indications of the specified interests. In the example shown, the invocation of one or more Skills results in delivery of "Keywords", "Faces" and/or "Objects" that correspond to the specified keywords, faces and/or interests. The combination of one or more of the interest domains 1330 and the outputs of the Skills that result from a corresponding invocation can be used by the interest-based layout engine 1332 to generate a user interface 104 such as the user interface depicted in this FIG. 13G. As shown, since the interests provided to the Skill included "Faces", the user interface includes a video timeline that depicts when a particular face was identified in the video (e.g., as depicted by the tags "F1" and "F2"). Also, as shown, since the interests included "Faces", "Keywords", "Objects", and "Sounds", and further, since the "Objects" specification included "vehicles", a timeline of the video is presented with an indication of a timecode in the video where a vehicle had been identified (e.g., as depicted by the tag "V1"). For example, the indication of a timecode may be associated with an occurrence of a face, or a keyword, or an object, or a topic, or a sound.

Skills processing and the corresponding outputs can pertain to any number of settings, which in turn can correspond to any number of interests. Furthermore, Skills processing and the corresponding outputs can correspond to any number or complexity of specifications. For example, and as shown, interest I4 includes "Sounds", the specification of which is codified using references to sampled sounds, such as "<gunshots>" (designated as "G1", and "G2"), the sound of a "<motor>" (designated as "M1"), and so on.

As an example of another setting with another set of interests and another set of interest specifications, consider a call center where customers of an enterprise call in to place orders, check on the status of transactions, register complaints, etc. At the beginning of a customer call, the customer acknowledges that "this call may be recorded for quality assurance and training purposes". The call is recorded (e.g., to an MP3 or other audio file) and a Skill that serves to process audio files for call centers can be invoked to process the recorded call to determine the nature of the call. A specified interest in the nature of the call might request tagging of particular call events by name, such as "Product Inquiry", "Telephone Order", "Return Request", etc. Furthermore, a Skill that serves to process audio files for call centers can be invoked to process the recorded call to determine the sentiment of the call. In such cases, the interest in the sentiment might be specified to include the interest "Sentiment", the detailed specification of which is codified using references to a set of sentiment classifications such as "<angry>", "<satisfied>", and so on. The sentiment classifications can be predetermined, or the classification determinations can be left to the functioning of the Skill. Metadata that corresponds to output of such a sentiment Skill can be extended as new needs arise. More particularly, any of the aforementioned metadata format definitions can be codified in an extensible language such as the extensible markup language (XML). Such XML and any related data and/or files that pertain to the semantics of the definitions and/or that pertain to the extensibility can be made accessible to any Skill.

Upon receipt of output from a Skill, the interest-based layout engine 1332 can represent the audio in a screen device that visually highlights a correspondence between the progression of the audio and any extracted keywords and/or topics, and/or the nature of the call, and/or the sentiment of the call, etc. In some embodiments, the sentiment is tagged over the time duration of the audio such that, at a particular moment in time where a particular sentiment is identified, that timewise position on the audio recording is identified, possibly being annotated with the name or tag of the sentiment classification (e.g., "satisfied").

As illustrated by the foregoing example settings and series of interests, a Skill can be configured to perform any of a wide variety of analyses over any of a wide variety of inputs (e.g., video clip input, audio clip input, text input, etc.).

Further, a Skill can be configured to output a wide range of results having particular contents (e.g., keywords, topics, faces, sentiment classifications, etc.) and in particular formats (e.g., a tagged video file, a tagged audio file, still images, etc.).

Example Processing System

FIG. 14 is a block diagram illustrating an example of a processing system 1400 in which at least some of the operations described herein can be implemented. The processing system 1400 may include one or more central processing units ("processor") 1402, main memory 1406, non-volatile memory 1410, network adapter 1412 (e.g., network interfaces), display 1418, input/output device 1420, control device 1422 (e.g., keyboard and pointing devices), drive unit 1424 including a storage medium 1426 and signal generation device 1430 that communicate via a bus 1416. The bus 1416 is illustrated as an abstraction that represents any one or more separate physical buses, point to point connections, or both connected by appropriate bridges, adapters, or controllers, etc. The bus 1416, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), an IIC (I2C) bus, or an Institute of Electrical and Electronics Engineers (IEEE) standard 1394 bus, also called "Firewire."

In various embodiments, the processing system 1400 operates as a standalone device, although the processing system 1400 may be connected (e.g., wired or wirelessly) to other machines. For example, the processing system 1400 may include a terminal that is coupled directly to a network appliance. As another example, the computing system 1400 may be wirelessly coupled to the network appliance.

In various embodiments, the processing system 1400 may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, i.e., any portable, mobile, hand-held device or any machine capable of executing a set of instructions (sequential or otherwise) that specify actions to be taken by the computing system.

While the main memory 1406, non-volatile memory 1410, and storage medium 1426 (also called a "machine-readable medium") are shown to be a single medium, the term "machine-readable medium" and "storage medium" should be taken to include a single medium or multiple media (e.g., a centralized or distributed database and/or associated caches and servers) that store one or more sets of instructions 1428. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure may be implemented as part of an operating system or a specific application, component, program, object, module, or sequence of instructions referred to as "computer programs." The computer programs typically comprise one or more instructions (e.g., instructions 1404, 1408, 1428) set at various times in various memory and storage devices in a computer, and that, when read and executed by one or more processing units or processors 1402, cause the processing system 1400 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices, floppy and other removable disks, hard disk drives, optical disks (e.g., Compact Disk Read-Only Memory (CD ROMS), Digital Versatile Disks (DVDs)), and transmission type media such as digital and analog communications links.

The network adapter 1412 enables the processing system 1400 to mediate data in a network 1414 with an entity that is external to the processing system 1400, such as a network appliance, through any known and/or convenient communications protocol supported by the processing system 1400 and the external entity. The network adapter 1412 can include one or more of a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 1412 can include a firewall which can, in some embodiments, govern and/or manage permission to access/proxy data in a computer network and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, including intrusion prevention, intrusion detection, next-generation firewall, personal firewall, etc.

As indicated above, the techniques introduced here are implemented by, for example, programmable circuitry (e.g., one or more microprocessors), programmed with software and/or firmware, entirely within special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above or to the extent that any such embodiments might be mutually exclusive in function and/or structure.

Although the present innovation has been described with reference to specific exemplary embodiments, it will be recognized that the disclosure is not limited to the embodiments described, but can be practiced with modifications within the spirit and scope of the appended claims. Accordingly, the specification and drawings are to be regarded in an illustrative sense rather than a restrictive sense.

From the foregoing, it will be appreciated that specific embodiments of this disclosure have been described herein for purposes of illustration, but that various modifications may be made without deviating from the scope of this disclosure. Accordingly, this disclosure is not limited except as by the appended claims.

What is claimed is:

1. A method of combining two or more outputs of two or more data processing services, the method comprising:

detecting an event in a cloud-based collaboration platform in a network, the event corresponding to at least one content item in the cloud-based collaboration platform;

in response to detection of the event, triggering an analysis of the event and the at least one content item at least to:

determine a first data processing service and a second data processing service to apply to the at least one content item; and determine a common metric to correlate a first output and a second output;

invoking the first and the second data processing services to respectively generate the first and the second outputs, wherein the first output is generated by the first data processing service to satisfy a first output requirement of a first vendor that provides the first data processing service from a first external network, and the second output is generated by the second data processing service to satisfy a second output requirement of a second vendor that provides the second data processing service from a second external network;

storing, in stored data, at least respective portions of the first and the second outputs and corresponding metadata that relates a first respective portion of the first output and a second respective portion of the second output based at least in part on the common metric; and combining the first respective portion of the first output and the second respective portion of the second output at least by accessing a query interface to the stored data to retrieve at least the first and the second respective portions and the corresponding metadata and further by transforming the first respective portion or the second respective portion to satisfy an output requirement of the cloud-based collaboration platform, wherein the output requirement pertains to at least one permissible combination relationship between the first and the second outputs.

2. The method of claim 1, further comprising:

transforming the first respective portion of the first output or the second respective portion of the second output to one or more widgets based at least in part upon am intermediate markup language schema to satisfy the output requirement of the cloud-based collaboration platform; and determining two representations respectively corresponding to the first and the second outputs.

3. The method of claim 2, wherein the two representations comprise two graphical display elements, wherein the intermediate markup language schema is defined to facilitate communications between the cloud-based collaboration platform and a first computing system in the first external network providing the first data processing service or a second computing system in the second external network providing the second data processing service.

4. The method of claim 3, further comprising parsing the first respective portion or the second respective portion for a correct form, correct syntax, or correct semantic based at least in part upon the intermediate markup language schema, wherein the two graphical display elements comprise correlated controls.

5. The method of claim 1, wherein the query interface receives a query in a query language, an interest capture module formulates the query based at least in part upon a request of a user on the cloud-based collaboration platform, the request includes information concerning a first content portion and a second content portion of the at least one content item, and the first and the second content portions are respectively determined by the first and the second data processing services.

6. The method of claim 5, wherein the query language comprises at least one of one or more search terms, one or more search predicates, or one or more query results output specifications, and the query comprises a specification of the common metric.

7. The method of claim 1, further comprising:

receiving a first metric corresponding to the common metric from the first data processing service in the first external network;

receiving a second metric corresponding to the common metric from the second data processing service in the second external network; and transforming the first respective portion into for a widget or a visual indication; and presenting the first respective portion and the second respective portion to a user on the cloud-based collaboration platform so that the widget or the visual indication, when actuated, triggers the first data processing service to output of processing a corresponding portion of the at least one content item, wherein the corresponding portion corresponds to the widget or the visual indication determined from the first respective portion.

8. The method of claim 1, wherein the common metric to correlate outputs from the first and the second data processing services comprises at least one of a timecode, a page number, a slide number, or an index marker.

9. The method of claim 1, wherein the first and the second data processing services comprises two or more of video analytics processing, face recognition from the at least one content item, recognition of textual information from an image, replay of a multimedia content service, a language translation service, or a sentiment analysis service.

10. The method of claim 1, further comprising:

determining one or more relationships between a first representation of the first respective portion and a second representation of the second respective portion, wherein the one or more aspects comprise at least one of a juxtaposition relationship or a control relationship.

11. The method of claim 1, wherein at least one of the outputs or the corresponding metadata that relates the two or more outputs based on the common metric comprises an indication of a face, a keyword, an object, a topic, or a sound, and the first and the second processing services applied to the at least one content item are executed in parallel.

12. The method of claim 1, further comprising:

receiving the first respective portion of the first output generated from the at least one content item by the first data processing service in the first external network; and combining the first respective portion and the second respective portion at least by receiving the second respective portion from the second data processing service in the second external network, wherein the second data processing service processes the first respective portion to generate at least the second respective portion.

13. The method of claim 1, receiving the first respective portion of the first output generated from the at least one content item by the first data processing service in the first external network; and combining the first respective portion and the second respective portion at least by receiving the second respective portion from the second data processing service in the second external network, wherein the second data processing service processes the first respective portion to generate at least the second respective portion, wherein the first and the second data processing services to apply to the at least one content item are executed serially, wherein the first output from the first data processing service of the first and the second data processing services is used as an input to the second data processing service of the first and the second data processing services.

14. The method of claim 1, wherein the at least one content item comprises a first content item and a second content item, a plurality of users collaborate on the at least one content item stored in the cloud-based collaboration platform at least by performing a function on the at least one content item, and the function comprises at least one of reading the at least one content item, viewing the at least one content item, or modifying the at least one content item.

15. The method of claim 14, wherein the first content item is a file of a first file type, and the second content item is a file of a second file type.

16. The method of claim 1, wherein the first output is in a first format, the second output is in a second format, and the first and the second outputs are respectively converted into a form that complies with a syntax requirement and a semantic requirement of the cloud-based collaboration platform.

17. The method of claim 16, further comprising verifying validity of the at least one content item based at least in part upon the first respective portion of the first output and the second respective portion of the second output, wherein the first output is produced by the first data processing service in the first external network provided by the first vendor and the second output is produced by the second data processing service in the second external network provided by the second vendor.

18. A non-transitory computer readable medium having stored thereon a sequence of instructions which, when stored in memory and executed by one or more processors, causes the one or more processors to perform a set of acts for combining two or more outputs of two or more data processing services, the set of acts comprising:

detecting an event in a cloud-based collaboration platform in a network, the event corresponding to at least one content item in the cloud-based collaboration platform;

in response to detection of the event, triggering an analysis of the event and the at least one content item to:

determine a first data processing service and a second data processing service to apply to the at least one content item; and determine a common metric to correlate a first output and a second output;

invoking the first and the second data processing services to respectively generate the first and the second outputs, wherein the first output is generated by the first data processing service to satisfy a first output requirement of a first vendor that provides the first data processing service from a first external network, and the second output is generated by the second data processing service to satisfy a second output requirement of the second vendor that provides the second data processing service from a second external network;

storing, in stored data, at least respective portions of the first and the second outputs and corresponding metadata that relates the a first respective a first respective portion of the first output and a second respective portion of the second output based at least in part on the common metric; and combining the first respective portion of the first output and the second respective portion of the second output at least by accessing a query interface to the stored data to retrieve at least the first and the second respective portions and the corresponding metadata and further by transforming the first respective portion or the second respective portion to satisfy an output requirement of the cloud-based collaboration platform, wherein the output requirement pertains to at least one permissible combination relationship between the first and the second outputs.

19. A system of combining two or more outputs of two or more data processing services, the system comprising:

a non-transitory storage medium having stored thereon a sequence of instructions; and one or more processors that execute the sequence of instructions to cause the one or more processors to perform a set of acts, the set of acts comprising, detecting an event in a cloud-based collaboration platform in a network, the event corresponding to at least one content item of a cloud-based collaboration platform;

in response to detection of the event, triggering an analysis of the event and the at least one content item at least to:

determine a first data processing service and a second data processing service to apply to the at least one content item; and determine a common metric to correlate a first output and a second output;

invoking the first and the second data processing services to respectively generate the first and the second outputs, wherein the first output is generated by the first data processing service to satisfy a first output requirement of a first vendor that provides the first data processing service from a first external network, and the second output is generated by the second data processing service to satisfy a second output requirement of the second vendor that provides the second data processing service from a second external network;

storing, in stored data, at least respective portions of the first and the second outputs and corresponding metadata that relates a first respective portion of the first output and a second respective portion of the second output based at least in part on the common metric; and combining the first respective portion of the first output and the second respective portion of the second output at least by accessing a query interface to the stored data to retrieve at least the first and the second respective portions and the corresponding metadata and further by transforming the first respective portion or the second respective portion to satisfy an output requirement of the cloud-based collaboration platform, wherein the output requirement pertains to at least one permissible combination relationship between the first and the second outputs.

20. The system of claim 19, execution of the sequence instructions by the one or more processors further causes the one or more processors to perform the set of acts that further comprises:

transforming the first respective portion of the first output or the second respective portion of the second output to one or more widgets based at least in part upon am intermediate markup language schema to satisfy the output requirement of the cloud-based collaboration platform; and determining two representations respectively corresponding to the first and the second outputs.

* * * * *